United States Patent
DeHeer et al.

(10) Patent No.: US 11,945,742 B2
(45) Date of Patent: Apr. 2, 2024

(54) WASTEWATER PROCESSING MODULES AND WASTEWATER TREATMENT SYSTEMS INCLUDING THE SAME

(71) Applicant: Sanitary Green Incorporated, Bend, OR (US)

(72) Inventors: Adam Mitchell DeHeer, Bend, OR (US); Nicholas Aleksander Sund, Puyallup, WA (US)

(73) Assignee: Sanitary Green Incorporated, Bend, OR (US)

( * ) Notice: Subject to any disclaimer, the term of this patent is extended or adjusted under 35 U.S.C. 154(b) by 0 days.

(21) Appl. No.: 17/833,071

(22) Filed: Jun. 6, 2022

(65) Prior Publication Data
US 2022/0396511 A1    Dec. 15, 2022

Related U.S. Application Data

(60) Provisional application No. 63/208,920, filed on Jun. 9, 2021.

(51) Int. Cl.
*C02F 3/32* (2023.01)
*C02F 1/42* (2023.01)
(Continued)

(52) U.S. Cl.
CPC .............. *C02F 3/327* (2013.01); *C02F 3/302* (2013.01); *C02F 2001/427* (2013.01); *C02F 2103/026* (2013.01); *C02F 2301/043* (2013.01)

(58) Field of Classification Search
CPC .... C02F 3/327; C02F 3/302; C02F 2001/427; C02F 2103/026; C02F 2301/043;
(Continued)

(56) References Cited

U.S. PATENT DOCUMENTS 3,472,764 A * 10/1969 Culp ...................... B01D 21/24
 210/195.3
4,173,532 A * 11/1979 Keoteklian ............. C08L 77/00
 210/721

(Continued)

FOREIGN PATENT DOCUMENTS

DE 19630831 A1 * 2/1988 ............. B01D 21/00
DE 19630831 A1   2/1998
(Continued)

OTHER PUBLICATIONS

Translation of DE19630831A1_Dernbach (Year: 1988).*
(Continued)

*Primary Examiner* — Ekandra S. Miller-Cruz
(74) *Attorney, Agent, or Firm* — Kolitch Romano Dascenzo Gates LLC

(57) ABSTRACT

Wastewater processing modules that include an interior surface defining an interior volume, one or more inlets configured to receive wastewater into the interior volume, one or more outlets configured to exhaust processed water from the interior volume, one or more flow-deflecting baffles positioned within the interior volume fluidly between the inlet(s) and the outlet(s) and that divide the interior volume into a plurality of fluidly connected sections, and a purification medium at least partially filing the plurality of fluidly connected sections. The flow-deflecting baffle(s) are configured to channel the wastewater to flow along a plurality of circuitous bulk flow paths through the purification medium. The purification medium is configured to sequester contaminants from the wastewater as it flows through the interior volume along the circuitous bulk flow paths to produce the processed water therefrom.

25 Claims, 14 Drawing Sheets

(51) Int. Cl.
*C02F 3/30* (2023.01)
*C02F 103/02* (2006.01)

(58) Field of Classification Search
CPC .... C02F 9/00; C02F 1/24; C02F 1/283; C02F 1/32; C02F 1/52; C02F 3/06; C02F 2203/002; C02F 2209/003; C02F 2209/40; C02F 2301/028; C02F 2301/046; Y02W 10/10
USPC .......................................................... 210/602
See application file for complete search history.

(56) References Cited

U.S. PATENT DOCUMENTS

| | | | | |
|---|---|---|---|---|
| 7,708,886 | B2* | 5/2010 | Dempsey | B01J 8/1809 210/194 |
| 2005/0077248 | A1 | 4/2005 | Stark et al. | |
| 2009/0001002 | A1* | 1/2009 | Bauer | C02F 3/327 210/150 |
| 2009/0223904 | A1* | 9/2009 | Tanny | C02F 1/008 210/760 |
| 2014/0083955 | A1 | 3/2014 | O'Neill et al. | |

FOREIGN PATENT DOCUMENTS

| | | | | |
|---|---|---|---|---|
| DE | 19838692 A1 * | 3/2000 | | C02F 3/32 |
| FR | 2282926 A1 * | 3/1976 | | B01D 21/00 |
| WO | WO-2021022169 A1 * | 2/2021 | | C02F 3/10 |
| WO | 2022124901 A1 | 6/2022 | | |

OTHER PUBLICATIONS

Translation of FR2282926A1_Cuvillier (Year: 1976).*
Translation of DE19838692A1_Koester (Year: 2000).*
English language machine translation of German Patent Application Publication No. DE19630831A1, published Feb. 5, 1998.

* cited by examiner

WASTEWATER PROCESSING MODULES AND WASTEWATER TREATMENT SYSTEMS INCLUDING THE SAME

RELATED APPLICATION

This application claims priority to U.S. Provisional Patent Application No. 63/208,920, which was filed on Jun. 9, 2021, is entitled, "WASTEWATER PROCESSING CONTAINERS AND WASTEWATER PROCESSING MODULES INCLUDING THE SAME," and the complete disclosure of which is hereby incorporated by reference.

FIELD

The present disclosure relates to wastewater processing modules and wastewater treatment systems including the same.

BACKGROUND

Human use of water most often produces wastewater as a byproduct. Generally speaking, wastewater includes contaminants that are introduced as a consequence of human use. Typically, wastewater needs to be treated or processed to reduce the concentration or load of carried contaminants before the wastewater can be reused or discharged into the environment. In developed areas, municipal or urban wastewater most often is treated in centralized wastewater treatment plants that implement a number of processes to remove contaminants from the wastewater before it is discharged. However, the availability of municipal wastewater treatment often is limited in developing countries and certain rural areas, and wastewater often is discharged into environmental water sources without treatment in these situations. This practice creates water pollution, which is often ecologically damaging and can lead to public health problems for people drawing water from the polluted source. Additionally, centralized wastewater treatment plants typically discharge treated wastewater into environmental sources, which can be a wasteful practice, particularly with regard to greywater and in water-scarce areas.

Constructed wetland systems are among several approaches that currently are being developed to address the limited availability of water treatment in rural and developing areas. Constructed wetland systems utilize vegetation, soil, and organisms to remove contaminants from wastewater, and thus do not typically require the same degree of infrastructure as conventional wastewater treatment systems. However, constructed wetland systems typically use basins with significantly large areas, for example, as much as 24-30 m² for a single household. The large land requirement for creating constructed wetland systems not only presents a significant upfront cost, but also is unfeasible both in dense urban areas and in remote areas where the construction equipment for creating the constructed wetland system cannot be easily transported. Thus, a need exists for improved wastewater treatment systems that may occupy a smaller footprint and be easily transported, scaled, and/or installed onsite.

SUMMARY

Wastewater processing containers, wastewater processing modules including wastewater processing containers, wastewater treatment systems including wastewater processing modules, and methods of processing wastewater are disclosed herein. The wastewater processing containers include an interior surface that defines an interior volume, one or more inlets configured to receive wastewater to the interior volume, one or more outlets configured to exhaust processed water from the interior volume, and one or more flow-deflecting baffles positioned within the interior volume fluidly between the inlet(s) and the outlet(s). The wastewater processing containers are configured to contain a purification medium within the interior volume and to direct flow of the wastewater along a plurality of circuitous bulk flow paths through the interior volume. The flow-deflecting baffle(s) divide the interior volume into a plurality of fluidly connected sections. The flow-deflecting baffle(s) are configured to channel the wastewater to flow along the circuitous bulk flow paths between the fluidly connected sections. Each flow-deflecting baffle defines a passageway that permits the wastewater to flow between respective adjacent fluidly connected sections.

The wastewater processing modules are configured to receive wastewater and to produce processed water therefrom. The wastewater processing modules include the wastewater processing container and the purification medium. The purification medium is configured to sequester contaminants from the wastewater as the wastewater flows along the circuitous bulk flow paths. The purification medium includes a particulate material at least partially filling the interior volume of the wastewater processing container and configured to permit flow of the wastewater therethrough. The wastewater treatment systems include at least one of the wastewater processing modules.

The methods of processing wastewater include providing wastewater through the inlet(s) into the interior volume of the wastewater processing module, and flowing wastewater from the inlet(s) to the outlet(s), which includes channeling the wastewater to flow along the circuitous bulk flow paths through the purification medium and within each fluidly connected section. The methods also include sequestering, with the purification medium, contaminants from the wastewater during the channeling to produce processed water, and exhausting the processed water from the interior volume.

DETAILED DESCRIPTION

Figure 1:
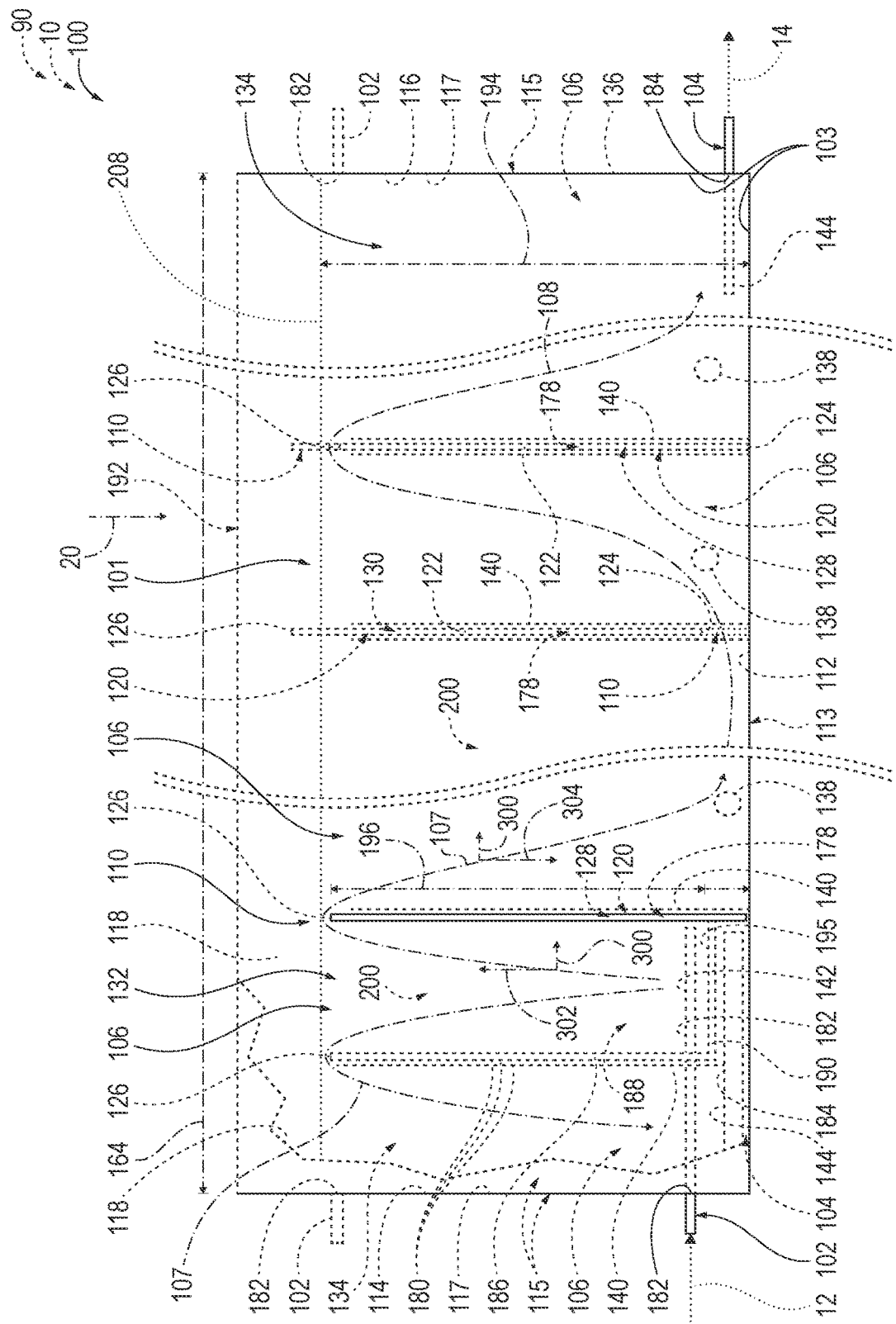
FIG. 1 is a schematic representation showing examples of wastewater processing containers according to the present disclosure.

Herein after, examples of wastewater processing containers, wastewater processing modules, wastewater treatment systems that include wastewater processing module(s), and methods according to the present disclosure that are disclosed herein will be described in detail with reference to the accompanying drawings, in which identical or similar reference numbers are given to identical or similar elements, and an overlapping description is omitted herein. FIGS. 1-17 provide examples of wastewater processing containers 100, wastewater processing modules 10 that include wastewater processing containers 100, and wastewater treatment systems 90 that include wastewater processing module(s) 10, and methods 500 according to the present disclosure. Elements that serve a similar, or at least substantially similar, purpose are labelled with like numbers in each of FIGS. 1-17, and these elements may not be discussed in detail herein with reference to each of FIGS. 1-17. Similarly, all elements may not be labelled in each of FIGS. 1-17, but reference numbers associated therewith may be utilized herein for consistency. Elements, components, and/or features that are discussed herein with reference to one or more of FIGS. 1-17 may be included in and/or utilized with any of FIGS. 1-17 without departing from the scope of the present disclosure.

Generally in the drawings, elements that are likely to be included in a given example are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. In the figures, dotted lines may be utilized to indicate features, structure, and/or components that may be environmental to the illustrated embodiment, and/or used in conjunction with the illustrated embodiment. Also in the figures, dot-dashed lines are utilized to indicate virtual features such as flow paths and/or dimensions.

FIG. 1 is a schematic representation showing examples of wastewater processing containers 100 according to the present disclosure. Wastewater processing containers 100 are configured to be included in and/or utilized with wastewater processing modules 10 according to the present disclosure. Wastewater processing modules 10 are configured to receive wastewater 12 and produce processed water 14 therefrom. Examples of wastewater processing modules 10 are illustrated and discussed in more detail herein with reference to FIG. 2.

As shown in the examples of FIG. 1, wastewater processing containers 100 include an interior surface 103 that defines an interior volume 101, an inlet assembly 102 comprising at least one inlet 182 that is configured to receive wastewater 12 into interior volume 101, and an outlet assembly 104 comprising at least one outlet 184 that is configured to exhaust processed water 14 from interior volume 101. Wastewater processing container 100 is configured to contain a purification medium 200 within interior volume 101 and to direct flow of wastewater 12 along a plurality of circuitous bulk flow paths 107 through purification medium 200. In particular, wastewater processing container 100 may be configured to contain a dynamic, or flowing, volume of wastewater 12 within interior volume 101 such that wastewater 12 may fill interior volume 101 up to a desired waterline 208. Waterline 208 may be regulated by the flowrate at which wastewater 12 is provided to wastewater processing container 100 and/or the flowrate at which wastewater is withdrawn from wastewater processing container 100. Additionally or alternatively, a waterline height 194 of waterline 208 may be determined or defined, at least in part, by the location of a passageway 110 of at least one flow-deflecting baffle 120. In some examples, waterline height 194 of waterline 208 corresponds the minimum height that wastewater 12 must rise to within interior volume 101 to flow from inlet(s) 182 to outlet(s) 184. More specific examples of purification medium 200, wastewater 12, and processed water 14 are discussed herein with reference to FIG. 2 and wastewater processing module 10.

Wastewater processing containers 100 may include an atmospherically open top 192, such that interior volume 101 or purification medium 200 contained therein, is open, or at least partially open, to the atmosphere surrounding wastewater processing container 100 through atmospherically open top 192. Stated another way, atmospherically open top 192 does not form a complete partition between interior volume 101 and the atmosphere surrounding wastewater processing container 100. In this way, interior volume 101 may be fluidly accessible from outside of wastewater processing container 100 via inlet assembly 102, outlet assembly 104, and atmospherically open top 192. Typically, atmospherically open top 192 is positioned along wastewater processing container 100 to face waterline 208.

Wastewater processing container 100 further includes one or more flow-deflecting baffles 120 positioned fluidly between the inlet assembly 102 and the outlet assembly 104. More specifically, wastewater 12 may follow an unobstructed bulk flow path or flow in an unobstructed bulk flow direction 300 between inlet(s) 182 and outlet(s) 184 in the absence of flow-deflecting baffle(s) 120. In other words, in a model that presumes bulk laminar flow of wastewater 12, wastewater 12 may follow the unobstructed bulk flow path between the inlet(s) 182 and the outlet(s) 184 in the absence of flow-deflecting baffle(s) 120. Wastewater 12 may be regarded as flowing in unobstructed bulk flow direction 300 at any instantaneous point along the unobstructed bulk flow path. As referred to herein, flow-deflecting baffle 120 being positioned "fluidly between" the inlet assembly 102 and the outlet assembly 104 means that flow-deflecting baffle 120 is positioned within the unobstructed bulk flow path between the inlet(s) 182 and the outlet(s) 184, such that wastewater 12 encounters, and the flow thereof is deflected by, each flow-deflecting baffle 120 on its bulk flow path between the inlet assembly 102 and the outlet assembly 104. Accordingly, stated another way, each flow-deflecting baffle 120 may be described as fluidly intervening or fluidly interposing inlet assembly 102 and outlet assembly 104.

Flow-deflecting baffle(s) 120 divide interior volume 101 into a plurality of fluidly connected sections 106. Fluidly connected sections 106 additionally or alternatively may be referred to as fluidly connected regions 106, fluidly connected purification sections 106, fluidly connected purification regions 106, and/or fluidly connected compartments 106. Flow-deflecting baffles 120 additionally or alternatively may be referred to as flow-diverting baffles 120, flow-augmenting baffles 120, and/or flow deflectors 120.

Each flow-deflecting baffle 120 defines a passageway 110 that permits wastewater 12 to flow between adjacent fluidly connected sections 106. "Adjacent" fluidly connected sections 106 is used herein to refer to the fluidly connected sections 106 that are positioned on either side of a given flow-deflecting baffle 120. Accordingly, each flow-deflecting baffle 120 may be described as dividing interior volume 101 into the respective adjacent fluidly connected sections 106 or the respective pair of adjacent fluidly connected sections 106.

Each flow-deflecting baffle 120 is configured to channel wastewater 12 to flow along at least one circuitous bulk flow path 107 between the respective adjacent fluidly connected sections 106. More specifically, each flow-deflecting baffle 120 may passively (i.e., without propelling or using external power) channel wastewater 12 to flow along the circuitous bulk flow path(s) 107. Each circuitous bulk flow path 107 corresponding to a given flow-deflecting baffle 120 extends through the passageway of the given flow-deflecting baffle 120. In other words, each flow-deflecting baffle 120 may be configured to restrict the flow of wastewater 12 between the adjacent fluidly connected sections 106 to flow only through passageway 110 and/or prevent wastewater 12 from flowing between the adjacent fluidly connected sections 106 except through passageway 110. Accordingly, circuitous bulk flow paths 107 collectively extend from inlet(s) 182 to outlet(s) 184 and through each fluidly connected section 106. As shown in FIG. 1, the circuitous bulk flow path 107 corresponding to one flow-deflecting baffle may overlap with, or be coextensive with, the circuitous bulk flow path 107 corresponding to an adjacent flow-deflecting baffle 120.

Each circuitous bulk flow path 107 may include a deflected component 302 that is normal to unobstructed bulk flow direction 300 and may include a return component 304 that is opposite to the deflected component 302. For any given flow-deflecting baffle 120, the deflected component 302 of a respective circuitous bulk flow path 107 is defined on one side of the flow-deflecting baffle 120 and the return component 304 is defined on the other or opposed side of the flow-deflecting baffle 120. Circuitous bulk flow path 107 also includes a component that is along unobstructed bulk flow direction 300 and may include a component that is opposite unobstructed bulk flow direction 300. For certain orientations of flow-deflecting baffle 120 within wastewater processing container 100, circuitous bulk flow path 107 is partially along unobstructed bulk flow direction 300 on one side of flow-deflecting baffle 120, and is partially opposite unobstructed bulk flow direction 300 on the other side of flow-deflecting baffle 120, as discussed in more detail herein.

Stated in less rigorous terms, flow-deflecting baffle(s) 120 may be described as channeling wastewater 12 back and forth within the interior volume 101 on the wastewater's path from the inlet assembly 102 to the outlet assembly 104. Accordingly, flow-deflecting baffles 120 are configured to increase a length of the bulk flow path of wastewater 12 from the inlet assembly 102 to the outlet assembly 104 by forcing wastewater 12 to flow along a non-linear flow path from inlet assembly 102 and outlet assembly 104. Flow-deflecting baffle(s) 120 may extend transverse to a direction from inlet(s) 182 to outlet(s) 184 and/or transverse to unobstructed bulk flow direction 300 such as to restrict wastewater 12 from flowing directly between inlet(s) 182 and outlet(s) 184 and to guide wastewater 12 along circuitous bulk flow paths 107. The passageway 110 of each flow-deflecting baffle 120 also may be offset from at least one of inlet(s) 182 and outlet(s) 184 to force wastewater 12 to follow a non-linear bulk flow path from inlet(s) 182 to outlet(s) 184.

The increased bulk flow path length afforded by flow-deflecting baffles 120 may increase the volume of purification medium 200 that wastewater 12 effectively contacts and/or flows through. The increased bulk flow path length afforded by flow-deflecting baffles 120 also may increase the residence time of wastewater 12 within purification medium 200, such as without reducing the net flowrate of wastewater 12 into a wastewater processing module 10 that includes the wastewater processing container 100 and correspondingly the net flowrate of processed water 14 from the wastewater processing module 10. The increased residence time of wastewater 12 within purification medium 200 and/or the increased volume of purification medium 200 contacted by wastewater 12 that is afforded by flow-deflecting baffles 120 may enhance the efficiency at which wastewater processing module 10 processes wastewater 12.

As shown in FIG. 1, wastewater processing container 100 may include a base 113 and a plurality of sidewalls 115 that are interconnected with base 113 and one another. Sidewalls 115 may extend generally transverse to base 113. Base 113 and sidewalls 115 may collectively include interior surface 103. Base 113 and sidewalls 115 also may collectively include an exterior surface 136 that surrounds interior surface 103. In some examples, base 113 is configured to support wastewater processing container 100 on a support surface, such as a platform, a base, a ground surface, or the ground.

Interior surface 103 may include a base side 112, and lateral sides 118 that extend symmetrically upward from base side 112 spaced apart from one another by interior volume 101. Wastewater processing container 100 is schematically illustrated in FIG. 1 with one of lateral sides 118 partially cutaway to expose interior volume 101. Typically, base side 112 is opposed to atmospherically open top 192. Interior surface 103 also may include end sides 117 that are spaced apart from one another by lateral sides 118. In some examples, end sides 117 include an inlet side 114 through which inlet(s) 182 extends and an outlet side 116 through which outlet(s) 184 extends. Lateral sides 118, inlet side 114, and outlet side 116 may be included in sidewalls 115. Base side 112 may be included in base 113 and/or may define the bottom or lowest portion of interior surface 103.

Wastewater processing container 100 may define a length 164 that is measured between end sides 117, and a width that is measured between lateral sides 118 and optionally normal to length 164. Wastewater processing container 100 also may define waterline height 194, which is measured between base 113 and waterline 208 and normal to the width. Wastewater processing container 100 may be dimensioned such that the width, length 164, and waterline height 194 thereof are any suitable magnitude relative to one another, as discussed in more detail herein.

Each flow-deflecting baffle 120 may define a maximal transverse dimension 196 that is measured normal to unobstructed bulk flow direction 300 and between passageway 110 and an opposed end 195 of flow-deflecting baffle 120. Flow-deflecting baffle 120 may be oriented within wastewater processing container 100 such that maximal transverse dimension 196 is oriented along or at least substantially parallel to the width, the length 164, or the waterline height 194 of wastewater processing container 100, for example, depending on the placement of inlet(s) 182 and outlet(s) 184. For some examples in which inlet 182 and outlet 184 are positioned along base side 112 and flow-deflecting baffle 120 is oriented vertically within wastewater processing container 100 with passageway 110 at waterline 208, maximal transverse dimension 196 simply may be the height of flow-deflecting baffle 120 up to passageway 110.

Maximal transverse dimension 196 may define the magnitude of deflected component 302 and/or the extent to which flow-deflecting baffle 120 deflects wastewater 12 from flowing along the unobstructed bulk flow path. In some examples, flow-deflecting baffle 120 is configured such that maximal transverse dimension 196 is a threshold fraction of waterline height 194, such at least 30%, at least 40%, at least 50%, at least 60%, at least 70%, at least 80%, at least 90%, at least 95%, at least 99%, at most 70%, at most 80%, at most 90%, at most 95%, at most 99%, and/or at most 100% of waterline height 194. In some examples, flow-deflecting baffle 120 may be configured such that maximal transverse dimension 196 is a threshold fraction of the width of wastewater processing container 100, such as at least 30%, at least 40%, at least 50%, at least 60%, at least 70%, at least 80%, at least 90%, at least 95%, at least 99%, at most 70%, at most 80%, at most 90%, at most 95%, at most 99%, and/or at most 100% of the width of wastewater processing container 100. As yet another example, flow-deflecting baffle 120 may be configured such that maximal transverse dimension 196 is a threshold fraction of the length of wastewater processing container 100, such as at least 30%, at least 40%, at least 50%, at least 60%, at least 70%, at least 80%, at least 90%, at least 95%, at least 99%, at most 70%, at most 80%, at most 90%, at most 95%, at most 99%, and/or at most 100% of length 164.

Wastewater processing container 100 also may be configured to restrict movement of purification medium 200 within interior volume 101. In particular, flow-deflecting baffle(s) 120 may be configured to divide purification medium 200 into a plurality of purification sections, with each purification section being contained within a fluidly connected section 106. As discussed in more detail herein with reference to FIG. 2, one or more purification sections may include a selected composition that is different from at least one other purification section, and flow-deflecting baffles 120 may restrict undesired movement of the selected composition to other purification sections.

Each flow-deflecting baffle 120 may extend with any suitable orientation within wastewater processing container 100. For example, flow-deflecting baffle 120 may extend longitudinally within interior volume 101, with opposed end 195 and passageway 110 thereof being positioned proximate to respective end sides 117 of interior surface 103. In such examples, flow-deflecting baffle 120 may be configured to channel wastewater 12 to flow along length 164 of interior volume 101, and outlet(s) 184 may be offset from inlet(s) 182 along the width of interior volume 101. As another example, flow-deflecting baffle 120 may extend laterally within interior volume 101, with passageway 110 and opposed end 195 thereof being positioned proximate to respective lateral sides 118 of interior surface 103. In such examples, flow-deflecting baffle 120 may be configured to channel wastewater 12 to flow along the width of interior volume 101, and outlet(s) 184 may be offset from inlet(s) 182 along the length 164 of interior volume 101. Flow-deflecting baffle(s) 120 also may extend diagonally within interior volume 101.

Additionally or alternatively, flow-deflecting baffle 120 may extend upright, or at least substantially vertically, within interior volume 101, with one of passageway 110 and opposed end 195 being positioned proximate to base 113 of interior surface 103 and the other of passageway 110 and opposed end 195 being positioned proximate to waterline 208. More specifically, flow-deflecting baffle(s) 120 may include one or more upward flow-deflecting baffles 128 that are configured to direct wastewater 12 to flow against a direction of gravity 20. In other words, deflected component 302 of circuitous bulk flow path 107 corresponding to upward flow-deflecting baffle 128 may be oriented opposite the direction of gravity 20. Passageway 110 of upward flow-deflecting baffle 128 may be positioned proximate to waterline 208, and opposed end 195 of upward flow-deflecting baffle 128 may be positioned proximate to base side 112, or at least closer to base side 112 than passageway 110. Passageway(s) 110 of upward flow-deflecting baffle(s) 128 also may define waterline 208, or the waterline height 194 thereof. In some examples, upward flow-deflecting baffle(s) 128 are configured to direct wastewater 12 to flow against the direction of gravity 20 to facilitate sedimentation of suspended contaminants that are included in wastewater 12. Flow-deflecting baffle(s) 120 also may include one or more downward flow-deflecting baffles 130 that are configured to direct wastewater 12 to flow with the direction of gravity 20. More specific examples of upward flow-deflecting baffles 128 and downward flow-deflecting baffles 130 are discussed in more detail herein.

Wastewater processing container 100 may include any suitable number of flow-deflecting baffles 120, such as at least one, at least two, at least three, at least four, at least five, at least six, at least seven, at least eight, at least nine, at least ten, at most three, at most four, at most five, at most six, at most seven, at most eight, at most nine, at most ten, and/or at most twenty flow-deflecting baffles 120. Wastewater processing container 100 may include N+1 fluidly connected sections 106, where N is the number of flow-deflecting baffles 120 included in wastewater processing container 100.

For examples in which wastewater processing container 100 includes a plurality of flow-deflecting baffles 120, flow-deflecting baffles 120 may be positioned within interior volume 101 in any suitable relationship relative to one another. For example, flow-deflecting baffles 120 may be oriented to extend parallel to one another. Additionally or alternatively, two or more flow-deflecting baffles 120 may be oriented to extend transverse to one another and optionally may intersect with one another to produce a grid of side-by-side fluidly connected sections 106.

Flow-deflecting baffles 120 may be arranged in series fluidly between inlet assembly 102 and outlet assembly 104. Additionally or alternatively, flow-deflecting baffles 120 may be arranged in parallel fluidly between inlet assembly 102 and outlet assembly 104. More specifically, for flow-deflecting baffles 120 that are arranged in series, flow-deflecting baffles 120 may be described as having adjacent flow-deflecting baffles 120 that interface a common fluidly connected section 106 with one of the adjacent flow-deflecting baffles 120 positioned upstream of (i.e., closer to inlet(s) 182 than) the other adjacent flow-deflecting baffle 120. For examples in which N is greater than three, flow-deflecting baffles 120 that are arranged in series also may include non-adjacent flow-deflecting baffles 120 that do not interface a common fluidly connected section 106 with at least one flow-deflecting baffle 120 being positioned between the non-adjacent flow-deflecting baffles 120.

For examples in which flow-deflecting baffles 120 are arranged in series, flow-deflecting baffles 120 may be configured to direct wastewater 12 to flow along a serpentine flow path 108 that includes the circuitous bulk flow path(s) 107 corresponding to each flow-deflecting baffle 120 that is arranged in series and that extends through each fluidly connected section 106 corresponding to the flow-deflecting baffles 120 that are arranged in series. More specifically, when flow-deflecting baffles 120 are arranged in series, the passageways 110 of adjacent flow-deflecting baffles 120 are offset from one another within interior volume 101. In other words, passageways 110 of adjacent flow-deflecting baffles 120 are not aligned with one another and may be positioned along opposing regions of interior volume 101, such as proximate opposed end sides 117 of interior surface 103 or opposed lateral sides 118 of interior surface 103. In some examples, the passageways 110 of non-adjacent flow-deflecting baffles 120 arranged in series may be aligned, or not offset, from one another such that serpentine flow path 108 may be described as following an oscillating, undulating, periodic, or reciprocating pattern between inlet(s) 182 and outlet(s) 184. Serpentine flow path 108 may extend from inlet(s) 182 to outlet(s) 184, for example, when all flow-deflecting baffles 120 are arranged in series.

For examples in which flow-deflecting baffles 120 include upward flow-deflecting baffles 128 and downward flow-deflecting baffles 130, upward flow-deflecting baffles 128 and downward flow-deflecting baffles 130 may be arranged in series in an alternating relationship, such that each downward flow-deflecting baffle 130 is adjacent to one or two upward flow-deflecting baffles 128 and vice versa. In other words, upward flow-deflecting baffles 128 and downward flow-deflecting baffles 130 may be arranged in series such that downward flow-deflecting baffles 130 are non-adjacent to one another and such that upward flow-deflecting baffles 128 are non-adjacent to one another. Put in slightly different terms, flow-deflecting baffles 120 may be arranged such that each downward flow-deflecting baffle 130 forms a fluidly connected section 106 with an upward flow-deflecting baffle 128. In this way, serpentine flow path 108 may alternate between extending partially with the direction of gravity 20 and partially against the direction of gravity 20.

Flow-deflecting baffles 120 that are arranged in series may be evenly spaced apart from one another within interior volume 101, such that each fluidly connected section 106 contains the same, or at least substantially the same, volume. Alternatively, flow-deflecting baffles 120 that are arranged in series may be positioned at selected separations from one another such that fluidly connected sections 106 may contain different and/or selected volumes.

For examples in which flow-deflecting baffles 120 are arranged in parallel fluidly between inlet assembly 102 and outlet assembly 104, each flow-deflecting baffle 120 may interface a common fluidly connected section 106 with each other flow-deflecting baffle 120 arranged in parallel. In other words, a single, or common, fluidly connected section 106 forms one of the adjacent pair of fluidly connected sections 106 corresponding to each flow-deflecting baffle 120 arranged in parallel, while the other fluidly connected section 106 of the adjacent pair of fluidly connected sections 106 corresponding to each flow-deflecting baffle 120 is not common to, shared by, or interfaced by any other of the flow-deflecting baffles 120 that are arranged in parallel.

As shown in FIG. 1, fluidly connected sections 106 include at least one inlet fluidly connected section 132 into which inlet(s) 182 receive wastewater 12 and at least one outlet fluidly connected section 134 from which outlet(s) exhaust processed water 14. For some examples in which flow-deflecting baffles 120 are arranged in parallel, each flow-deflecting baffle 120 may define, or partition, a respective inlet fluidly connected section 132, and inlet assembly 102 includes a plurality of inlets 182, each being configured to receive wastewater 12 into a respective inlet fluidly connected section 132 defined by one of the flow-deflecting baffles 120 that are arranged in parallel. Additionally or alternatively, for some examples in which flow-deflecting baffles 120 are arranged in parallel, each flow-deflecting baffle 120 may define or partition a respective outlet fluidly connected section 134, and outlet assembly 104 includes a plurality of outlets 184, each being configured to exhaust processed water 14 from a respective outlet fluidly connected section 134 defined by one of the flow-deflecting baffles 120 that are arranged in parallel. In some examples, wastewater processing container 100 includes flow-deflecting baffles 120 that are arranged in parallel and flow-deflecting baffles 120 that are arranged in series.

Flow-deflecting baffles 120 may include any suitable conformation. As examples, flow-deflecting baffles 120 may include one or more ducted flow-deflecting baffles 180 and/or one or more gate flow-deflecting baffles 178. Each ducted flow-deflecting baffle 180 defines a baffle interior volume 188 that forms one of the pair of fluidly connected sections 106 corresponding to the ducted flow-deflecting baffle 180. More specifically, ducted flow-deflecting baffle 180 may include a closed sidewall 186 that encompasses or surrounds baffle interior volume 188 and an open end that defines passageway 110. Accordingly, ducted flow-deflecting baffle 180 may be described as being tubular or hollow columnar, although ducted flow-deflecting baffles 180 are not limited to a hollow cylindrical shape, and other hollow shapes (e.g., rectangular, polygonal, or oval cross-sectional shapes) are within the scope of the present disclosure. In some examples, ducted flow-deflecting baffle 180 further includes a closed end 190 that confines one end of baffle interior volume 188 and that forms opposed end 195 thereof. For example, closed end 190 may include a cap that encloses one end of ducted flow-deflecting baffle 180.

As shown in FIG. 1, inlet assembly 102 may include an inlet 182 that is configured to receive wastewater 12 into baffle interior volume 188. For example, inlet 182 may be positioned adjacent to closed end 190. In some examples, wastewater processing container 100 includes a plurality of ducted flow-deflecting baffles 180 that are arranged in parallel, and inlet assembly 102 comprises a respective plurality of inlets 182 configured to receive wastewater 12 into the baffle interior volumes 188 of the ducted flow-deflecting baffles 180. In such examples, the fluidly connected section 106 that is common to the ducted flow-deflecting baffles 180 is interior volume 101, or the volume between the exterior of closed sidewalls 186 and interior surface 103. Additionally or alternatively, wastewater processing container 100 may include a plurality of ducted flow-deflecting baffles 180 that are arranged in parallel such that the baffle interior volumes 188 thereof define a plurality of outlet fluidly connected sections 134, and outlet assembly 104 includes a plurality of outlets 184 that are configured to exhaust processed water 14 from each of the baffle interior volumes 188.

Ducted flow-deflecting baffles 180 may be configured as upward flow-deflecting baffles 128 or as downward flow-deflecting baffles 130. For some examples in which ducted flow-deflecting baffle 180 is configured as upward flow-deflecting baffle 128, closed end 190 is positioned adjacent to base side 112 of interior surface 103, an inlet 182 or an outlet 184 is positioned within baffle interior volume 188 adjacent to closed end 190, and passageway 110 of ducted flow-deflecting baffle 180 is positioned proximate to waterline 208. For examples in which ducted flow-deflecting baffle 180 is configured as downward flow-deflecting baffle 130, passageway 110 of ducted flow-deflecting baffle 180 may be positioned adjacent to, but spaced apart from, base side 112 of interior surface 103, as discussed in more detail herein.

Ducted flow-deflecting baffle 180 may be configured to channel wastewater 12 along a plurality of circuitous bulk flow paths 107 between the adjacent pair of fluidly connected sections 106. In some examples, ducted flow-deflecting baffle 180 may be described as channeling wastewater 12 along a plurality of diverging or radially diverting circuitous bulk flow paths 107 between the adjacent pair of fluidly connected sections 106. In particular, ducted flow-deflecting baffle 180 may include a circumferential rim, such as a ring-shaped rim, that defines passageway 110. For example, this rim may define a base-opposed edge 126 of ducted flow-deflecting baffle 180 when ducted flow-deflecting baffle 180 is configured as an upward flow-deflecting baffle 128. Ducted flow-deflecting baffle 180 may be oriented such that a water potential gradient between baffle interior volume 188 and the adjacent fluidly connected section 106 is at least substantially similar along the circumference of the rim such that wastewater 12 may flow in a plurality of different, or radially diverging directions, from passageway 110. As a more specific example, the rim of ducted flow-deflecting baffle 180 may be level or at least substantially level with respect to the direction of gravity 20.

As discussed in more detail herein, ducted flow-deflecting baffles 180 additionally or alternatively may be arranged in a concentric configuration in which a first ducted flow-deflecting baffle 180 is positioned within baffle interior volume 188 of a second ducted flow-deflecting baffle 180, such that the adjacent fluidly connected sections 106 corresponding to the first ducted flow-deflecting baffle 180 include its baffle interior volume 188 and the baffle interior volume 188 of the second ducted flow-deflecting baffle 180. In some examples, the second ducted flow-deflecting baffle 180 has two open ends and does not include a closed end 190.

As mentioned, flow-deflecting baffles 120 additionally or alternatively may include gate flow-deflecting baffles 178. Gate flow-deflecting baffles 178 may include an open shape that is dimensioned to extend across a selected cross-section of interior volume 101 with two or three edges of gate flow-deflecting baffle 178 mating against two or three respective sides of interior surface 103 such that gate flow-deflecting baffle 178 separates interior volume 101 into two respective fluidly connected sections 106. In other words, gate flow-deflecting baffles 178 may be described as forming a barrier within interior volume 101 by mating against at least two sides of interior surface 103. As more specific examples, gate flow-deflecting baffle 178 may include a sheet, plate, or panel that is dimensioned and shaped correspondingly to a selected cross-section of interior volume 101.

For examples in which gate flow-deflecting baffle 178 is configured to mate against two sides of interior surface 103, a third edge of gate flow-deflecting baffle 178 may be at least partially spaced apart from a third respective side of interior surface 103 such that passageway 110 is formed between the third edge of gate flow-deflecting baffle 178 and the third respective side of interior surface 103. For example, when passageway 110 of gate flow-deflecting baffle 178 is formed between a lateral side 118 of interior surface 103 and at least a portion of a respective edge of gate flow-deflecting baffle 178, gate flow-deflecting baffle 178 may be described as being configured to channel wastewater 12 to flow laterally within interior volume 101. Similarly, when passageway 110 of gate flow-deflecting baffle 178 is formed between an end side 117 of interior surface 103 and at least a portion of a respective edge of gate flow-deflecting baffle 178, gate flow-deflecting baffle 178 may be described as being configured to channel wastewater 12 to flow longitudinally within interior volume 101. For examples in which gate flow-deflecting baffle 178 is configured to mate against three sides of interior surface 103, gate flow-deflecting baffle 178 may include an aperture formed there through that defines the passageway 110 of gate flow-deflecting baffle 178.

Additionally or alternatively, as shown in FIG. 1, each gate flow-deflecting baffle 178 may be configured as an upward flow-deflecting baffle 128 or as a downward flow-deflecting baffle 130. In such examples, gate flow-deflecting baffle 178 may have a base edge 124 that is positioned nearest to base side 112 of interior surface 103, a base-opposed edge 126 that is opposed to base edge 124 and that is positioned adjacent to waterline 208, and lateral edges 122 that extend between base edge 124 and base-opposed edge 126. When gate flow-deflecting baffle 178 is configured as upward flow-deflecting baffle 128, base edge 124 is mated against base side 112 of interior surface 103, lateral edges 122 may mate against lateral sides 118 or against end sides 117 of interior surface 103, and at least a portion of base-opposed edge 126 is recessed below waterline 208 such that passageway 110 thereof is defined between base-opposed edge 126 and waterline 208. When gate flow-deflecting baffle 178 is configured as downward flow-deflecting baffle 130, lateral edges 122 may mate against lateral sides 118 or against end sides 117 of interior surface 103, at least a portion of base edge 124 is spaced apart from base side 112 of interior surface 103 such that passageway 110 is defined between base edge 124 and base side 112, and base-opposed edge 126 is positioned above waterline 208 such that wastewater 12 is restricted from flowing over base-opposed edge 126.

As mentioned, fluidly connected sections 106 may be described as including one or more inlet fluidly connected sections 132 into which inlet(s) 182 receive wastewater 12 such that inlet fluidly connected section(s) 132 is the first of the plurality of fluidly connected sections 106 into which wastewater 12 flows. Interior surface 103 may include a side, such as an end side 117, through which inlet(s) 182 extend and that may be referred to as inlet side 114. Likewise, interior surface 103 may include a side, such as an end side 117, through which outlet(s) 184 extend and that may be referred to as outlet side 116.

For examples in which wastewater processing container 100 includes gate flow-deflecting baffles 178, inlet fluidly connected section 132 may be formed between an inlet side 114 of interior surface 103 and the flow-deflecting baffle 120 positioned adjacent or nearest to inlet side 114. For examples in which wastewater processing container 100 includes gate flow-deflecting baffles 178, outlet fluidly connected section 134 may be formed between outlet side 116 of interior surface 103 and the flow-deflecting baffle 120 positioned adjacent or nearest to outlet fluidly connected section 134.

Inlet 182 may be positioned or configured to flow wastewater 12 into any suitable region of inlet fluidly connected section 132. As examples, inlet 182 may flow wastewater 12 into inlet fluidly connected section 132 adjacent to base side 112 of interior surface 103 or adjacent to waterline 208. Similarly, outlet 184 may be positioned or configured to receive processed water 14 from any suitable region of outlet fluidly connected section 134. As examples, outlet 184 may receive processed water 14 from outlet fluidly connected section 134 adjacent to base side 112 of interior surface 103 or adjacent to waterline 208. In some examples, it is desirable to position inlet 182 and/or outlet 184 adjacent to base side 112 of interior surface 103 to prevent roots from plants that may be included in purification medium 200 from growing into, thereby clogging or restricting, inlet 182 or outlet 184.

For examples in which inlet 182 is configured or positioned to flow wastewater 12 into inlet fluidly connected section 132 adjacent to base side 112 of interior surface 103, flow-deflecting baffles 120 may include a flow-deflecting baffle 120 in the form of an upward flow-deflecting baffle 128 that forms inlet fluidly connected section 132, such as with inlet side 114 in the case of gate flow-deflecting baffles 178. In this way, wastewater 12 is forced to flow upwardly from inlet 182 to pass through passageway 110 of upward flow-deflecting baffle 128. For examples in which outlet 184 is configured or positioned to receive processed water 14 from outlet fluidly connected section 134 from adjacent to base side 112 of interior surface 103, flow-deflecting baffles 120 may include an upward flow-deflecting baffle 128 that forms outlet fluidly connected section 134, such as with outlet side 116 in the case of gate flow-deflecting baffles 178. In some such examples, flow-deflecting baffles 120 include at least one flow-deflecting baffle 120 in the form of a downward flow-deflecting baffle 130 positioned between the upward flow-deflecting baffles 128 that respectively form inlet fluidly connected section 132 and outlet fluidly connected section 134.

With continued reference to FIG. 1, wastewater processing container 100 may include an inlet flow distributer 142 in fluid communication with inlet 182 and configured to flow wastewater 12 evenly across inlet fluidly connected section 132. In some examples, inlet flow distributer 142 extends along or adjacent to base side 112 of interior surface 103 within inlet fluidly connected section 132. Additionally or alternatively, inlet flow distributer 142 may extend within baffle interior volume 188 of ducted flow-deflecting baffle 180. Wastewater processing container 100 also may include an outlet distributed flow receiver 144 that is in fluid communication with outlet 184 and configured to receive processed water 14 evenly from across outlet fluidly connected section 134.

In some examples, inlet flow distributer 142 and/or outlet distributed flow receiver 144 are configured support purification medium 200 spaced apart from base side 112 of interior surface 103 or closed end 190 of ducted flow-deflecting baffle 180 to create a void space between base side 112 or baffle interior volume 188 and purification medium 200. The void space created by inlet flow distributer 142 may reduce backpressure to flowing wastewater 12 into interior volume 101 from inlet 182. Similarly, the void space created by outlet distributed flow receiver 144 may reduce backpressure in flowing processed water 14 into outlet 184 from interior volume 101. As yet more specific examples, inlet flow distributer 142 and/or outlet distributed flow receiver 144 may include a drainage mat having an array of raised sections that are separated from one another and define a network of channels therebetween. The raised sections may support purification medium 200 spaced apart from the network of channels and inlet 182 and/or outlet 184 may be in fluid communication with the respective network of channels.

Wastewater processing container 100 further may include a plurality of aeration ports 138 configured to provide an oxygen-containing gas to the interior volume 101 of wastewater processing container 100 and to mix the oxygen-containing gas into the wastewater 12 contained therein. As discussed in more detail herein, the oxygen-containing gas may be provided to facilitate selected microbial growth within purification medium 200. Wastewater processing container 100 may include an aeration port 138 for providing the oxygen-containing gas to each fluidly connected section 106. Alternatively, wastewater processing container 100 may include aeration ports 138 for providing the oxygen-containing gas to a selected subset of the fluidly connected sections 106, or fewer than all of the fluidly connected sections 106, such as for reasons that are discussed in more detail herein.

As further shown in FIG. 1, in some examples, wastewater processing container 100 includes a plurality of baffle receivers 140, each being configured to receive and position a flow-deflecting baffle 120. In particular, each flow-deflecting baffle 120 may be configured to be selectively received in and removed from a baffle receiver 140. More specific examples of baffle receivers 140 are discussed herein.

In some examples, wastewater processing container 100 is configured to be stacked with at least one other wastewater processing container 100, and optionally with a plurality of other wastewater processing containers 100, such as to be transported with the other wastewater processing container(s) 100 in the stacked configuration. More specifically, with each flow-deflecting baffle 120 removed from interior volume 101, and optionally the respective baffle receiver 140, interior surface 103 may be dimensioned and shaped to receive at least a portion of the exterior surface 136 of another wastewater processing container 100, such that at least the portion of the exterior surface 136 the other wastewater processing container 100 is positioned within the interior volume 101 of wastewater processing container 100. In some examples, the flow-deflecting baffles 120 of each stacked wastewater processing container 100 may be stowed within the interior volume 101 of the top-most wastewater processing container 100 in the stack.

Wastewater processing container 100 may be constructed from any suitable material such as one or more of plastics, polymeric materials, polyvinyl halides, polyurethanes, resins, thermoplastics, thermoplastic elastomers, water impenetrable polymers, wear resistant polymers, one or more metals, one or more alloys, and/or combinations thereof. Wastewater processing container 100 may be constructed in any suitable shape and/or with any suitable dimensions. As examples, wastewater processing container 100 may include a generally rectangular prismatic shape, a polygonal cube shape, and/or an elongate polygonal prismatic shape that is elongated in the direction between inlet(s) 182 and outlet(s) 184, and/or a hollow cylindrical shape. Wastewater processing container 100 optionally may be tapered towards base 113, such as to permit the stacking function discussed herein.

Wastewater processing container 100 may be constructed with any suitable length 164, any suitable width, any suitable depth, which may be measured between base side 112 of interior surface 103 and atmospherically open top 192 of interior volume 101, and/or such that interior volume 101 possesses any suitable volume. As examples, wastewater processing container 100 may be constructed such that interior volume 101 has a volume of at least 50 liters, at least 100 liters, at least 150 liters, at least 175 liters, at least 200 liters, at least 250 liters, at least 300 liters, at least 400 liters, at most 100 liters, at most 150 liters, at most 175 liters, at most 200 liters, at most 250 liters, at most 300 liters, at most 400 liters, at most 500 liters, and/or at most 600 liters.

The specific length 164, width, and/or depth of wastewater processing container 100 and/or volume of interior volume 101 thereof may be selected based upon a contaminant load or concentration of contaminants in wastewater 12, the volume of wastewater 12 to be processed per day, the types of contaminants in wastewater 12, and/or the installation location. As examples, the length of wastewater processing container 100 may be increased such that a larger number of fluidly connected sections 106 may be formed therein, such as to process wastewater 12 with a larger concentration or larger array of types of contaminants. The volume of wastewater processing module 10 also may be increased for similar reasons and/or such that wastewater processing module 10 may process a larger volume of wastewater 12 per unit time. That said, for some examples in which wastewater processing module 10 is installed in a remote location, it may be desirable to utilize multiple wastewater processing modules 10 connected in series or parallel instead of single larger wastewater processing module 10. Thus, utilizing a plurality of wastewater processing containers 100 each having a smaller interior volume 101, and collectively having a larger interior volume 101, may be desirable in some settings.

As discussed in more detail herein, wastewater processing container 100 may be included in and/or utilized with a wastewater treatment system 90 that includes at least one wastewater processing module 10, and optionally a plurality of wastewater processing modules 10. When wastewater treatment system 90 includes a plurality of wastewater processing modules 10, wastewater processing modules 10 may be fluidly connected in series and/or in parallel within wastewater treatment system 90. Thus, wastewater processing containers 100 may be configured to be fluidly interconnected in series and/or in parallel with one or more other wastewater processing containers 100.

While the above discussion focuses on examples in which wastewater processing container 100 is configured to channel wastewater 12 along a plurality of circuitous bulk flow paths 107 between inlet(s) 182 and outlet(s) 184, it is within the scope of the present disclosure that wastewater processing container 100 may be configured to channel wastewater 12 along different flow paths than those specifically discussed herein. As a first example, wastewater processing container 100, such as at least one wastewater processing container 100 within wastewater treatment system 90, may be operated and/or utilized without flow-deflecting baffles 120, or with flow-deflecting baffles 120 removed therefrom.

As another example, wastewater processing container 100 may be configured to guide wastewater 12 along a tidal flow path, in which wastewater 12 enters and exits interior volume 101 via inlet(s) 182. In such an example, wastewater processing container 100 may include only inlet(s) 182 (i.e., wastewater processing container 100 may not include outlet(s) 184). Alternatively, wastewater processing container 100 may be constructed with both inlet 182 and outlet 184, and outlet 184 may selectively be closed or sealed.

Figure 2:
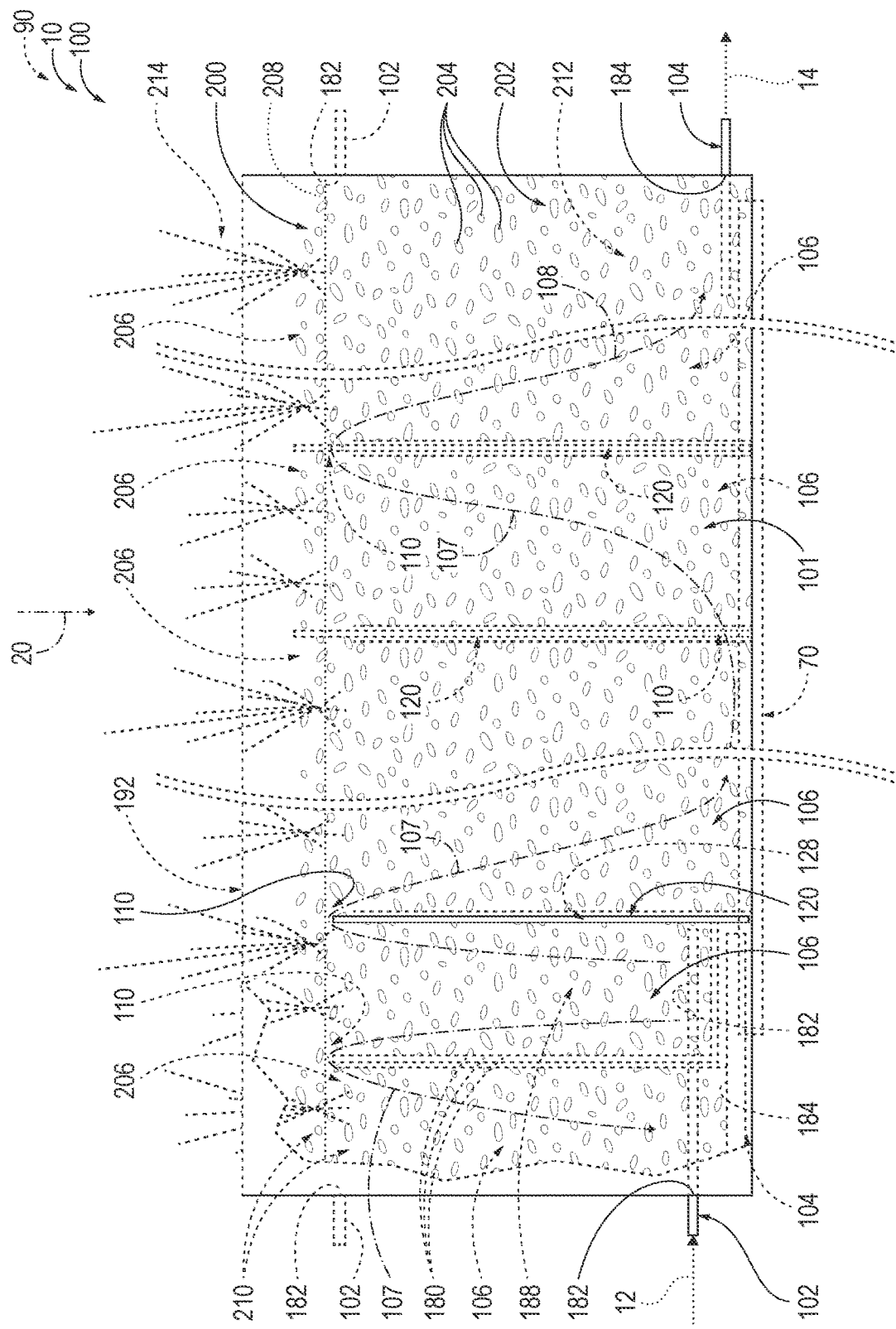
FIG. 2 is a schematic representation showing examples of wastewater processing modules according to the present disclosure.

Turning now to FIG. 2, illustrated therein are examples of wastewater processing modules 10 according to the present disclosure. Wastewater processing modules 10 illustrated and discussed herein with reference to FIG. 2 may include and/or utilize wastewater processing containers 100 illustrated and discussed herein with reference to FIG. 1. That is, wastewater processing containers 100 illustrated and discussed herein with reference to FIG. 2 may include any of the features, functions, components, aspects, etc., as well as variants thereof, of wastewater processing containers 100 illustrated and discussed herein with reference to FIG. 1 without requiring the inclusion of all such features, functions, components, aspects, etc. Likewise, wastewater processing containers 100 according to FIG. 1 may include any of the features, functions components, aspects, etc., as well as variants thereof, of wastewater processing containers 100 illustrated and discussed herein with reference to FIG. 2 without the inclusion of all such features, functions, components, aspects, etc. That said, corresponding reference numerals may be utilized herein for consistency to describe elements that serve a similar, or at least substantially similar, purpose in the examples of FIGS. 1 and 2.

As shown in the examples of FIG. 2, wastewater processing modules 10 are configured to receive wastewater 12 and to purify wastewater 12 to produce processed water 14 therefrom. Generally speaking, wastewater 12 includes contaminants that are present in wastewater 12 at a concentration, and/or a contaminant load. The concentration, load (i.e., amount), or type of contaminants in wastewater 12 may render wastewater 12 unsuitable for human use and/or for discharge of wastewater 12 into the environment. Examples of human use include agricultural use (e.g., watering crops and/or watering animals), domestic use (e.g., watering gardens, running toilets, and/or cleaning), commercial use (e.g., use in industrial processes), for drinking, and/or for preparing food. Wastewater processing module 10 is configured remove, sequester, decompose, and/or otherwise remediate the contaminants from wastewater 12. In this way, processed water 14 may include fewer contaminants, a lower concentration of contaminants, and/or a smaller load of contaminants than wastewater 12 and/or may be detectably free of certain types of contaminants that may be present in wastewater 12. Accordingly, the term "purify" as utilized herein, means to remove, sequester, decompose, and/or otherwise remediate the contaminants from wastewater 12. Thus, and as used herein, references to purifying wastewater 12 mean reducing the load, or concentration, of contaminants (on aggregate or by selected species thereof), but it does not require the removal of all contaminants from wastewater 12.

Wastewater processing module 10 may be configured such that the concentration of one or more contaminant types, or the total load of contaminants, in processed water 14 is less than a selected threshold. The selected threshold may be based upon a desired application of processed water 14, such as for domestic use, agricultural use, commercial use, drinking, and/or preparing food, in which different applications may require different selected thresholds. The selected threshold additionally or alternatively may be based upon regulatory standards established in the regional jurisdiction (e.g., country, nation, state, or county) in which wastewater processing module 10 is installed.

Wastewater 12 may be received from any suitable one or more sources. As examples, wastewater 12 may be greywater or sullage that is received from domestic or commercial sources. Greywater may be from any domestic or commercial streams except for toilets. For example, greywater may be from sinks, showers, baths, washing machines, urinals, and/or dishwashers. Wastewater 12 also may include runoff from roads, roofs, or other infrastructure. As another example, wastewater 12 may be from various industrial processes, such as food preparation, mining runoff, mining processing runoff, manufacturing effluent, and the like. The particular type of contaminants, concentration of specific contaminant types, and/or load of contaminants in wastewater 12 may vary depending upon the source and/or any pre-processing steps that have been performed on wastewater 12 prior to being fed into wastewater processing module 10.

Examples of contaminants that may be included in wastewater include surfactants, detergents, hydrocarbons, oxidants, organic compounds, synthetic organic compounds, aromatic compounds, heterocyclic compounds, aromatic heterocycles, halogenated compounds, pharmaceutical compounds, polymers, carbohydrates, proteins, nitrogenous compounds, phosphates, nitrates, sulfates, ammonium, amines, amides, alcohols, salts, halides, metal ions, metallic complexes, minerals, acids, bases, fertilizer, plastics, micro plastics, fibers, micro-, nano-, or macro particles, bacteria, viruses, algae, and/or pathogens. The contaminants may be present in wastewater 12 in various phases, such as dissolved in wastewater 12 (i.e., dissolved contaminants) or suspended in wastewater (i.e., suspended contaminants). In view of the above, wastewater processing module 10 may be configured to remove, treat, and/or reduce the concentration of the specific types of contaminant or contaminant load in wastewater 12. Wastewater processing module 10 additionally or alternatively may be configured to process wastewater 12 having a wide range of contaminant types, contaminant concentrations, or contaminant loads.

As shown in FIG. 2, wastewater processing module 10 includes wastewater processing container 100. As discussed herein, wastewater processing container 100 defines an interior volume 101 and is configured to contain a purification medium 200 within interior volume 101 and to direct flow of wastewater 12 along a plurality of circuitous bulk flow paths 107 through purification medium 200. In particular, wastewater processing container 100 includes one or more inlet 182 configured to receive wastewater 12 into interior volume 101 and one or more outlet 184 configured to flow processed water 14 from interior volume 101. As discussed herein, wastewater 12 may be regarded as, or processed to be, processed water 14 as it flows into outlet(s) 184 and/or exits interior volume 101. As also discussed herein, wastewater processing container 100 further includes one or more flow-deflecting baffles 120 positioned fluidly between inlet(s) 182 and outlet(s) 184, and that divide the interior volume 101 into a plurality of fluidly connected sections 106. Flow-deflecting baffles 120 are configured to channel wastewater 12 to flow along circuitous bulk flow paths 107, which collectively extend from inlet 182 to outlet 184 and through each fluidly connected section 106.

Wastewater processing module 10 further includes purification medium 200 that is configured to sequester or remove contaminants from, and/or reduce the concentration of contaminants within, wastewater 12 as wastewater 12 passes along circuitous bulk flow paths 107. At least some of, at least substantially all of, or all of circuitous bulk flow paths 107 may extend through purification medium 200. As discussed herein, the construction of wastewater processing container 100 also may be configured to remove or separate contaminants from wastewater 12. In particular, wastewater processing container 100 may be configured to direct flow of wastewater 12 against the direction of gravity 20, which may facilitate sedimentation of suspended contaminants from wastewater 12.

Purification medium 200 includes a particulate material 202 at least partially filling interior volume 101 of wastewater processing container 100 and configured to permit flow of wastewater 12 therethrough. Particulate material 202 may be selected to (i) physically adsorb, chemically adsorb, and/or absorb contaminants from wastewater 12, (ii) catalyze decomposition of contaminants in wastewater 12; (iii) provide a substrate for a biological community 210 within interior volume 101, (iv) facilitate sedimentation of suspended contaminants within wastewater 12; and/or (v) buffer pH of the wastewater 12 within the wastewater processing module 10.

Wastewater processing module 10 may maintain wastewater 12 within interior volume 101 at a selected contained volume such that wastewater 12 fills interior volume 101 to a selected waterline 208. Waterline 208 may be determined by the placement of passageways 110 on flow-deflecting baffles 120, a flowrate of wastewater 12 into interior volume 101, and/or a flowrate of processed water 14 from interior volume 101. At least a portion, and typically at least a substantial portion, of purification medium 200 is positioned below waterline 208, and this portion of purification medium 200 may be referred to herein as submerged purification medium 200.

Particulate material 202 may include a plurality of particles 204 that pack in interior volume 101 to create a network of fluidly connected voids that permits flow of wastewater 12 through particulate material 202. Each particle 204 includes a particle size that may be defined as the characteristic dimension of particle 204, an outermost dimension of particle 204, or a diameter of a representative sphere that encompasses particle 204. Particulate material 202 may include particles 204 having at least substantially the same size and/or particulate material 202 may include particles 204 having different sizes. Put in slightly different terms, particles 204 may be of at least substantially the same size and/or of a well-defined (e.g., Gaussian) size distribution, or particulate material 202 may include a plurality of populations of particles 204, with each population having a unique size or unique size distribution. As more specific examples, the particle size of at least a substantial portion of the particles 204 may be at least one of at least 0.1 millimeters (mm), at least 0.25 mm, at least 0.5 mm, at least 0.75 mm, at least 1 mm, at least 2 mm, at least 5 mm, at least 7 mm, at least 10 mm, at least 12 mm, at least 14 mm, at least 15 mm, or at least 20 mm, at most 0.25 mm, at most 0.5 mm, at most 0.75 mm, at most 1 mm, at most 2 mm, at most 5 mm, at most 7 mm, at most 10 mm, at most 12 mm, at most 14 mm, at most 15 mm, at most 20 mm, at most 25 mm, at most 30 mm, at most 40 mm, at most 50 mm, or at most 60 mm.

A total volume of the network of fluidly connected voids may be determined by the packing of particles 204 within interior volume 101. Generally speaking, the rate at which wastewater 12 may flow through purification medium 200 may increase with the total volume of the network of fluidly connected voids. In other words, backpressure against flow of wastewater 12 through purification medium 200 may be reduced as the total volume of the network of fluidly connected voids is increased. Also generally speaking, the total volume of the network of fluidly connected voids may increase with an average particle size of particles 204, in that larger particles 204 do not pack as tightly as smaller particles 204. That said, a total surface area of the particulate material 202 may decrease as average particle size is increased, as smaller particles generally possess a larger surface area to volume ratio.

At least some of the processes by which purification medium 200 removes contaminants from wastewater 12 may occur at the surfaces of particles 204 (e.g., adsorption, absorption, etc.). Thus, increasing or maximizing the total surface area of particulate material 202 may enhance the efficiency at which particulate material 202 may remove contaminants from wastewater 12. In view of the above, particulate material 202 may include a selected distribution of particle sizes that maximizes the total surface area of the particulate material and the total volume of the network of fluidly connected voids.

As more specific examples, particles 204 may include coarse-grained particles, small-grained particles, and/or a mixture thereof. Coarse-grained particles and small-grained particles may be regarded as different populations of particles that have a unique particle size or size distribution. For example, small-grained particles may have a smaller particle size, or characteristic dimension, than the coarse-grained particles. Particulate material 202 may include an at least substantially evenly dispersed mixture of coarse-grained particles such that backpressure is at least substantially uniform along circuitous bulk flow paths 107. As more specific examples, the coarse-grained particles may include particle sizes in the range of at least 2 mm, at least 5 mm, at least 7 mm, at least 10 mm, at least 12 mm, at least 14 mm, at least 15 mm, or at least 20 mm, at most 5 mm, at most 7 mm, at most 10 mm, at most 12 mm, at most 14 mm, at most 15 mm, at most 20 mm, at most 25 mm, at most 30 mm, at most 40 mm, at most 50 mm, or at most 60 mm. The small-grained particles may include particle sizes in the range of at least 0.1 mm, at least 0.25 mm, at least 0.5 mm, at least 0.75 mm, at least 1 mm, at least 2 mm, at most 0.25 mm, at most 0.5 mm, at most 0.75 mm, at most 1 mm, and/or at most 2 mm.

In some examples, the coarse-grained particles form a majority component of particles 204, and the small-grained particles form a minority component, or remaining component, of particles 204. As used herein a majority component refers to the component that is present in the greatest amount, which may be more than 50% of all components, and a minority component refers to a component that is present in a lesser, or smaller, amount than at least one other component. As referred to herein, the relative amount of a particular particle type, size, or population in particulate material 202 (e.g., coarse-grained particles) may be determined on a percent basis of the total volume of the specific particle type, size, or population to the total volume of particles 204. To be clear, these volumes only include that of the particles, and not the void space therebetween.

Particulate material 202 also may include particles 204 having the same or different particle types. In particular, the particle type(s) of particles 204 within particulate material 202 may be selected for a capacity to adsorb or absorb particular contaminants, regulate pH within wastewater 12, catalyze or otherwise facilitate decomposition of contaminants in wastewater 12, and/or provide an ideal or suitable substrate for a biological community 210. More specific examples of suitable particle types include pumice, scoria, vermiculite, granulated activated carbon, perlite, gravel, and expanded clay. In some examples, particulate material 202 includes a selected mixture of particles 204 of different particle types, with each particle type being selected to perform one or more of the above-mentioned functions.

Particles 204 may include porous particles. In some examples, porous particles form a majority component of particles 204. More specific examples of porous particles include pumice and scoria. Porous particles may include a porous structure or an internal network of pores that is at least partially accessible to wastewater 12 through the exterior of the porous particle. In other words, the internal network of pores may contribute to and/or define at least a portion of the surface area of the porous particle. Thus, the surface area to volume ratio of a porous particle may be greater than a non-porous particle having the same particle size. Additionally, the internal network of pores may increase, contribute to, or define a portion of the total volume of the network of fluidly connected voids defined by particles 204. With this in mind, the porous particles may increase the total volume of the network of fluidly connected voids and increase the total surface area of the particles 204, as compared to a particulate material 202 formed from equivalently sized non-porous particles. Unlike non-porous particles, the porous particles also may sequester or immobilize contaminants from wastewater 12 via pore occlusion.

As further shown in FIG. 2, flow-deflecting baffles 120 may divide purification medium 200 into a plurality of purification sections 206, each being contained within a fluidly connected section 106. For examples in which flow-deflecting baffles 120 include ducted flow-deflecting baffles 180, purification medium 200 may be contained within baffle interior volume 188, such that baffle interior volume 188 contains a purification section 206. In some examples, the particulate material 202 contained within at least one purification section 206 includes a particle size distribution or a particle type that is different from the particulate material 202 in at least one other purification section 206. Such a configuration may allow wastewater processing module 10 to sequester different types of contaminants from wastewater 12 as wastewater 12 passes through different purification sections 206, which may increase the efficiency at which wastewater processing module 10 removes contaminants from wastewater 12.

Purification medium 200 further may include a biological community 210 that is selected to decompose, immobilize, sequester, remove, and/or consume contaminants from wastewater 12. In particular, biological community 210 may include a microbial community 212 that may be at least supported by or supported on particulate material 202. At least a substantial portion of, and optionally all of, microbial community 212 may be below waterline 208. As examples, microbial community 212 may include autotrophic organisms, heterotrophic organisms, bacteria, algae, and/or fungi. Microbial community 212 may include microbes that are naturally present in particulate material 202 and/or microbes that are harbored or immobilized in particulate material 202 from wastewater 12. Additionally or alternatively, microbial community 212 may include microbes that are selectively introduced into purification medium 200. Microbial community 212 may consume and/or metabolize contaminants from wastewater 12. Additionally or alternatively, one or more microbes within microbial community 212 may chemically transform contaminants from wastewater 12 to produce microbial metabolites therefrom, and optionally one or more other microbes may consume or metabolize the microbial metabolites.

As an example, microbial community 212 may include nitrifying microbes, (e.g., nitrifying bacteria) that, or that are selected to, oxidize nitrogenous compounds within wastewater 12 to produce oxidized nitrogenous compounds. As a more specific example, wastewater 12 may include ammonium as a contaminant, and the nitrifying microbes may oxidize ammonium to produce nitrates. As another example, microbial community 212 may include denitrifying microbes (e.g., denitrifying bacteria) that, or that are selected to, decompose oxidized nitrogenous compounds to produce nitrogen gas or nitrous oxide (also a gas) therefrom. As a yet more specific example, the denitrifying microbes may chemically reduce nitrates present in wastewater to produce nitrogen gas, in which the nitrates may be the microbial metabolite of the nitrifying bacteria.

Purification medium 200 further may include a plant community 214 that is supported by particulate material 202 and that is selected to sequester, take up, consume, and/or remove contaminants from wastewater 12. Additionally or alternatively, plant community 214 may take up, sequester, or consume the microbial metabolites that are present in wastewater 12 from production by microbial community 212. As more specific examples, plant community 214 may be selected to sequester, take up, or consume phosphates, nitrates, ammonium, inorganic ions, metal ions, and/or salts. More specific examples of suitable plants that may be included in plant community 214 include wetland reeds, grasses, and sedges such as Carex, Cyperus, Juncus, Phragmites, Schoenoplectus, Scirpus, Typha, and Zizania; broadleaf and flowering tropical plants such as Canna (Canna Lily), Alocasia and Colocasia (Elephant Ear), Heliconia, Hedychium (Ginger Lily), Strelitzia (Bird of Paradise), Xanthosoma, and Zantedeschia (Calla Lily); indoor plants such as Dracaena (Snake Plant); various species of bamboo, such as Bambusa and Phyllostachys; and household crops such as tomatoes and peas.

The plants of plant community 214 may include roots that grow into particulate material 202, within interior volume 101, and/or below waterline 208. The plants of plant community 214 also may include shoots, stems, stalks, and/or leaves that extend above particulate material 202 or waterline 208 and optionally extend through atmospherically open top 192 out of interior volume 101. Plant community 214 may include plants that are selected to sequester specific contaminants from wastewater 12 and/or that are tolerant of particularly high contaminant loads. As mentioned, purification medium 200 may be regarded as being separated into a plurality of purification sections 206 by flow-deflecting baffles 120. In some examples, plant community 214 is organized such that plants that possess a greater tolerance to contaminant loads and/or that can draw larger amounts of contaminants from wastewater 12 are planted in purification sections 206 closer to inlet(s) 182. Similarly, purification sections 206 positioned closer to outlet 184 may include plants that may have a lower tolerance to contaminant loads but that may be able to effectively remove contaminants from wastewater 12 when the contaminants are present at lower concentrations.

Wastewater processing module 10 also may include an aeration system 70 that is configured to provide an oxygen-containing gas to interior volume 101 of wastewater processing container 100 and to mix the oxygen-containing gas with wastewater 12 in interior volume 101. As examples, the oxygen-containing gas may include air, or oxygen gas. Aeration system 70 may include pressurized containers of the oxygen-containing gas from which the oxygen-containing gas is selectively supplied. Additionally or alternatively, aeration system 70 may include a compressor, fan, blower, or pump that is utilized to selectively pump air into wastewater 12. Aeration system 70 may provide the oxygen-containing gas through the aeration ports 138 of wastewater processing container 100 that are discussed herein with reference to FIG. 1. Aeration system 70 further may include one or more gas diffusers that are configured to mix the oxygen-containing gas with wastewater 12. The gas diffusers may be fluidly connected to the aeration ports discussed herein and/or positioned at the base of one or more fluidly connected sections 106. As examples, each gas diffuser may include a porous glass frit or an air stone.

In some examples, the oxygen-containing gas is provided to wastewater 12 to selectively facilitate microbial growth and/or microbial metabolism within microbial community 212. Aeration system 70 may be configured to deliver the oxygen-containing gas to each fluidly connected section 106. Alternatively, aeration system 70 may be configured supply the oxygen-containing gas to a selected subset of the fluidly connected sections 106 that includes fewer than all of the fluidly connected sections 106. In such examples, aeration system 70 may create oxygen-enriched environments and oxygen-depleted environments that each facilitate a specific type of microbial growth. Additionally or alternatively, aeration system 70 may be configured to provide the oxygen-containing gas to wastewater 12 in a temporally controlled, or periodic, manner such as to create periods of oxygen enrichment and periods of oxygen depletion.

As mentioned, at least a portion, and typically at least a substantial portion, of purification medium 200 is positioned below waterline 208 and may be referred to herein as submerged purification medium 200. Wastewater processing module 10 may be configured to receive wastewater 12 at a threshold flowrate and to produce processed water 14 at the threshold flowrate. The threshold flowrate may be selected based upon the load of contaminants in wastewater 12, the residence time of wastewater 12 in purification medium 200, and/or the volume of purification medium 200 that contacts wastewater 12. As a more specific example, the threshold flowrate may be a function of the volume of submerged purification medium 200. As examples, wastewater processing module 10 may be configured to receive wastewater 12 and to produce processed water 14 therefrom at a threshold flowrate, per liter of submerged purification medium 200. As defined herein, the volume of submerged purification medium 200 only includes the solid volume thereof and does not include the total volume of the network of fluidly connected voids.

As more specific examples, the threshold flowrate per liter of submerged purification medium 200 may be at least one of at least 0.2 liters per day, at least 0.3 liters per day, at least 0.4 liters per day, at least 0.5 liters per day, at least 0.55 liters per day, at least 0.6 liters per day, at least 0.65 liters per day, at least 0.7 liters per day, at least 0.8 liters per day, at most 0.4 liters per day, at most 0.5 liters per day, at most 0.55 liters per day, at most 0.6 liters per day, at most 0.65 liters per day, at most 0.7 liters per day, at most 0.8 liters per day, at most 1 liter per day, at most 2 liters per day, and/or at most 3 liters per day. Thus, a wastewater processing module 10 that includes 150 liters of submerged purification medium may be configured to receive wastewater 12 and produce processed water 14 therefrom at a threshold flowrate in the range of 30-450 liters per day.

Figure 3:
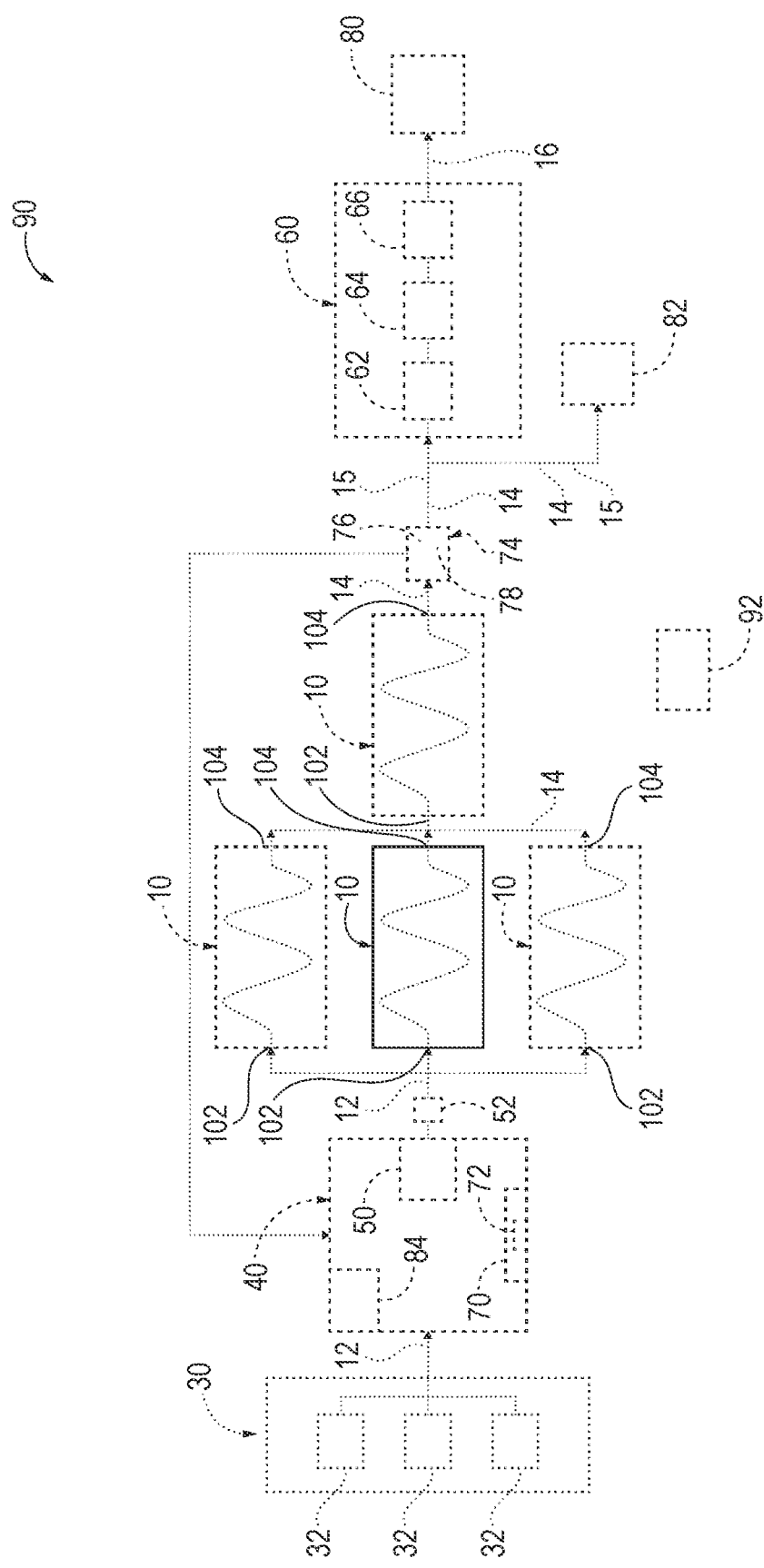
FIG. 3 is a schematic representation showing examples of wastewater treatment systems according to the present disclosure.

FIG. 3 illustrates examples of wastewater treatment systems 90 according to the present disclosure. Wastewater treatment system 90 includes at least one wastewater processing module 10, and optionally a plurality of wastewater processing modules 10. Wastewater treatment system 90 is configured to provide wastewater 12 to wastewater processing module(s) 10 and to receive processed water 14 from wastewater processing module(s) 10. In particular, wastewater treatment system 90 may be configured to receive wastewater 12 from a wastewater source 30 and to deliver wastewater 12 to wastewater processing module(s) 10 from wastewater source 30. In some examples, wastewater source 30 includes a plurality of wastewater sub-sources 32, and wastewater treatment system 90 may be configured to receive wastewater from each wastewater sub-source 32. Examples of sub-sources 32 include a shower, a bathroom, a sink, a washing machine, a dishwasher, etc.

Wastewater treatment system 90 may include a holding tank 40 that is configured to store a volume of wastewater 12 received from wastewater source 30, and wastewater treatment system 90 may be configured to supply wastewater 12 from holding tank 40 to wastewater processing module 10. Holding tank 40 additionally or alternatively may be referred to herein as settling tank 40 and/or surge tank 40. In some examples, holding tank 40 is, or includes, at least one wastewater processing container 100, such as with the flow-deflecting baffles 120 removed therefrom. Alternatively, and in many examples, holding tank 40 includes a volume that is larger than, for example between 2-20 times, an interior volume of wastewater processing module 10.

Holding tank 40 may be configured such that various pretreatment processes are carried out therein. At least some of these pretreatment processes may occur passively, for example storage of wastewater 12 in holding tank 40 may facilitate sedimentation of suspended contaminants in wastewater 12. In this way, the load of suspended contaminants that needs to be handled by wastewater processing modules 10 is reduced by virtue of storing wastewater 12 in holding tank 40. Additionally or alternatively, wastewater treatment system 90 may include a preprocessing system 84 implemented in and/or associated with holding tank 40 and that is configured to execute one or more pretreatment processes on the wastewater 12 within holding tank 40. For example, preprocessing system 84 may include a flocculation system that is configured to facilitate flocculation and subsequent sedimentation of suspended solids within wastewater 12. As another example, preprocessing system 84 may include a filtration system that is configured to filter solids from wastewater 12. As yet another example, preprocessing system 84 may include a dissolved air floatation system that is configured to remove total suspended solids, and/or hydrophobic molecules (e.g., oils, fats, lipids, and/or greases) from wastewater 12. As yet a further example, preprocessing system 84 may include a foam fractionation system configured to remove surface-active compounds (e.g., proteins) from wastewater 12.

Wastewater treatment system 90 also may include aeration system 70. As discussed herein, aeration system 70 is configured to provide and mix an oxygen-containing gas with wastewater 12. As shown in FIG. 3, aeration system 70 may be implemented in holding tank 40 and/or be configured to provide the oxygen-containing gas to holding tank 40 and mix the oxygen-containing gas with wastewater 12 in holding tank 40. Centralizing aeration system 70 within holding tank 40 may require less equipment relative to including an aeration system 70 for each wastewater processing module 10. Additionally, when aeration system 70 is centralized in holding tank 40, aeration system 70 may be utilized in or form a portion of the dissolved air floatation system and/or the foam fractionation system of preprocessing system 84. For example, aeration system 70 may include an aeration pump 72 that may be utilized in the dissolved air floatation system and/or the foam fractionation system of preprocessing system 84.

As shown in FIG. 3, wastewater treatment system 90 may include a single wastewater processing module 10, or wastewater treatment system 90 may include a plurality of wastewater processing modules 10. For examples in which wastewater treatment system 90 includes a plurality of wastewater processing modules 10, wastewater processing modules 10 may be connected in series and/or in parallel within wastewater treatment system 90. When wastewater processing modules 10 are connected in series, the outlet assembly 104 of an upstream (i.e., closer to wastewater source 30) wastewater processing module 10 is fluidly connected to the inlet assembly 102 a wastewater processing module 10 immediately downstream thereto. In this way, processed water 14 is received by the downstream wastewater processing module 10 from the upstream wastewater processing module 10. If wastewater treatment system 90 includes a third wastewater processing module 10, it is connected to receive processed water 14 from the downstream wastewater processing module 10, and so on. As each wastewater processing module 10 is configured to purify wastewater 12, the processed water 14 exiting each wastewater processing module 10 connected in series may have a lower contaminant load than the processed water exiting the wastewater processing module upstream thereto. For examples in which wastewater processing modules 10 are connected in parallel, each wastewater processing module 10 may receive wastewater 12 and/or the inlet assemblies 102 of the wastewater processing modules 10 may be connected to a common manifold. Wastewater treatment system 90 also may include a combination of wastewater processing modules 10 connected in series and in parallel.

For examples in which wastewater treatment system 90 includes a plurality of wastewater processing modules 10, wastewater processing modules 10 may have the same or different configurations. For example, one or more wastewater processing modules 10 may have different wastewater processing container 100 configurations and/or different purification medium 200 configurations. As more specific examples, wastewater processing module(s) 10 positioned further upstream in wastewater treatment system 90 (i.e., closer to wastewater source 30) may include plant community 214, and may not include flow-deflecting baffles 120. Wastewater processing module(s) 10 positioned further downstream (i.e., further from wastewater source 30) may include flow-deflecting baffles 120 and particulate material 202 with pumice as a majority component, and may not include plant community 214. Thus, the wastewater processing modules 10 positioned upstream may purify wastewater 12 biologically or ecologically, while the wastewater processing module(s) 10 positioned further downstream may purify wastewater 12 physically, such as via filtration.

Wastewater treatment system 90 also may include a pump 50 that is configured to flow wastewater 12 into and/or out of wastewater processing module(s) 10, and optionally provide pressure needed to flow wastewater 12 through wastewater processing module(s) 10. As shown in FIG. 3, pump 50 may be configured to draw wastewater 12 from holding tank 40. Wastewater treatment system 90 also may include a flow detector 52 configured to detect the flowrate of wastewater 12 into wastewater processing module(s) 10.

Wastewater treatment system 90 may be configured to control pump 50 based upon flow detector 52 such that pump 50 flows wastewater 12 into or through wastewater processing module(s) 10 at a desired flowrate and/or such as to maintain wastewater 12 at the desired waterline 208 within wastewater processing module(s) 10.

As another example, wastewater treatment system 90 may include one or more siphons that are configured to move and/or control the flow of wastewater 12 within wastewater treatment system 90. As an example, wastewater treatment system 90 may include siphons that are configured to flow wastewater 12 between wastewater processing modules 10. As yet another example, wastewater processing module 10 may include a single siphon that may be connected to more than one wastewater processing module 10 such that the single siphon may, at least in part, control the flow of wastewater 12 through each of the wastewater processing modules 10 to which it is connected.

Wastewater treatment system 90 also may include a siphon that is configured to selectively flow wastewater from holding tank 40 to wastewater processing module(s) 10. Additionally or alternatively, wastewater processing module 10 may include a siphon that is configured to flow wastewater 12 back to holding tank 40 from wastewater processing module 10. Such a siphon may be utilized to recirculate the wastewater between wastewater processing module 10 and holding tank 40. The siphon(s) also may be configured to maintain wastewater 12 at the desired waterline 208 within wastewater processing module(s) 10 and/or to flow wastewater 12 through wastewater processing module(s) 10 at the desired flowrate.

With continued reference to FIG. 3, wastewater treatment system 90 further may include a recirculation system 74 that is configured to receive processed water 14 from wastewater processing modules 10, or from the downstream-most wastewater processing module(s) 10, and selectively recirculate the processed water 14 to holding tank 40. For example, anywhere between 0-100% of the wastewater 12 that enters wastewater processing module(s) 10 may be recycled into holding tank 40 by recirculation system 74. In some examples, the processed water 14 recirculated from wastewater processing module(s) 10 is mixed with wastewater 12 within holding tank 40 such that the recirculated processed water 14 dilutes the wastewater 12 within holding tank 40. Utilizing recirculation system 74 may provide a number of advantages over a linear flow pattern. For example, recirculating processed water 14 may permit various equipment (e.g., aeration system 70, and/or preprocessing system 84) to be centralized in holding tank 40. Additionally, utilizing recirculation system 74 may enable a more even distribution of nutrients between wastewater processing modules 10 and/or allow loading rates to be modulated depending on the contaminant load in wastewater 12. In some examples, recirculation system 74 is configured to recirculate processed water 14 from wastewater processing module(s) 10 to holding tank 40 at least once, twice, three times, four times, five times, and/or ten times in a given 24-hour period.

Recirculation system 74 may be configured to recirculate processed water 14 based on any suitable criteria. For example, depending on the contaminant load in wastewater 12, the total volume of purification medium 200 contained in wastewater processing module(s) 10, and/or the flowrate of wastewater 12 through wastewater processing module(s) 10, the processed water 14 exiting the downstream-most wastewater processing module(s) 10 may be of suitable purity for direct use, or further processing for potable or indoor use, as discussed in more detail herein. In such examples, the processed water 14 exiting the downstream-most wastewater processing module(s) 10 may be regarded as fully processed water 15, as the contaminant load contained therein is sufficiently low for direct use or further processing. Alternatively, the contaminant load of processed water 14 exiting the downstream-most wastewater processing module(s) 10 may exceed a threshold that is needed for direct use or for further processing.

As shown in FIG. 3, recirculation system 74 may include at least one contaminant load sensor 76 that is configured to detect a magnitude of the contaminant load of processed water 14 exiting wastewater processing module(s) 10. Recirculation system 74 may be configured to determine whether the contaminant load of processed water 14 detected by contaminant load sensor(s) 76 exceeds a predetermined threshold contamination load magnitude and to selectively recirculate processed water 14 to holding tank 40 responsive to determining that the contaminant load of processed water 14 exceeds the predetermined threshold contamination load magnitude. Recirculation system 74 also may be configured to determine that the magnitude of the contamination load of processed water 14 is less than the predetermined threshold contamination load magnitude and to permit downstream flow (e.g., to direct use, to storage for direct use, or to further processing) of processed water 14 responsive to determining that the magnitude of the contamination load of processed water 14 is less than the predetermined threshold contamination load magnitude. In other words, recirculation system 74 may be configured to determine that processed water 14 qualifies as fully processed water 15 and to permit downstream flow of fully processed water 15 responsive to this determination. Examples of suitable contaminant load sensors 76 include a suspended solids sensor, a dissolved solids sensor, a total suspended solids sensor, a light absorption sensor, a light scattering sensor, a dissolved ion sensor, a conductivity sensor, etc. In some examples, recirculation system 74 is configured to determine the magnitudes of a plurality of different contamination load types, to determine whether these magnitudes exceed corresponding predetermined threshold contamination load magnitudes, and to selectively recirculate or permit downstream flow of processed water 14 based on any one of, or a combination of, such determinations.

As shown in FIG. 3, recirculation system 74 further may include a recirculation pump 78 that recirculation system 74 utilizes to selectively recirculate processed water 14 from wastewater processing module(s) 10 to holding tank 40. Additionally or alternatively, recirculation system 74 may utilize pump 50 to selectively flow wastewater 12 from holding tank 40 into wastewater processing module(s) 10 and a siphon to receive processed water 14 from wastewater processing module(s) 10 into holding tank 40.

Depending on the application, fully processed water 15 may be utilized directly from wastewater processing module(s) 10. For example, fully processed water 15 may be suitable for outdoor use, irrigation, cleaning, watering, agriculture, etc. In some examples, wastewater treatment system 90 comprises a fully processed water storage tank 82 configured to receive and store fully processed water 15 received from wastewater processing module(s) 10 such that a volume of fully processed water 15 is available for use.

For other applications, one or more additional processing steps may be needed for processed water 14 to be used, for example, to produce water for drinking or food preparation. With this in mind, wastewater treatment system 90 also may include a polishing assembly 60 that is configured to receive fully processed water 15, further purify fully processed water 15, and produce purified water 16 therefrom. Purified water 16 may have an even lower concentration or load of contaminants than processed water 14 or fully processed water 15 and/or may be sanitized. As examples, polishing assembly 60 may include a suspension filter 62 (e.g., a sand filter) configured to separate or filter suspended contaminants from processed water 14, a solute filter 64 (e.g., an activated carbon filter) configured to remove dissolved contaminants from fully processed water 15 (e.g., hydrocarbons or inorganic ions), and/or a sanitizer 66 configured to sanitize fully processed water 15 (e.g., chemically sanitize or sanitize with ultraviolet radiation). Wastewater treatment system 90 further may include a purified water storage tank 80 that is configured to store a volume of purified water 16. Wastewater treatment system 90 may be configured to selectively flow purified water 16 to purified water storage tank 80 such that a volume of purified water 16 may be available for use.

Wastewater treatment system 90 further may include a controller 92 that is configured and/or programmed to control operation of at least a portion of wastewater treatment system 90. As examples, controller 92 may be in communication with one or more components or systems of wastewater treatment system 90, and controller 92 may be configured to send one or more control signals to the one or more components or systems of wastewater treatment system 90 to control operation thereof. Controller 92 also may be in communication with one or more sensors comprised in wastewater treatment system 90, and controller 92 may be configured to issue the command signals based on sensor signals received in sensors. As examples, controller 92 may be configured to control operation of pump 50, aeration system 70, recirculation system 74, and/or preprocessing system 84. As more specific examples, controller 92 may be configured to receive sensor signals from contaminant load sensor(s) 76 of recirculation system 74 and to control operation of recirculation pump 78 and/or pump 50 based at least in part on the sensor signals received from contaminant load sensor(s) 76. Additionally or alternatively, controller 92 may be in communication with flow detector 52 and may be configured to control operation of pump 50 based on sensor signals received from flow detector 52. As yet another example, holding tank 40 may include a volume sensor configured to detect a volume of wastewater 12 in holding tank 40, and controller 92 may be configured to control operation of pump 50 and/or recirculation pump 78 to maintain the volume of wastewater 12 within holding tank 40 to within a predetermined threshold volume range. Additionally or alternatively, purified water storage tank 80 and/or fully processed water storage tank 82 each may include a volume sensor, and controller 92 may be configured to regulate various pumps (e.g., pump 50 and/or recirculation pump 78) to maintain the volume in purified water storage tank 80 and/or fully processed water storage tank 82 at a desired level. Wastewater treatment system 90 also may include various valves, for example, a valve to regulate the flow of wastewater 12 to wastewater processing module(s) 10, a valve to regulate the flow of wastewater 12 from wastewater source 30 into holding tank 40, and/or a valve to regulate the flow of processed water 14 from wastewater processing module(s) 10, and controller 92 may be configured to selectively open or close any of these valves to regulate operation of wastewater treatment system 90, as discussed herein.

Controller 92 may include and/or be any suitable structure, device, and/or devices that may be adapted, configured, designed, constructed, and/or programmed to perform the functions discussed herein. As examples, controller 92 may include one or more of an electronic controller, a dedicated controller, a special-purpose controller, a personal computer, a special-purpose computer, a display device, a logic device, a processing unit, a memory device, and/or a memory device having computer-readable storage media.

The computer-readable storage media, when present, also may be referred to herein as non-transitory computer-readable storage media. This non-transitory computer-readable storage media may include, define, house, and/or store computer-executable instructions, programs, and/or code. When executed by the processing unit, these computer-executable instructions may direct controller 92 to operate wastewater treatment system 90 to perform any suitable portion, or subset, of methods 500. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

FIGS. 4-16 provide more specific examples of wastewater processing containers 100, flow-deflecting baffles 120 of wastewater processing containers 100, and wastewater processing modules 10, according to the present disclosure. Where appropriate, the reference numerals from the schematic illustrations of FIGS. 1-3 are used to designate corresponding parts of the examples of FIGS. 4-17. However, the examples of FIGS. 4-17 are non-exclusive and do not limit wastewater processing containers 100, wastewater processing modules 10, and/or wastewater treatment systems 90 to the illustrated embodiments of FIGS. 4-17. That is, wastewater processing containers 100, wastewater processing modules 10, and/or wastewater treatment systems 90 may incorporate any number of the various aspects, configurations, characteristics, properties, variants, options, etc. of wastewater processing containers 100, wastewater processing modules 10, and/or wastewater treatment systems 90 that are illustrated in and discussed with reference to the schematic representations of FIGS. 1-3 and/or the embodiments of FIGS. 4-17, as well as variations thereof, without requiring the inclusion of all such aspects, configurations, characteristics, properties, etc.

Figure 4:
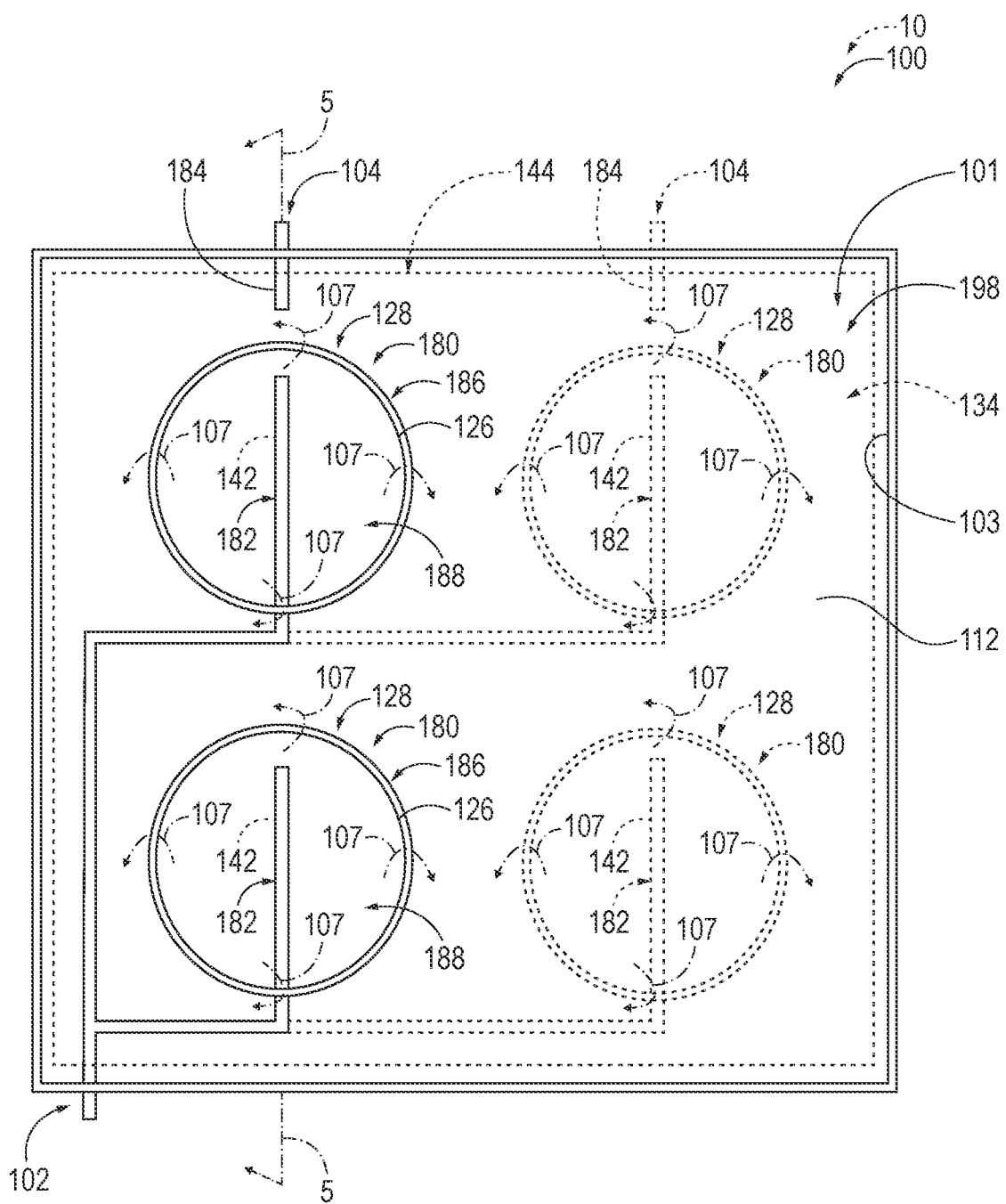
FIG. 4 is a schematic plan view showing examples of wastewater processing containers comprising ducted flow-deflecting baffles according to the present disclosure.
Figure 5:
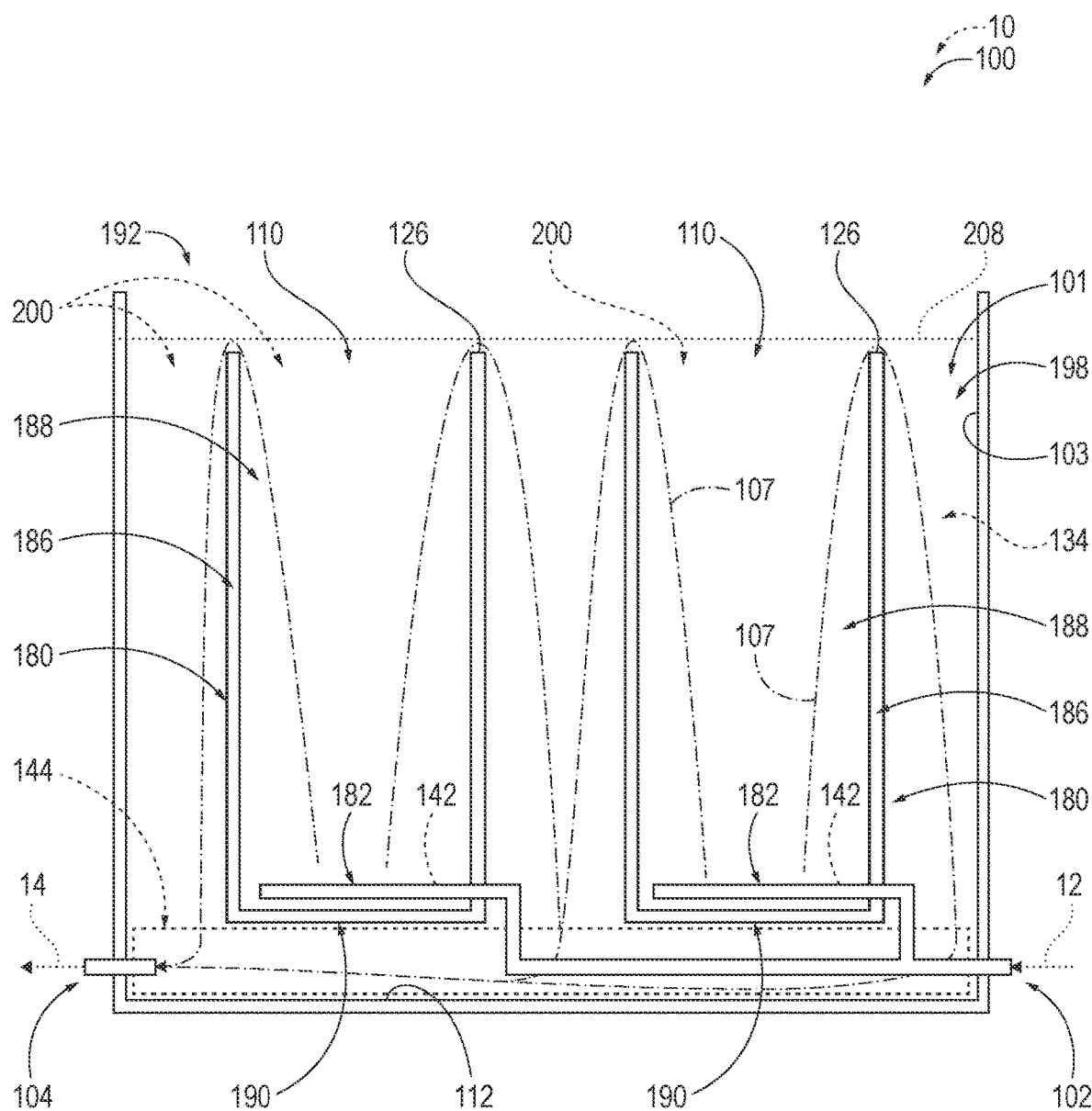
FIG. 5 is a schematic cross-sectional view of the examples of wastewater processing modules of FIG. 4.

FIG. 4 is a schematic plan view illustrating an example of a wastewater processing container 100, and optionally a wastewater processing module 10 comprising the same, and FIG. 5 is a schematic cross-sectional view of the example of FIG. 4 taken along line 5-5 shown in FIG. 4. With reference to FIGS. 4-5, illustrated therein are examples of wastewater processing containers 100 comprising at least two ducted flow-deflecting baffles 180 that are arranged in parallel fluidly between inlet assembly 102 and outlet assembly 104. As shown, each ducted flow-deflecting baffle 180 includes a closed sidewall 186 that encompasses baffle interior volume 188, and a closed end 190 that encloses, or caps, one end of baffle interior volume 188. Each ducted flow-deflecting baffle 180 also includes a ring-shaped base-opposed edge 126 that defines, or extends about, passageway 110. Ducted flow-deflecting baffles 180 are arranged within interior volume 101 of wastewater processing container 100 such that closed end 190 is positioned closer to base side 112 of interior surface 103 than base-opposed edge 126. More specifically, ducted flow-deflecting baffles 180 may extend at least substantially vertically within interior volume 101.

Accordingly, in the examples of FIGS. 4-5, each ducted flow-deflecting baffle 180 is configured as an upward flow-deflecting baffle 128.

Inlet assembly 102 includes a plurality of inlets 182, with each inlet 182 being configured to provide wastewater 12 into baffle interior volume 188 of a respective ducted flow-deflecting baffle 180. In other words, each baffle interior volume 188 corresponds to an inlet fluidly connected section 132. Each inlet 182 is positioned adjacent to closed end 190 such that inlet 182 may be described as providing wastewater 12 to the bottom of baffle interior volume 188. Inlet assembly 102 may be regarded as a manifold with ducting that fluidly isolates inlet assembly 102 from interior volume 101, except for via inlets 182. In other words, inlet assembly 102 may be configured to flow wastewater 12 into interior volume 101 solely via baffle interior volumes 188. Each inlet 182 may include an inlet flow distributer 142 that is configured to spread the flow of wastewater 12 across the horizontal area of baffle interior volume 188.

Ducted flow-deflecting baffles 180 are spaced apart from one another within interior volume 101 such that a portion of interior volume 101 intervenes ducted flow-deflecting baffles 180 from one another and from interior surface 103. This portion of interior volume 101 may be referred to as the intervening interior volume 198. In some examples, the collective volume of ducted flow-deflecting baffles 180 is similar to, at least substantially similar to, and/or within 50% of the volume of intervening interior volume 198. Each ducted flow-deflecting baffle 180 is configured to channel wastewater 12 to flow along a plurality of circuitous bulk flow paths 107 between baffle interior volume 188 and intervening interior volume 198. As discussed herein, these circuitous bulk flow paths 107 may be regarded as radially diverging. Specifically, as seen in the FIG. 4, circuitous bulk flow paths 107 may be described as radiating outward from baffle interior volume 188 at a plurality of, and optionally a continuum of, different angles.

Outlet assembly 104 includes at least one outlet 184, and optionally a plurality of outlets 184, that is/are configured to exhaust processed water 14 from interior volume 101. More specifically, outlet assembly 104 is configured to exhaust processed water 14 from intervening interior volume 198. Accordingly, intervening interior volume 198 may be described as outlet fluidly connected section 134. Outlet(s) 184 are positioned adjacent to base side 112 of interior surface 103, and outlet assembly 104 may include outlet distributed flow receiver 144 that extends along at least a portion of, and optionally a substantial portion of, base side 112. For example, outlet distributed flow receiver 144 may include a drainage layer and/or a drainage mat that extends along base side 112 and that supports closed ends 190 of ducted flow-deflecting baffles 180 spaced apart from base side 112. The drainage layer may be configured with a water permeability that is greater than the water permeability of purification medium 200 contained in interior volume 101, such that processed water 14 flows with less resistance through the drainage layer than through purification medium 200.

Under flowing conditions, in which wastewater 12 flows through interior volume 101 from inlet assembly 102 towards outlet assembly 104, the base-opposed edges 126 of ducted flow-deflecting baffles 180 may be positioned at, or adjacent to, or slightly below, waterline 208. In other words, base-opposed edges 126 of ducted flow-deflecting baffles 180 may, at least in part, define the waterline height or level or waterline 208 within interior volume 101.

When wastewater processing container 100 is comprised in wastewater processing module 10, purification medium 200 may fill interior volume 101 up to, and typically above, waterline 208. Specifically, purification medium 200 may be contained in each baffle interior volume 188 and in intervening interior volume 198. In some examples, purification medium 200 supports ducted flow-deflecting baffles 180 to extend in the upright orientation shown in FIGS. 4-5. Purification medium 200 also may include a plant community 214 that grows out of the atmospherically open top 192 of wastewater processing container 100. While FIG. 4 illustrates examples in which wastewater processing container 100 comprises at least two, and optionally four, ducted flow-deflecting baffles 180, wastewater processing container 100 may include any suitable or desired number of ducted flow-deflecting baffles 180, as discussed herein.

Figure 6:
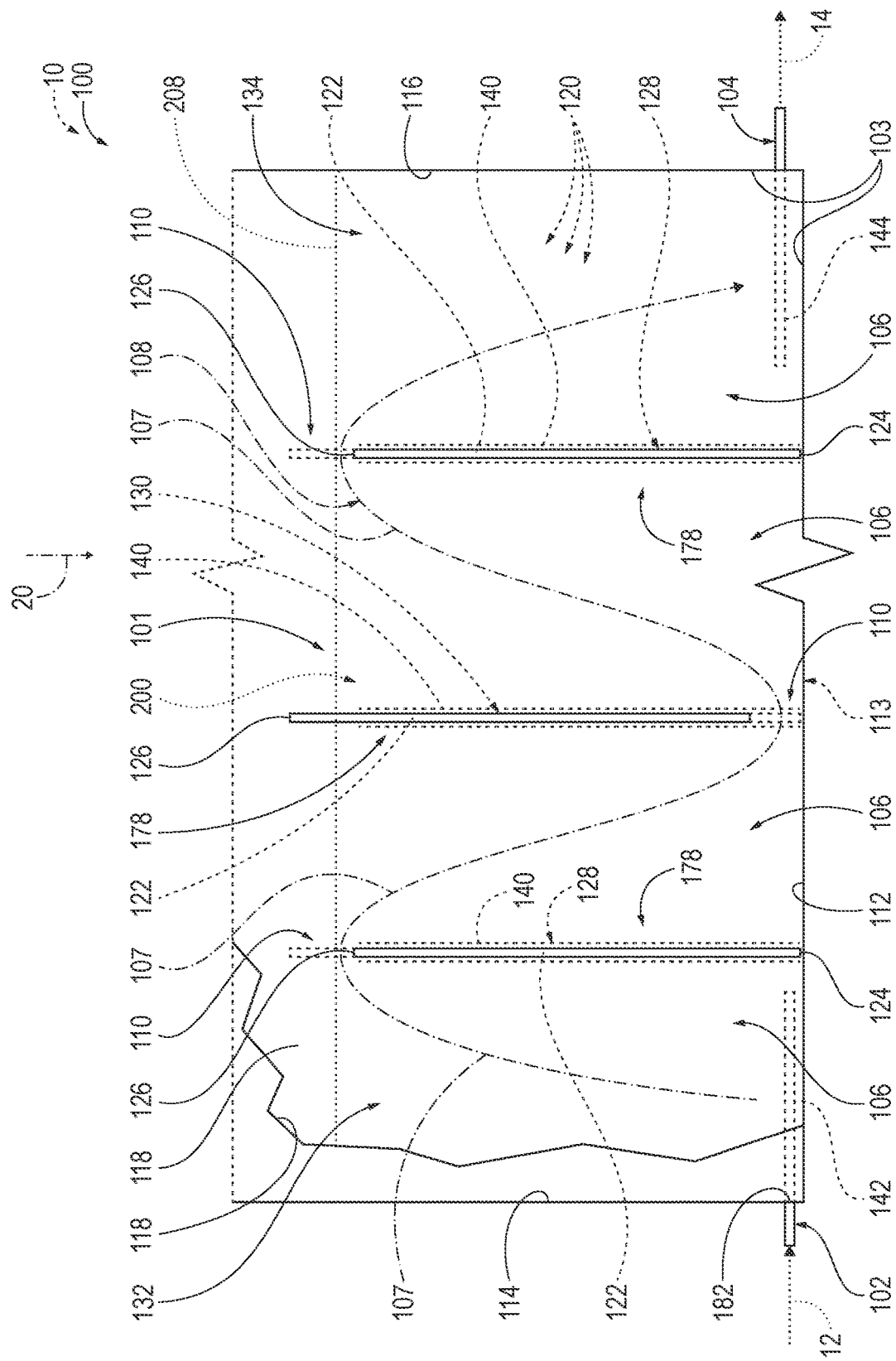
FIG. 6 is a schematic cross-sectional view showing examples of wastewater processing containers comprising gate flow-deflecting baffles, according to the present disclosure.

FIG. 6 illustrates examples of wastewater processing containers 100, and of wastewater processing modules 10 including the same, that include a plurality of gate flow-deflecting baffles 178. Each gate flow-deflecting baffle 178 extends between lateral sides 118 of interior surface 103. In particular, each gate flow-deflecting baffle 178 includes a pair of lateral edges 122, a base edge 124 that extends between the pair of lateral edges 122, and a base-opposed edge 126 that extends between lateral edges 122 opposed to base edge 124. Within interior volume 101, lateral edges 122 extend along, and mate against, lateral sides 118 of interior surface 103, and base edge 124 may extend along or adjacent to base side 112 of interior surface 103. In these examples, base-opposed edge 126 additionally or alternatively may be referred to as upper edge 126.

Passageway 110 of each gate flow-deflecting baffle 178 is at least partially defined along, or formed adjacent to, base edge 124 or base-opposed edge 126 thereof. In particular, passageway 110 may include an aperture extending through the respective gate flow-deflecting baffle 178 adjacent to base edge 124 or base-opposed edge 126 thereof. Alternatively, gate flow-deflecting baffle 178 may include a recess or cutaway formed along base edge 124 or base-opposed edge 126 that defines at least a portion of the passageway 110 thereof. As yet another example, gate flow-deflecting baffle 178 may be supported within interior volume 101 and/or supported by wastewater processing container 100 such that base edge 124 and/or base-opposed edge 126 thereof forms passageway 110 with interior surface 103 and/or with waterline 208.

Gate flow-deflecting baffles 178 include upward flow-deflecting baffles 128 and downward flow-deflecting baffles 130 that are arranged in an alternating relationship fluidly between inlet assembly 102 and outlet assembly 104. Passageway 110 of each upward flow-deflecting baffle 128 may be at least partially defined along or formed adjacent to the base-opposed edge 126, or upper edge 126, thereof. In this way, wastewater 12 is forced to pass over, or through an aperture positioned adjacent to, base-opposed edge 126 of upward flow-deflecting baffle 128 to flow between adjacent fluidly connected sections 106 that are partitioned by the upward flow-deflecting baffle 128. By contrast, passageway 110 of each downward flow-deflecting baffle 130 may be at least partially defined along or formed adjacent to base edge 124 thereof. In this way, wastewater 12 is forced to flow beneath, or through an aperture positioned adjacent to, base edge 124 of downward flow-deflecting baffle 130 to flow between adjacent fluidly connected sections 106 that are partitioned by the downward flow-deflecting baffle 130.

As a more specific example, at least a portion of the base edge 124 of each downward flow-deflecting baffle 130 may be supported spaced apart from the base side 112 of the interior surface 103 such that the passageway 110 thereof is formed between the base side 112 of the interior surface 103 and at least the portion of the base edge 124. Conversely, base edge 124 of each upward flow-deflecting baffle 128 directly abuts, or mates against, base side 112 of interior surface 103 such that wastewater 12 is restricted from passing therebetween. In upward flow-deflecting baffle 128, at least a portion of base-opposed edge 126 thereof may be positioned below waterline 208 such that passageway 110 of upward flow-deflecting baffle 128 is defined between waterline 208 and at least the portion of the base-opposed edge 126 that is positioned below waterline 208.

Gate flow-deflecting baffles 178 collectively are configured to channel wastewater 12 to flow along serpentine flow path 108 between inlet assembly 102 and outlet assembly 104, where serpentine flow path 108 includes the circuitous bulk flow path 107 corresponding to each gate flow-deflecting baffle 178. In the examples of FIG. 6, inlet 182 is positioned to flow wastewater 12 into inlet fluidly connected section 132 adjacent to base side 112 of interior surface 103, and an upward flow-deflecting baffle 128 forms inlet fluidly connected section 132 with inlet side 114. In this way, wastewater 12 is forced to flow upwardly from inlet 182 to pass through passageway 110 of upward flow-deflecting baffle 128. Similarly, outlet 184 is positioned to receive processed water 14 from outlet fluidly connected section 134 from adjacent to base side 112 of interior surface 103, and gate flow-deflecting baffles 178 include an upward flow-deflecting baffle 128 that forms outlet fluidly connected section 134 with outlet side 116. As shown in FIG. 6, gate flow-deflecting baffles 178 include at least one downward flow-deflecting baffle 130 positioned between the upward flow-deflecting baffles 128 that respectively form inlet fluidly connected section 132 and outlet fluidly connected section 134.

Wastewater processing container 100 also may include a plurality of baffle receivers 140, each being configured to receive and position a respective gate flow-deflecting baffle 178. In particular, each gate flow-deflecting baffle 178 may be configured to be selectively received in and removed from a baffle receiver 140. As a more specific example, baffle receiver 140 may include a pair of races or slots that extend in parallel along lateral sides 118 of interior surface 103 and that are dimensioned to receive lateral edges 122 of a gate flow-deflecting baffle 178. Gate flow-deflecting baffle 178 may be selectively slid into and removed from the pair of races. As yet more specific examples, wastewater processing container 100 may include one or more baffle receivers 140 that are configured to position downward flow-deflecting baffle 130. Such baffle receiver(s) 140 may support downward flow-deflecting baffle 130 with at least a portion of base edge 124 thereof spaced apart from base side 112 of interior surface 103. Likewise, wastewater processing container 100 may include one or more baffle receivers 140 that are specifically configured to position upward flow-deflecting baffle 128. Such baffle receiver(s) 140 may support base edge 124 of upward flow-deflecting baffle 128 flush with base side 112 of interior surface 103.

As discussed, inlet assembly 102 may include inlet flow distributer 142 configured to distribute the flow of wastewater 12 across the bottom of inlet fluidly connected section 132 and outlet assembly 104 may include outlet distributed flow receiver 144 configured to receive processed water 14 evenly from across outlet fluidly connected section 134. For examples in which wastewater processing container 100 is comprised in wastewater processing module 10, purification medium 200 may fill each fluidly connected section 106, such as up to or above waterline 208, as discussed herein.

Figure 7:
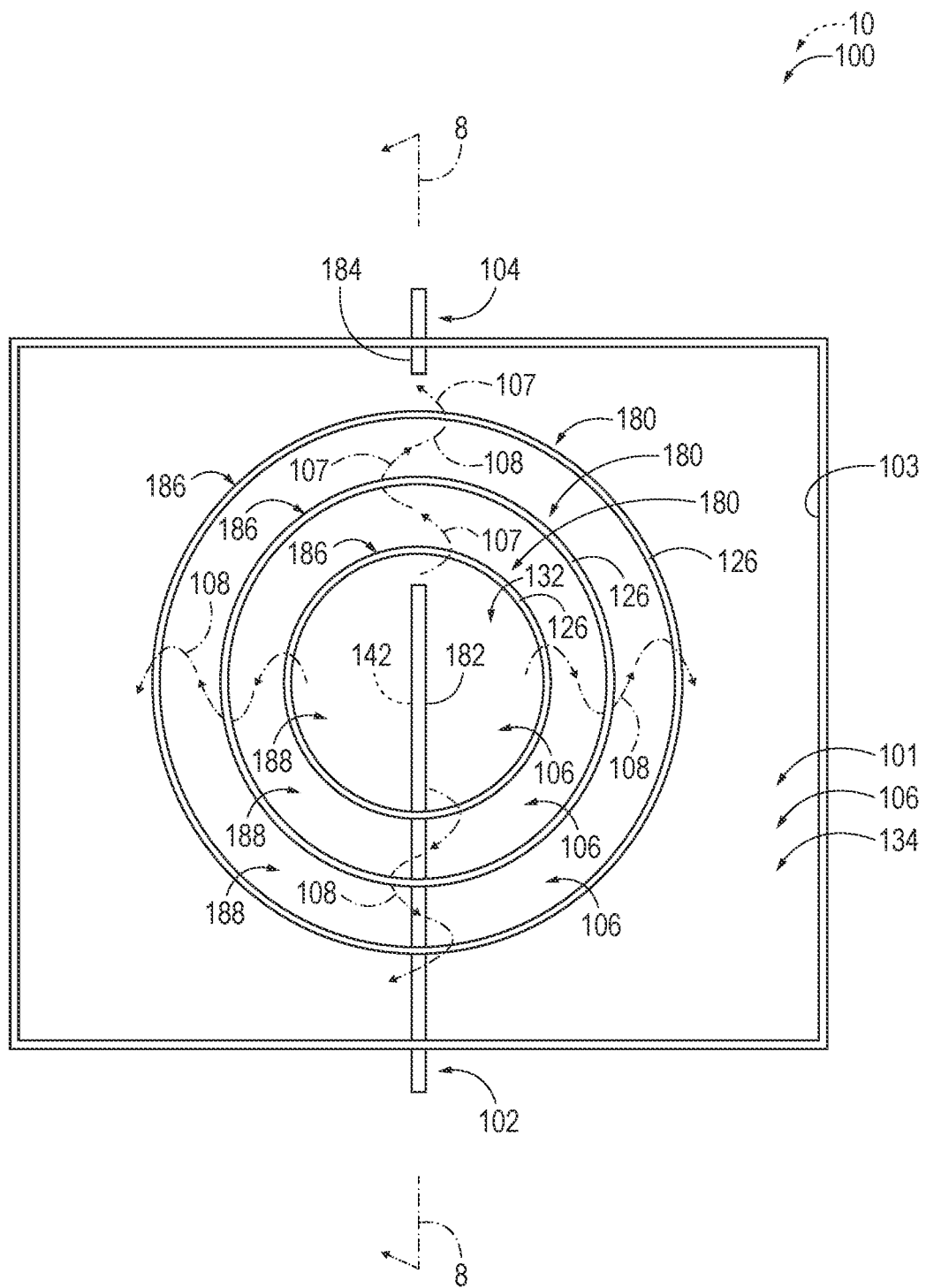
FIG. 7 is a schematic plan view showing examples of wastewater processing containers comprising ducted flow-deflecting baffles arranged in a concentric configuration according to the present disclosure.
Figure 8:
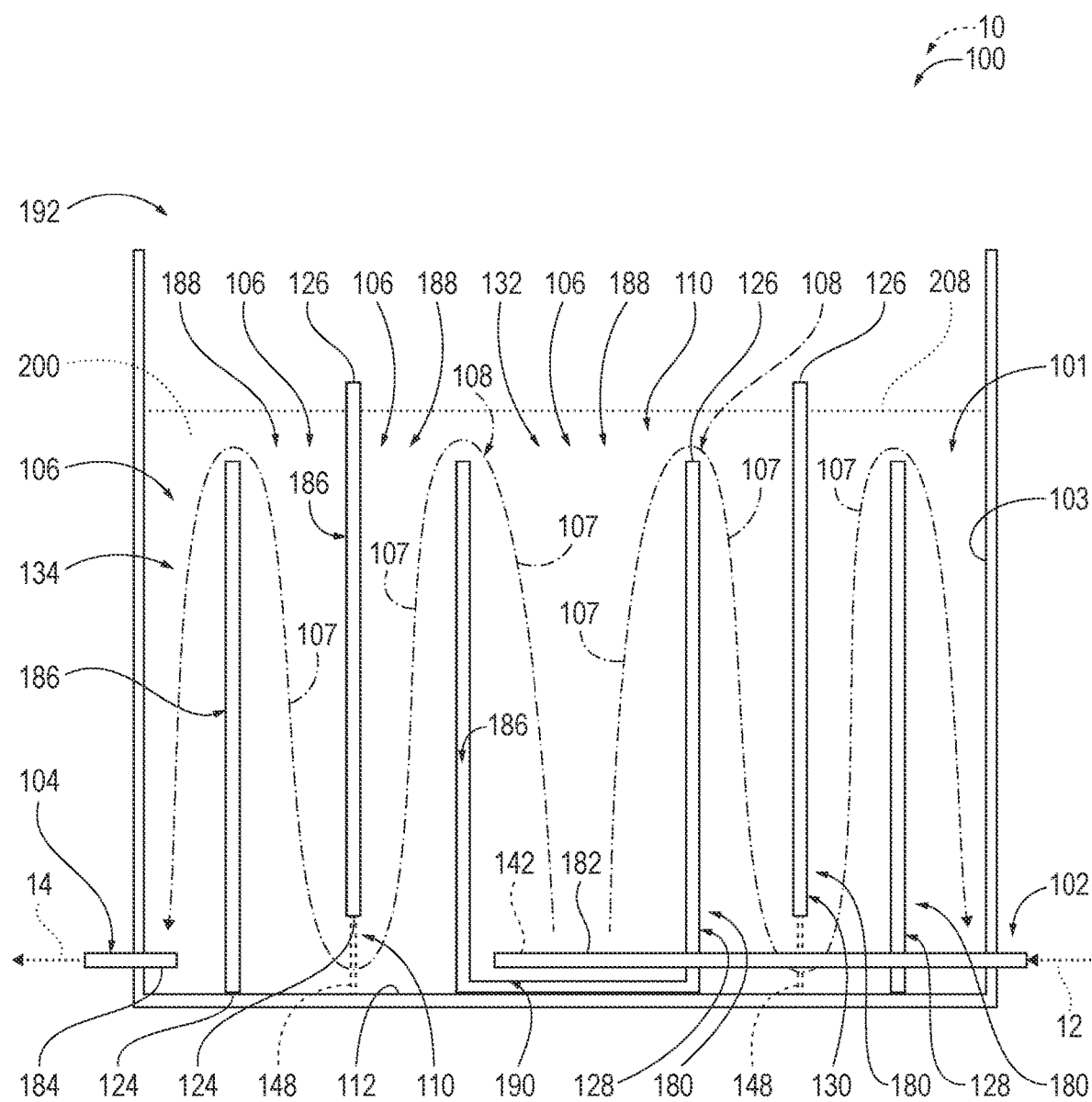
FIG. 8 is a schematic cross-sectional view of the examples of wastewater processing containers of FIG. 7.

FIGS. 7-8 illustrate an example of a wastewater processing container 100 that includes a plurality of ducted flow-deflecting baffles 180 that are arranged in a concentric configuration fluidly between the inlet assembly 102 and the outlet assembly 104. More specifically, FIG. 7 is a schematic plan view of the example wastewater processing container 100, and FIG. 8 is a schematic cross-sectional view of the example wastewater processing container 100 taken along the line 8-8 shown in FIG. 7. With reference to the example of FIGS. 7-8, wastewater processing container 100 comprises three ducted flow-deflecting baffles 180 that divide interior volume 101 into four fluidly connected sections 106. More specifically, wastewater processing container 100 includes a first ducted flow-deflecting baffle 180 that is positioned within the baffle interior volume 188 of a second ducted flow-deflecting baffle 180, and a third ducted flow-deflecting baffle 180 that encircles the first and second ducted flow-deflecting baffles 180. In other words, the first and second ducted flow-deflecting baffles 180 are positioned within the baffle interior volume 188 of the third ducted flow-deflecting baffle 180.

In this example, inlet assembly 102 includes a single inlet 182 that is configured to receive wastewater 12 into baffle interior volume 188 of the first ducted flow-deflecting baffle 180 such that wastewater 12 only flows into interior volume 101 via baffle interior volume 188 of the first ducted flow-deflecting baffle 180. As an example, inlet assembly 102 may include a pipe that extends through each ducted flow-deflecting baffle 180 with an end or an end region thereof being positioned within baffle interior volume 188 of the first ducted flow-deflecting baffle 180 and optionally comprising inlet flow distributer 142. The first ducted flow-deflecting baffle includes closed end 190 that is positioned adjacent to, and optionally supported by, base side 112 of interior surface 103. Inlet 182 is positioned to flow wastewater 12 into the baffle interior volume 188 adjacent to closed end 190. Base-opposed edge 126, and correspondingly passageway 110, of the first ducted flow-deflecting baffle 180 is positioned adjacent to waterline 208, such that the first ducted flow-deflecting baffle 180 forms an upward flow-deflecting baffle 128.

Unlike the first ducted flow-deflecting baffle 180, the second and third ducted flow-deflecting baffles 180 do not include closed end 190. Base-opposed edge 126 of the second ducted flow-deflecting baffle 180 is positioned above waterline 208 such that wastewater 12 is prevented from flowing over base-opposed edge 126 of the second ducted flow-deflecting baffle 180. At least a portion of base edge 124 of the second ducted flow-deflecting baffle 180 is supported spaced apart from base side 112 of interior surface 103 such that passageway 110 of the second ducted flow-deflecting baffle 180 is defined between base edge 124 and base side 112 of interior surface 103. Accordingly, the second ducted flow-deflecting baffle 180 forms a downward flow-deflecting baffle 130. The second ducted flow-deflecting baffle 180 may include a plurality of legs 148 that project downwardly from the remainder of base edge 124 to support the second ducted flow-deflecting baffle 180 on base side 112. In other words, passageway 110 of the second ducted flow-deflecting baffle 180 may include a plurality of apertures that are defined between legs 148 and base side 112.

The third ducted flow-deflecting baffle 180 is configured to form an upward flow-deflecting baffle 128. More specifically, base edge 124 is mated against base side 112 of interior surface 103 to restrict wastewater 12 from passing therebetween, and base-opposed edge 126 of the third ducted flow-deflecting baffle 180 is positioned adjacent to, and below, waterline 208 such that passageway 110 of the third ducted flow-deflecting baffle 180 is defined between base-opposed edge 126 and waterline 208, or over base-opposed edge 126.

The diameter of the third ducted flow-deflecting baffle 180 is greater than the diameter of the second ducted flow-deflecting baffle 180, which is greater than the diameter of the first ducted flow-deflecting baffle 180. The diameter of the third ducted flow-deflecting baffle 180 is less than the width and the length of the interior volume 101 such that a portion of interior volume 101 is confined between interior surface 103 and closed sidewall 186 of the third ducted flow-deflecting baffle 180. Outlet assembly 104 comprises an outlet 184 that is positioned adjacent to base side 112 and configured to exhaust processed water 14 from the portion of interior volume 101 that is confined between interior surface 103 and closed sidewall 186 of the third ducted flow-deflecting baffle 180

In view of the above, baffle interior volume 188 of the first ducted flow-deflecting baffle 180 corresponds to inlet fluidly connected section 132. The second fluidly connected section 106 is formed between closed sidewalls 186 of the first and second ducted flow-deflecting baffles 180, the third fluidly connected section 106 is formed between closed sidewalls 186 of the second and third ducted flow-deflecting baffles 180, and outlet fluidly connected section 134 is defined between closed sidewall 186 of the third ducted flow-deflecting baffle 180 and interior surface 103.

Each ducted flow-deflecting baffle 180 may be described as being configured to channel wastewater 12 along a plurality of circuitous bulk flow paths 107 between the adjacent fluidly connected sections 106. Ducted flow-deflecting baffles 180 are arranged with the downward flow-deflecting baffle 130 positioned fluidly between the two upward flow-deflecting baffles 128. Accordingly, ducted flow-deflecting baffles 180 may be described as channeling wastewater 12 to flow along a plurality of serpentine flow paths 108 between inlet 182 and outlet 184 that include the plurality of circuitous bulk flow paths 107 corresponding to each ducted flow-deflecting baffle 180.

While FIGS. 7-8 illustrate an example in which the third ducted flow-deflecting baffle does not include a closed end 190, in other examples, the third ducted flow-deflecting baffle 180 may comprise a closed end 190 that is positioned adjacent to, and optionally supported by, base side 112. In such examples, the first and second ducted flow-deflecting baffles 180 are supported on closed end 190 of the third ducted flow-deflecting baffle 180 in a similar manner to that discussed herein for base side 112.

For examples in which the example wastewater processing container 100 of FIGS. 7-8 is comprised in wastewater processing module 10, purification medium 200 may fill each fluidly connected section 106, and a plant community 214 thereof may grow out of the atmospherically open top 192 of wastewater processing container 100, as discussed herein.

Figure 9:
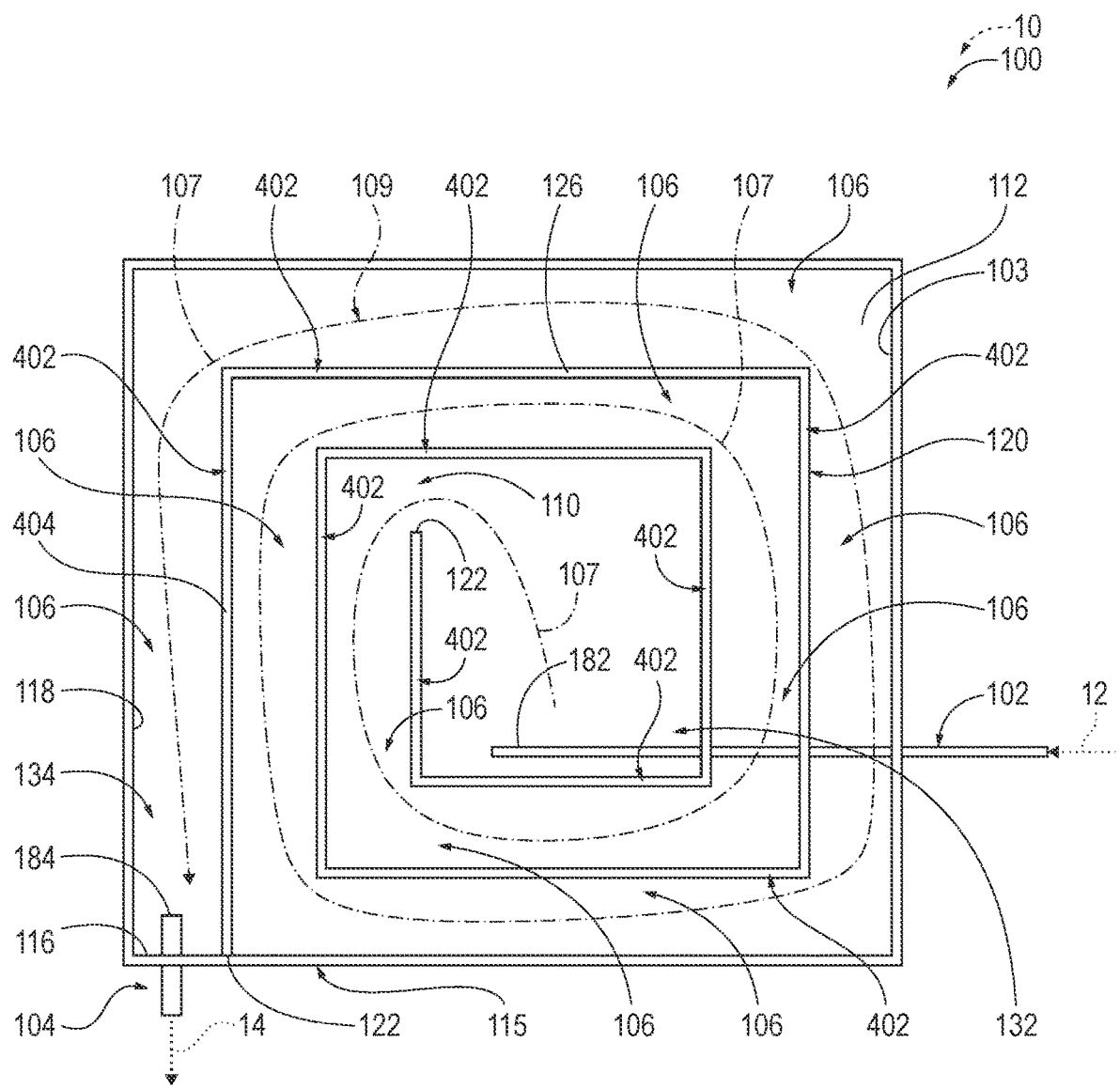
FIG. 9 is a schematic plan view showing examples of wastewater processing containers comprising a flow-deflecting baffle having a spiral configuration according to the present disclosure.

FIG. 9 is a schematic plan view illustrating an example wastewater processing container 100. More specifically, FIG. 9 illustrates an example of a wastewater processing container 100 that comprises a single flow-deflecting baffle 120 having a spiral-like shape. In the example of FIG. 9, the base edge of flow-deflecting baffle 120 is mated against base side 112 of interior surface 103 to restrict wastewater 12 from passing therebetween, and base-opposed edge 126 is positioned above the waterline such that wastewater 12 is restricted from flowing over base-opposed edge 126. Outlet assembly 104 includes a single outlet 184 that extends through a sidewall 115 of wastewater processing container 100 to exhaust processed water 14 from adjacent to a corresponding outlet side 116 of interior surface 103, or from a peripheral region of interior volume 101. Flow-deflecting baffle 120 includes a first lateral edge 122 that is mated against the outlet side 116 of interior surface 103 through which outlet 184 extends.

Flow-deflecting baffle 120 may be regarded as including a plurality of baffle portions 402. Baffle portions 402 include an outlet-adjacent baffle portion 404 that extends from the first lateral edge 122 away from the outlet side 116 through which outlet 184 extends. Outlet-adjacent baffle portion 404 also extends spaced apart from and at least partially, and optionally at least substantially, parallel to the lateral side 118 that intersects outlet side 116. Accordingly, outlet-adjacent baffle portion 404 forms outlet fluidly connected section 134 with interior surface 103 of wastewater processing container 100.

Flow-deflecting baffle 120 further includes a series of additional baffle portions 402 that extend in an end-to-end relationship and intersect one another at approximately 90 degrees. A first of the additional baffle portions 402 intersects outlet-adjacent baffle portion 404 at approximately 90 degrees. Collectively, baffle portions 402 revolve around and iteratively towards the center of interior volume 101 with fluidly connected sections 106 being formed between adjacent and parallel baffle portions 402 and between baffle portions 402 and the sides of interior surface 103. Inlet assembly 102 includes an inlet 182 that is configured to receive wastewater 12 into a central region of interior volume 101. The four inner-most baffle portions 402 of flow-deflecting baffle 120 encircle inlet 182 to define inlet fluidly connected section 132 therebetween. Flow-deflecting baffle 120 terminates in the second lateral edge 122, which is spaced apart from an opposing baffle portion 402 to form passageway 110 therebetween that permits wastewater 12 to flow from inlet fluidly connected section 132 into an adjacent fluidly connected section 106.

Accordingly, flow-deflecting baffle 120 is positioned fluidly between inlet 182 and outlet 184. Flow-deflecting baffle 120 is configured to channel wastewater 12 to flow along a plurality of circuitous bulk flow paths 107 between inlet 182 and outlet 184 that collectively form a spiral flow path 109. While FIG. 9 illustrates an example in which flow-deflecting baffle 120 includes a plurality of baffle portions 402 that extend at discrete angles relative to one another, flow-deflecting baffles 120 with spiral configurations according to the present disclosure additionally or alternatively may be formed in a smooth or continuous spiral pattern and operate similarly to that discussed herein with respect to the specific example of FIG. 9. It also is within the scope of the present disclosure that the location of inlet 182 and outlet 184 shown in FIG. 9 may be switched with flow-deflecting baffle 120 operating in a similar manner to that discussed herein respect to the specific example of FIG. 9.

Figure 10:
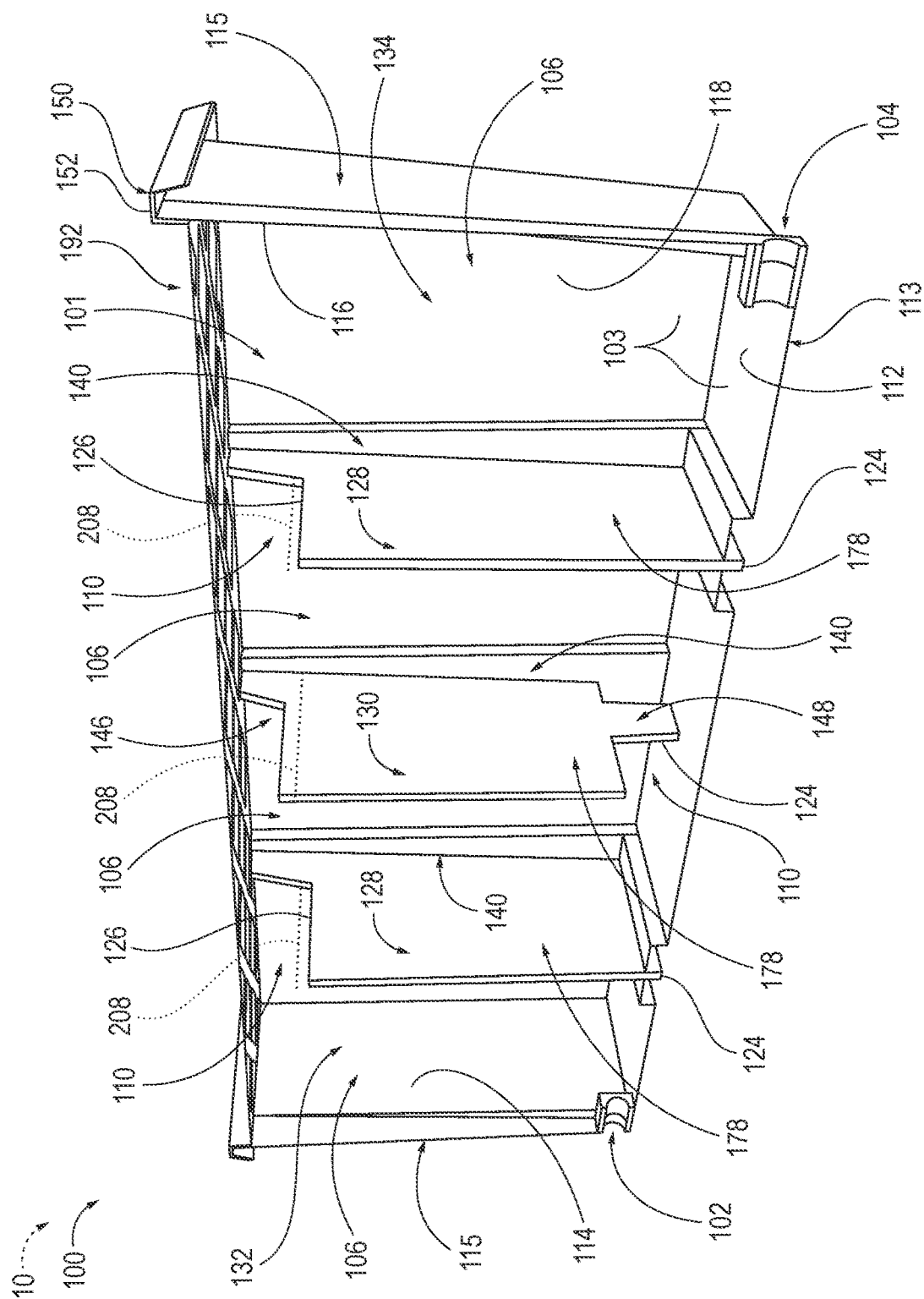
FIG. 10 is a cross-sectional isometric view showing somewhat less-schematic examples of wastewater processing containers according to the present disclosure.

FIG. 10 is an isometric cross-sectional view showing an example of a wastewater processing container 100 that comprises a plurality of gate flow-deflecting baffles 178. As shown, wastewater processing container 100 includes base 113 and a plurality of sidewalls 115 that collectively include interior surface 103. Base 113 is configured to support wastewater processing container 100 on a support surface, and sidewalls 115 extend upwardly from base 113 to surround interior volume 101. Inlet 182 extends through inlet side 114 of interior surface 103 adjacent to base side 112 of interior surface 103, and outlet 184 extends through outlet side of 116 of interior surface 103 adjacent to base side 112.

Gate flow-deflecting baffles 178 partition interior volume 101 into fluidly connected sections 106. In particular, gate flow-deflecting baffles 178 include a first upward flow-deflecting baffle 128 that forms inlet fluidly connected section 132 with inlet side 114, and a second upward flow-deflecting baffle 128 that forms outlet fluidly connected section 134 with outlet side 116. Gate flow-deflecting baffles 178 further include downward flow-deflecting baffle 130 that interposes upward flow-deflecting baffles 128 and forms two fluidly connected sections 106 therewith. As shown, passageway 110 of downward flow-deflecting baffle 130 is defined adjacent to, or with, base side 112. Passageways 110 of upward flow-deflecting baffles 128 are defined along the base-opposed edge 126 thereof. Downward flow-deflecting baffle 130 further includes a weir feature 146 that is configured to permit wastewater 12 to flow between the adjacent fluidly connected sections 106 separated by downward flow-deflecting baffle 130 when the level of wastewater 12 within interior volume 101 exceeds the desired waterline 208.

Wastewater processing container 100 further includes baffle receivers 140 that receive and position flow-deflecting baffles 120 in the orientation shown in FIG. 10 and discussed herein. In particular, baffle receivers 140 that receive upward flow-deflecting baffles 128 include a race or a slot that extends along lateral sides 118 and base side 112 of interior surface 103. In this way, upward flow-deflecting baffles 128 form a complete barrier across interior volume 101 up to base-opposed edge 126 thereof, where at least a portion of base-opposed edge 126 is positioned below the desired waterline 208. Conversely, baffle receiver 140 that receives downward flow-deflecting baffle 130 supports downward flow-deflecting baffle 130 such that a portion of the base edge 124 thereof is spaced apart from base side 112. In this example, downward flow-deflecting baffle 130 also includes legs 148 that contact base side 112 and support the remainder of base edge 124 spaced apart from base side 112.

Wastewater processing container 100 further includes a lid 150 that is configured to be selectively received on and removed from a rim 152 of wastewater processing container 100. Lid 150 includes a perforated, grated, or latticed structure such that lid 150 does not seal interior volume 101 and may permit the plant community discussed herein to grow upwardly and out of interior volume 101. Accordingly, wastewater processing container 100 may be regarded as comprising an atmospherically open top 192 even with lid 150 received thereon. Lid 150 also may be configured to engage a peripheral portion of base-opposed edges 126 of gate flow-deflecting baffles 178 to aid in retaining gate flow-deflecting baffles 178 within baffle receivers 140.

Figure 11:
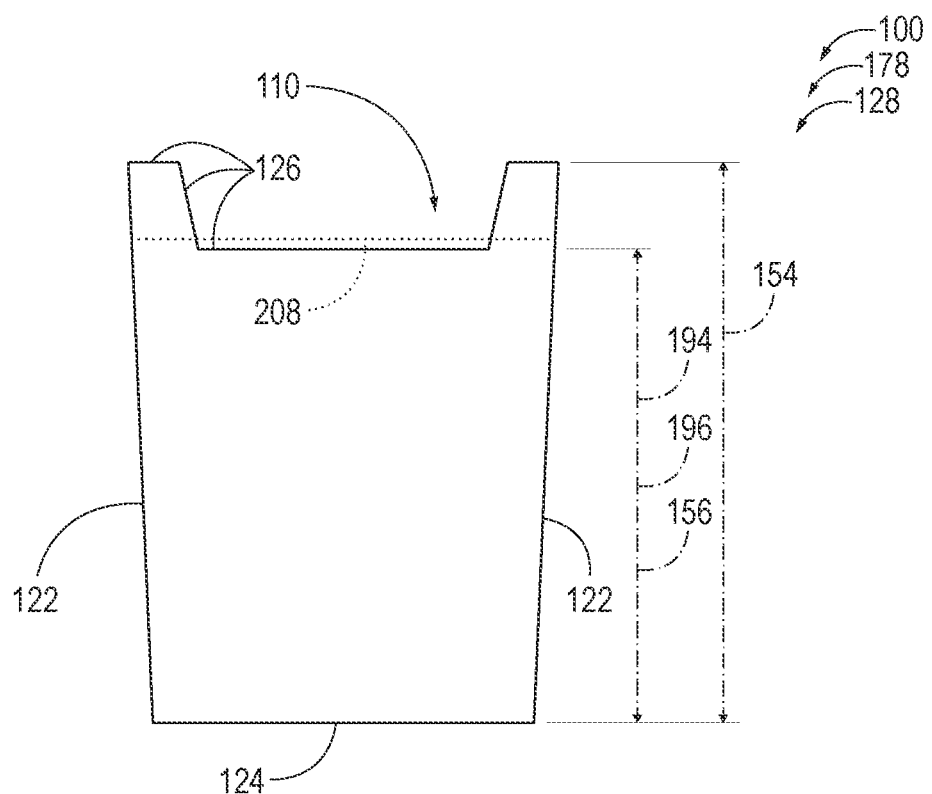
FIG. 11 is an elevation view showing a somewhat less schematic example of an upward flow-deflecting baffle of a wastewater processing container according to the present disclosure.
Figure 12:
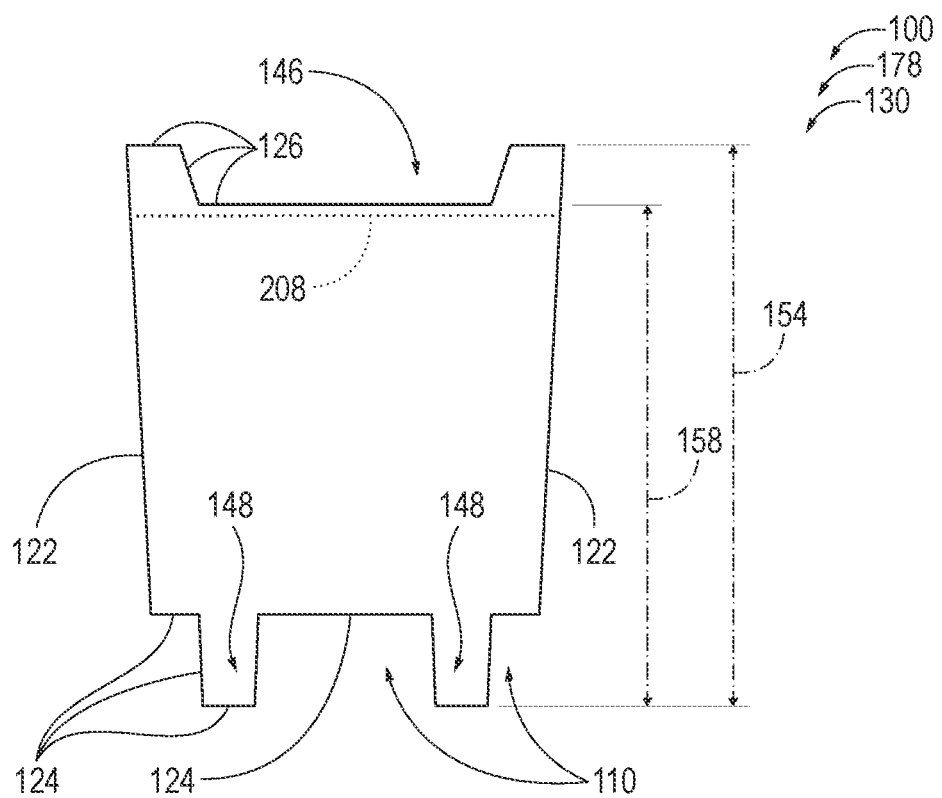
FIG. 12 is an elevation view showing a somewhat less schematic example of a downward flow-deflecting baffle of a wastewater processing container according to the present disclosure.

Turning to FIGS. 11 and 12, FIG. 11 is an elevation view showing an example of the upward flow-deflecting baffles 128 of FIG. 10, and FIG. 12 is an elevation view showing an example of the downward flow-deflecting baffle 130 of FIG. 10. As shown in FIGS. 11 and 12, each gate flow-deflecting baffle 178 includes a generally trapezoidal shape with the lateral edges 122 thereof being tapered towards base edge 124 such as to match the cross-sectional profile of the interior surface of wastewater processing container 100. Gate flow-deflecting baffles 178 may be constructed with a height 154 that is measured between portions of base edge 124 and base-opposed edge 126 that are distal to one another. Height 154 may correspond to the depth of the interior volume of wastewater processing container 100. In other words, upward flow-deflecting baffle 128 and downward flow-deflecting baffle 130 may be constructed with the same height 154.

In FIG. 11, base edge 124 of upward flow-deflecting baffle 128 is planar such as to form a barrier across the entirety of the base side of the interior surface of wastewater processing container 100. A central portion of base-opposed edge 126 is recessed towards base edge 124 to create passageway 110 of upward flow-deflecting baffle 128. The separation between base edge 124 and base-opposed edge 126 may define a threshold operating water level 156 within wastewater processing container 100. Threshold operating water level 156 may correspond to, or define, the waterline height 194 of waterline 208. The threshold operating water level 156 also may define the maximal transverse dimension 196 discussed herein, In FIG. 12, downward flow-deflecting baffle 130 includes legs 148 that form a portion of base edge 124 and that protrude further from base-opposed edge 126 than the remainder of base edge 124. Passageway 110 of downward flow-deflecting baffle 130 is defined between and laterally to the outside of legs 148. A central portion of base-opposed edge 126 is recessed towards base edge 124 to create weir feature 146. The separation between the distal ends of legs 148 and base-opposed edge 126 along weir feature 146 may define an overflow water level 158 within wastewater processing container 100. Overflow water level 158 is greater than threshold operating water level 156 and greater than the desired waterline 208. As such, wastewater only may flow over weir feature 146 under overflow conditions. In other words, downward flow-deflecting baffle 130 is dimensioned such that wastewater 12 does not flow over weir feature 146 under normal, or desired, operating conditions.

Figure 13:
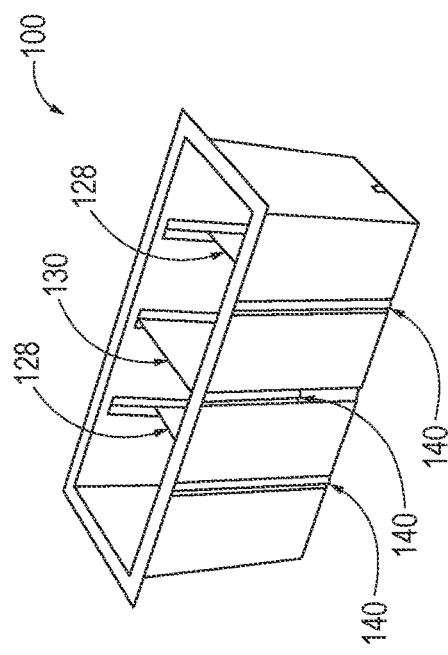
FIG. 13 is an isometric view showing a somewhat less schematic example of a wastewater processing container according to the present disclosure.
Figure 15:
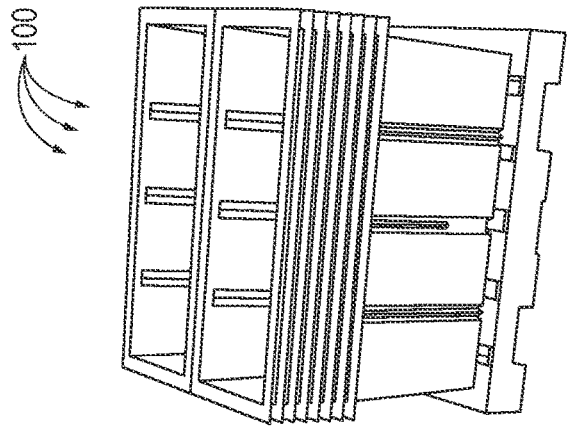
FIG. 15 is an isometric view showing an example of a plurality of the example wastewater processing containers of FIG. 13 in a stacked configuration.
Figure 14:
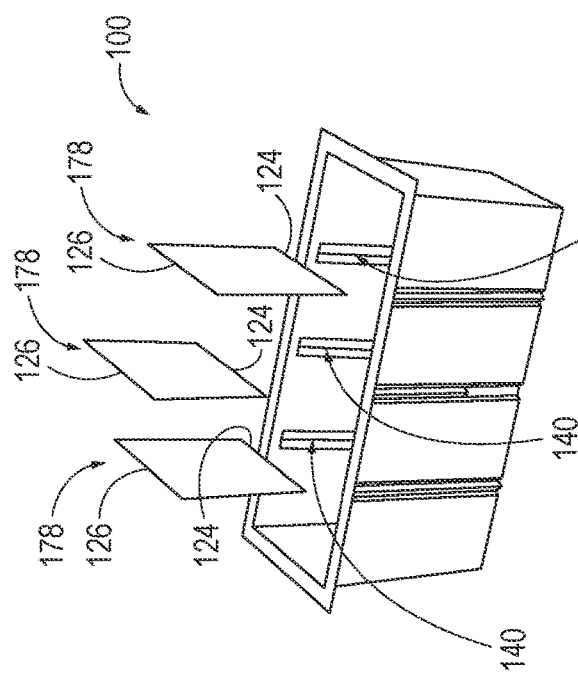
FIG. 14 is an isometric exploded view of the example wastewater processing container of FIG. 13.

FIGS. 13-15 are isometric views showing another example of wastewater processing container 100 according to the present disclosure. In particular, FIGS. 13-14 illustrate an example of wastewater processing container 100 that includes baffle receivers 140 and in which gate flow-deflecting baffles 178 are configured to be selectively received in and removed from baffle receivers 140. In this example, base edge 124 and base-opposed edge 126 of gate flow-deflecting baffles 178 are planar, and gate flow-deflecting baffles 178 may be constructed with the same dimensions.

As shown in FIG. 13, gate flow-deflecting baffles 178 include two upward flow-deflecting baffles 128 and a downward flow-deflecting baffle 130 that interposes upward flow-deflecting baffles 128. Baffle receiver 140 that receives downward flow-deflecting baffle 130 supports downward flow-deflecting baffle 130 spaced further from the base side of wastewater processing container 100. In this position, the base-opposed edge 126 of downward flow-deflecting baffle 130 is positioned higher than that of upward flow-deflecting baffles 128, and base edge 124 is spaced apart from the base side of wastewater processing container 100 to form the passageway therebetween. The baffle receivers 140 that receive upward flow-deflecting baffles 128 support upward flow-deflecting baffles 128 such that base edge 124 thereof is flush with the base side of wastewater processing container 100. As such, the construction of baffle receivers 140 in this example may permit flow-deflecting baffles 120 having the same dimensions to be utilized as upward flow-deflecting baffles 128 and as downward flow-deflecting baffles 130.

FIG. 14 is an exploded view showing gate flow-deflecting baffles 178 selectively removed from baffle receivers 140, and FIG. 15 illustrates an example of a plurality of wastewater processing containers 100 stacked within one another with gate flow-deflecting baffles 178 removed from the baffle receivers 140 thereof. The stacked configuration shown in FIG. 15 additionally or alternatively may be referred to as a transport configuration and/or condensed configuration.

Figure 16:
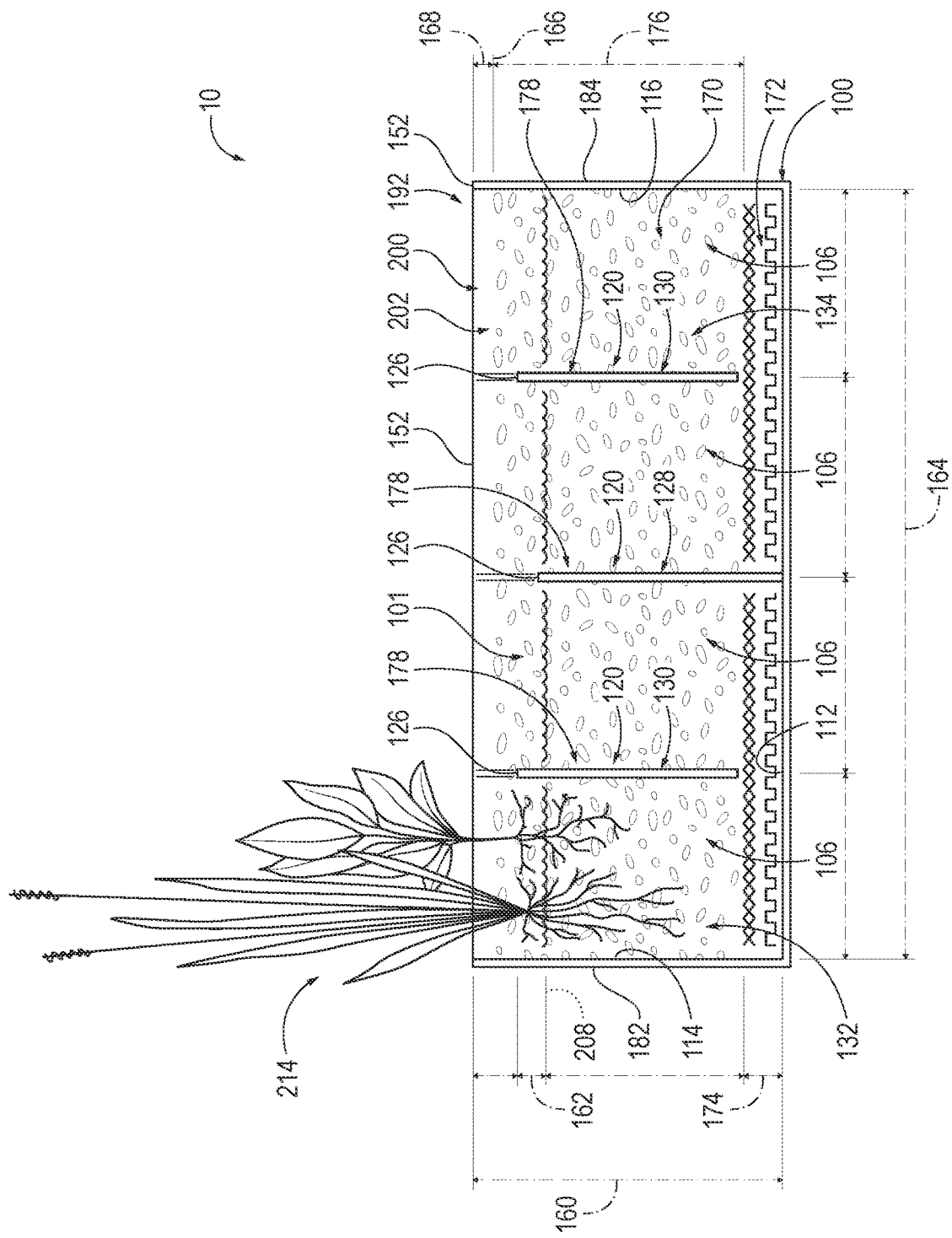
FIG. 16 is a cross-sectional view showing somewhat less schematic examples of wastewater processing modules according to the present disclosure.

FIG. 16 is a cross-sectional view showing examples of wastewater processing modules 10 according to the present disclosure. As shown in FIG. 16, wastewater processing module 10 includes wastewater processing container 100 defining interior volume 101 and having flow-deflecting baffles 120 in the form of gate flow-deflecting baffles 178 that separate interior volume 101 into fluidly connected sections 106. In this example, wastewater processing container 100 includes two downward flow-deflecting baffles 130 that respectively form inlet fluidly connected section 132 and outlet fluidly connected section 134. An upward flow-deflecting baffle 128 interposes downward flow-deflecting baffles 130. Thus, in these examples, the inlet(s) 182 and the outlet(s) 184 of wastewater processing container 100 may be spaced apart from base side 112 thereof and/or may be positioned adjacent to rim 152 of wastewater processing container 100.

Wastewater processing container 100 includes a depth 160, which is measured between base side 112 and rim 152. As examples, depth 160 may be in the range of at least 30 centimeters (cm), at least 40 cm, at least 50 cm, at least 60 cm, at most 50 cm, at most 60 cm, and/or at most 100 cm. Upward flow-deflecting baffle 128 extends upwardly from base side 112 to waterline 208, and a flux zone 162 is defined between base-opposed edge 126 of upward flow-deflecting baffle 128 and base-opposed edges 126 of downward flow-deflecting baffles 130. The thickness of flux zone 162 may be measured parallel to depth 160. As examples, the thickness of flux zone 162 may be at least 1 cm, at least 2 cm, at least 3 cm, at least 4 cm, at most 2 cm, at most 3 cm, at most 4 cm, and/or at most 10 cm. Wastewater processing container 100 also includes a length 164 that is measured between inlet side 114 and outlet side 116. Examples of suitable lengths 164 include at least 0.5 meters (m), at least 0.75 m, at least 1 m, at least 1.2 m, at least 1.5 m, at least 2 m, at most 1 m, at most 1.2 m, at most 1.3 m, at most 1.5 m, at most 2 m, and/or at most 3 m. In this example, flow-deflecting baffles 120 are evenly spaced apart between inlet side 114 and outlet side 116 such that fluidly connected sections 106 are of equal length.

Purification medium 200 includes particulate material 202 that fills interior volume 101 up to a particulate material height 166 that is above waterline 208 and spaced apart from rim 152 by an airspace 168. Particulate material 202 includes a pumice layer 170 that includes pumice particles as a majority component, and a drain layer 172 that may include larger particles and/or a drainage mat. Drain layer 172 may reduce backpressure within wastewater processing module 10. Pumice layer 170 may include a pumice layer thickness 176 that is measured parallel to depth 160. As examples, pumice layer thickness 176 may be at least 60%, at least 70%, at least 80%, at least 90%, at most 80%, at most 90%, and/or at most 95% of depth 160. Similarly, drain layer 172 may have a drain layer thickness 174 that is at least 5%, at least 10%, at least 12%, at least 15%, at most 15%, and/or at most 20% of depth 160.

As further shown in FIG. 16, purification medium 200 further includes plant community 214 that is supported on particulate material 202 and that grows out of atmospherically open top 192 of interior volume 101. The plants of plant community 214 form roots within particulate material 202 that extend below waterline 208. While FIG. 16 shows plant community 214 as being in only one of the plurality fluidly connected sections 106, in other examples, plant community 214 is installed in more than one, and optionally each, fluidly connected section 106.

While FIGS. 10-16 provide examples of wastewater processing containers 100 and wastewater processing modules 10 that comprise flow-deflecting baffles 120 in the form of gate flow-deflecting baffles 178, it should be understood that the features, functions, components, dimensions, etc. of wastewater processing modules 10 and wastewater processing containers 100 discussed herein with respect to FIGS. 10-16 also may be applied to wastewater processing containers 100 and wastewater processing modules 10 that include other forms of flow-deflecting baffles 120, including the ducted flow-deflecting baffles discussed herein.

Figure 17:
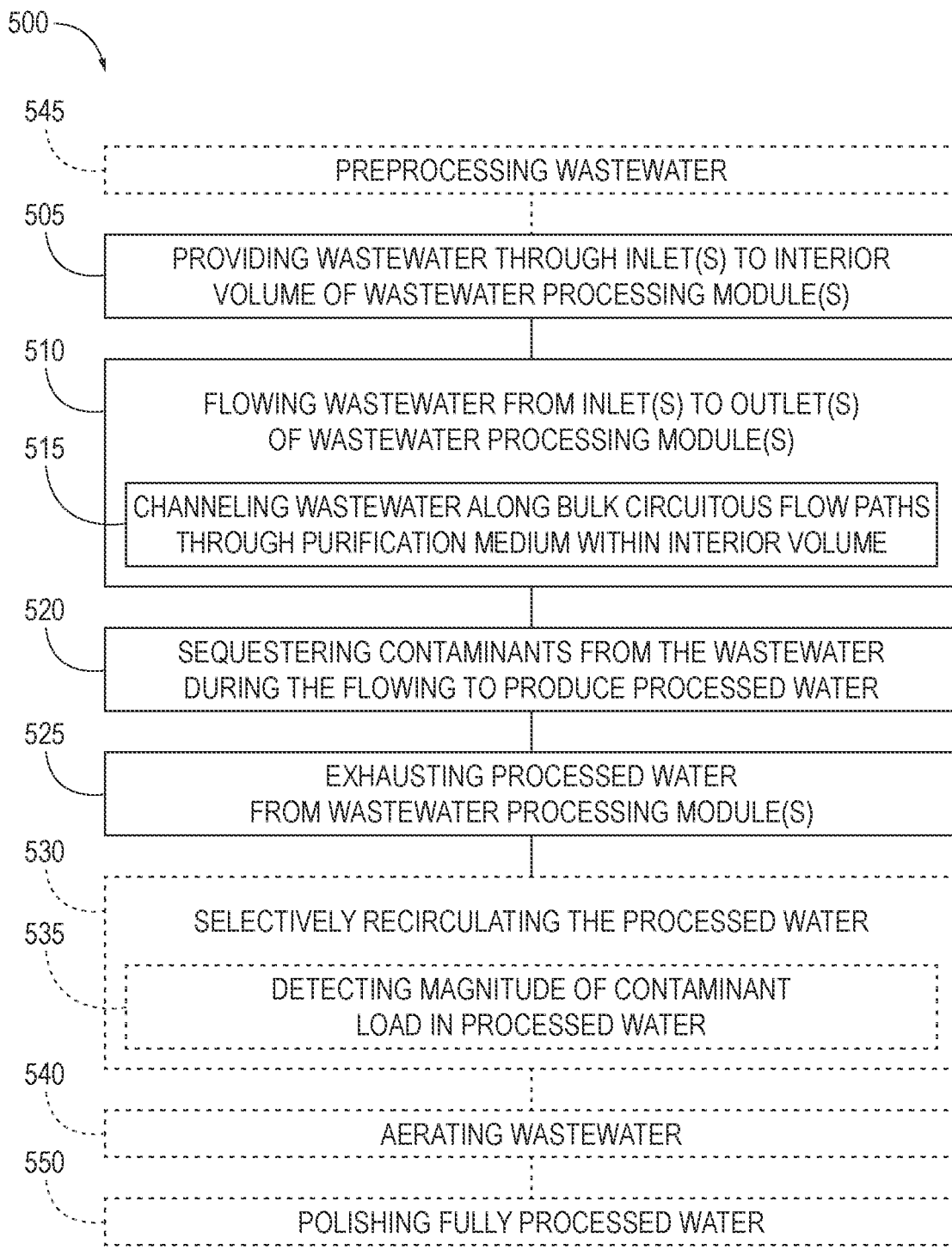
FIG. 17 is a flowchart schematically representing examples of methods according to the present disclosure.

FIG. 17 illustrates examples of methods 500 of processing wastewater according to the present disclosure. In FIG. 17, some steps are illustrated in dashed boxes, indicating that such steps may be optional or may correspond to an optional version of methods 500. That said, not all methods 500 are required to include the steps that are illustrated in solid boxes. The methods and steps of FIG. 17 are not limiting, and other methods and steps are within the scope of the present disclosure, including methods having greater than or fewer than the number of steps illustrated, as understood from the discussion herein.

Each step or portion of methods 500 may be performed utilizing wastewater processing modules 10 and/or wastewater treatment systems 90 and/or portions thereof that are illustrated and discussed herein with reference to FIGS. 1-16. Likewise, any of the any of the features, functions, structures, configurations, characteristics, properties, variants, options, etc. of wastewater processing modules 10, wastewater treatment systems 90, and/or portions thereof that are discussed herein with reference to FIG. 17 and methods 500 may be included in and/or utilized with wastewater processing modules 10 and/or wastewater treatment systems 90 according to FIGS. 1-16 without requiring inclusion of all such features, functions, structures, configurations, characteristics, properties, variants, options, etc.

As shown in FIG. 17, methods 500 include providing 505 wastewater through at least one inlet to an interior volume of a wastewater processing module and flowing 510 wastewater from the inlet(s) to at least one outlet of the wastewater processing module. The flowing 510 includes channeling wastewater along a plurality of reciprocated, or circuitous, flow paths through purification medium within the interior volume. Methods 500 further include sequestering 520 contaminants from the wastewater and exhausting 525 processed water from the wastewater processing module. Methods 500 may include selectively recirculating 530 the processed water, which may include detecting 535 a magnitude of a contaminant load in the processed water. Methods 500 also may include aerating 540 the wastewater, preprocessing 545 the wastewater, and/or polishing 550.

The providing 505 includes providing wastewater 12 through at least one inlet 182 of an inlet assembly 102 of a wastewater processing module 10 into an interior volume 101 of the wastewater processing module 10. As discussed herein, the wastewater processing module 10 includes at least one flow-deflecting baffle 120 that divides the interior volume 101 into a plurality of fluidly connected sections 106 and a purification medium 200 filling each fluidly connected section. Wastewater processing module 10 may include an atmospherically open top 192.

The providing 505 may include providing the wastewater 12 from a wastewater source 30 and/or from a plurality of wastewater sub-sources 32 thereof. The providing 505 also may include providing the wastewater 12 from a holding tank 40 that contains a volume of the wastewater 12, as discussed herein. The providing 505 also may include utilizing a pump 50 to flow the wastewater 12 from the holding tank 40 and/or sub-sources 32 to the inlet assembly 102. The providing 505 also may include applying a suitable pressure to the wastewater 12, such as utilizing the pump 50, to flow the wastewater through the purification medium 200 to exhaust the processed water through an outlet assembly 104, which includes at least one outlet 184.

As discussed, wastewater treatment system 90 may include a plurality of wastewater processing modules 10, which may be fluidly connected in series and/or in parallel. In such examples, the providing 505 may include providing wastewater 12 through the inlet(s) 182 of each wastewater processing module. More specifically, for examples in which the wastewater processing modules 10 are connected in parallel, the providing 505 may include providing wastewater 12 directly through the inlet(s) 182 of each wastewater processing module 10. For examples in which the wastewater processing modules 10 are connected in series, the providing 505 may include providing wastewater 12 through the inlet(s) 182 of upstream-most wastewater processing module(s) 10, receiving processed water 14 from the outlet(s) 184 of the upstream-most wastewater processing module(s) and through the inlet(s) 182 of a wastewater processing module 10 immediately downstream thereto, and optionally repeating this process for any subsequent downstream wastewater processing modules 10. In other words, the providing 505 may include providing wastewater 12 to upstream-most wastewater processing modules 10 and providing processed water 14 to each wastewater processing module 10 downstream thereto.

The providing 505 may be performed prior to or at least substantially simultaneously with flowing 510, sequestering 520, exhausting 525, and/or recirculating 530.

Methods 500 further include flowing 510 the wastewater from the inlet(s) to the outlet(s) of the wastewater processing module. For examples in which the wastewater treatment system 90 includes a plurality of wastewater processing modules 10, the flowing 510 may be performed for each wastewater processing module 10. For examples in which the wastewater processing modules are connected in series, the flowing 510 may include flowing 510 the processed water 14 through one or more of the wastewater processing modules 10 in at least substantially the same manner as wastewater 12, as should be understood from the discussion herein.

The flowing 510 includes channeling 515 the wastewater along a plurality of circuitous bulk flow paths through the purification medium 200 within each fluidly connected section 106. The channeling 515 includes channeling the wastewater 12 with the at least one flow-deflecting baffle 120, as discussed herein. The channeling 515 may include channeling the wastewater 12 along any of the circuitous bulk flow paths 107 discussed herein and/or utilizing any one or more of the flow-deflecting baffles 120 discussed herein. As examples, the channeling 515 may include channeling the wastewater with and against a direction of gravity 20, back and forth within the interior volume 101, along one or more serpentine flow paths 108, along a spiral flow path 109, along a plurality of radially diverging circuitous bulk flow paths 107, and/or combinations thereof.

Methods 500 further include sequestering 520, with the purification medium, contaminants from the wastewater during the channeling. The sequestering 520 includes producing processed water 14 from the wastewater 12. More specifically, the sequestering 520 includes reducing the contaminant load in the wastewater 12 via any of the processes discussed herein. For examples in which the wastewater treatment system includes a plurality of wastewater processing modules, the sequestering 520 may be performed respective to each wastewater processing module 10. For examples in which the wastewater processing modules 10 are connected in series, the sequestering may include sequestering contaminants from the processed water 14 received from upstream wastewater processing module(s) 10 and/or reducing the contaminant load from the processed water 14 received from upstream wastewater processing module(s) 10. The sequestering 520 additionally or alternatively may be referred to as purifying 520 the wastewater 12.

Methods 500 yet further include exhausting 525, with the outlet(s) 184 the processed water 14 from the interior volume of the wastewater processing module 10. The exhausting 525 may be performed at least substantially simultaneously with, or subsequent to, the sequestering 520 and/or the flowing 510. For examples in which the wastewater treatment system includes a plurality of wastewater processing modules 10, the exhausting 525 may be performed respective to each wastewater processing module 10.

In some examples, methods 500 include selectively storing wastewater 12 within the wastewater processing module(s) 10, which may include selectively pausing the providing 505, the flowing 510, and the exhausting 525. The selectively storing may be performed based on any suitable criteria, such as responsive to a detection that a volume of purified water 16 in a purified water storage tank 80 exceeds a predetermined volume threshold and/or responsive to a detection that a volume of fully processed water in a fully processed water storage tank 82 exceeds a predetermined volume threshold.

With continued reference to FIG. 17, methods 500 may include selectively recirculating 530 the processed water from the outlet(s) 184 of the wastewater processing module(s) 10 to the holding tank 40. The selectively recirculating 530 may include utilizing the recirculation system 74 and/or the recirculation pump 78 discussed herein. Additionally or alternatively, the selectively recirculating 530 may include utilizing the pump 50 and the one or more siphons discussed herein. The selectively recirculating 530 may include mixing the processed water 14 with wastewater 12 within the holding tank 40.

The selectively recirculating 530 may be performed based on any suitable criteria. As discussed herein, the wastewater treatment system 90 may include purified water storage tank 80 configured to store a volume of purified water 16 and/or fully processed water storage tank 82 configured to store a volume of fully processed water 15. In some examples, the selectively recirculating 530 comprises detecting that a volume of fully processed water 15 in the fully processed water storage tank 82 exceeds a predetermined volume threshold and/or detecting that a volume of purified water 16 in purified water storage tank 80 exceeds a predetermined volume threshold, and recirculating the processed water 14 to the holding tank 40 responsive to such a detection.

Additionally or alternatively, as shown in FIG. 17, the selectively recirculating 530 may include detecting 535 a magnitude of a contaminant load in the processed water and recirculating the processed water to the holding tank responsive to detecting the magnitude of the contaminant load exceeds a predetermined threshold contamination load magnitude, as discussed herein. The detecting 535 may include utilizing one or more contaminant load sensors 76, as discussed herein.

The selectively recirculating 530 additionally or alternatively may include detecting 535 that the magnitude of the contaminant load in the processed water 14 is less than the predetermined threshold contamination load magnitude and flowing the processed water 14 downstream responsive to this detection. In other words, the detecting 535 may include detecting that the processed water 14 is fully processed water 15 and flowing the fully processed water 15 downstream. Similarly, the recirculating 530 may include flowing the processed water 14 downstream responsive to a detection that the volume of fully processed water 15 in the fully processed water storage tank 82 does not exceed a predetermined volume threshold and/or detecting that a volume of purified water 16 in purified water storage tank 80 does not exceed a predetermined volume threshold. For examples in which methods 500 include the storing, methods 500 also may include ceasing the storing and flowing the processed water 14 downstream responsive to similar criteria discussed herein in connection to the recirculating 530.

The flowing the fully processed water 15 downstream may include flowing the fully processed water downstream to the fully processed water storage tank, which may include storing the fully processed water in the fully processed water storage tank. Additionally or alternatively, the flowing the fully processed water 15 downstream may include flowing the fully processed water 15 to a polishing assembly 60.

For examples in which the wastewater treatment system 90 does not include the holding tank 40, the recirculating may include recirculating the processed water 14 to the inlet(s) 182 of the wastewater processing module(s) 10 or to the inlet(s) 182 of the upstream-most wastewater processing module(s) 10.

With continued reference to FIG. 17, methods 500 also may include aerating 540 the wastewater 12. As discussed herein, the aerating may include utilizing an aeration system 70, which may be implemented in the wastewater processing module(s) 10 and/or the holding tank 40, as discussed herein. Accordingly, the aerating 540 may be performed during the flowing 510, or within the wastewater processing module(s) 10. Additionally or alternatively, the aerating 540 may be performed in the holding tank 40, such as prior to the providing 505 and/or during the recirculating 530. Thus, the aerating 540 also may include aerating the processed water 14 and/or aerating the processed water 14 mixed with the wastewater 12.

Methods 500 further may include preprocessing 545 the wastewater 12, which may be performed while storing the wastewater 12 within the holding tank 40. The preprocessing 545 may include utilizing the preprocessing system 84 discussed herein. For example, the preprocessing 545 may include removing contaminants from the wastewater 12 by sedimentation, floatation, flocculation, filtration, dissolved air floatation, and/or foam fractionation. The preprocessing 545 may be performed prior to the providing 505 and/or during the recirculating 530. Thus, the preprocessing 545 also may include preprocessing the processed water 14 and/or the processed water 14 mixed with the wastewater 12.

Methods 500 yet further may include polishing 550 the processed water and/or the fully processed water. The polishing 550 may include receiving the fully processed water 15 from the one or more outlet(s) 184, such as responsive to detecting 535 the processed water 14 qualifies as fully processed water 15. For examples in which methods 500 do not include the recirculating 530, the polishing 550 may include receiving processed water 14 from the wastewater processing module(s) 10. The polishing 550 may include utilizing the polishing assembly 60 discussed herein to further purify the fully processed water 15 and/or to produce purified water 16. For example, the polishing 550 may include filtering, such as with the suspension filter 62 or solute filter 64, the fully processed water 15 and/or sanitizing the fully processed water 15, such as with the sanitizer 66. The polishing 550 further may include delivering the purified water 16 to the purified water storage tank 80 and storing the purified water 16 therein. The polishing 550 may be performed subsequent to the recirculating 530, subsequent to the detecting 535, and/or subsequent to the exhausting 525.

Examples of wastewater processing containers 100, wastewater processing modules 10, wastewater treatment systems 90, and methods 500 according to the present disclosure are presented in the following enumerated paragraphs:

A1. A wastewater processing module (10) configured to receive wastewater (12) and purify the wastewater (12) to produce processed water (14) therefrom, the wastewater processing module (10) comprising:

a wastewater processing container (100) defining an interior volume (101) and optionally comprising an atmospherically open top (192), wherein the wastewater processing container (100) is configured to contain a purification medium (200) within the interior volume (101) and to direct flow of the wastewater (12) along a plurality of circuitous bulk flow paths (107) through the purification medium (200), wherein the wastewater processing container (100) comprises:

an inlet assembly (102) comprising at least one inlet (182) that is configured to receive the wastewater (12) into the interior volume (101);

an outlet assembly (104) comprising at least one outlet (184) that is configured to exhaust the processed water (14) from the interior volume (101); and one or more flow-deflecting baffles (120) each being positioned fluidly between the inlet assembly (102) and the outlet assembly (104), wherein the one or more flow-deflecting baffles (120) divide the interior volume (101) into a plurality of fluidly connected sections (106), wherein each flow-deflecting baffle (120) is configured to channel the wastewater (12) to flow along at least one circuitous bulk flow path (107) of the plurality of circuitous bulk flow paths (107) between respective adjacent fluidly connected sections (106) of the plurality of fluidly connected sections (106); and the purification medium (200), wherein the purification medium (200) comprises a particulate material (202) at least partially filling the interior volume (101) and configured to permit flow of the wastewater (12) therethrough, and wherein the purification medium (200) is configured to sequester contaminants from the wastewater (12) as the wastewater (12) flows through the interior volume (101).

A2. The wastewater processing module (10) of paragraph A1, wherein a contaminant load of contaminants in the processed water (14) is less than the contaminant load of the contaminants in the wastewater (12).

A3. The wastewater processing module (10) of any of paragraphs A1-A2, wherein the particulate material is selected to one or more of:

(i) physically adsorb, chemically adsorb, and/or absorb contaminants from the wastewater;

(ii) catalyze decomposition of contaminants in the wastewater;
(iii) provide a substrate for a biological community (210) within the wastewater processing module;
(iv) facilitate sedimentation of suspended contaminants within the wastewater (12); and
(v) buffer pH of the wastewater (12) within the wastewater processing module (10).

A4. The wastewater processing module (10) of any of paragraphs A1-A3, wherein the particulate material (202) comprises a plurality of particles (204) that pack in the interior volume (101) to create a network of fluidly connected voids that permits flow of the wastewater (12) through the particulate material (202).

A5. The wastewater processing module (10) of paragraph A4, wherein each particle (204) of the plurality of particles (204) comprises a particle size, wherein the plurality of particles comprises particles having different particle sizes, and wherein the particle size of at least a substantial portion of the plurality of particles is at least one of:
 at least 0.1 millimeters (mm), at least 0.25 mm, at least 0.5 mm, at least 0.75 mm, at least 1 mm, at least 2 mm, at least 5 mm, at least 7 mm, at least 10 mm, at least 12 mm, at least 14 mm, at least 15 mm, or at least 20 mm; and
 at most 0.25 mm, at most 0.5 mm, at most 0.75 mm, at most 1 mm, at most 2 mm, at most 5 mm, at most 7 mm, at most 10 mm, at most 12 mm, at most 14 mm, at most 15 mm, at most 20 mm, at most 25 mm, at most 30 mm, at most 40 mm, at most 50 mm, or at most 60 mm.

A6. The wastewater processing module of paragraph A5, wherein a total volume of the network of fluidly connected voids increases with an average particle size of the plurality of particles (204), wherein a total surface area of the particulate material (202) decreases with the average particle size of the plurality of particles (204), and optionally wherein the particulate material (202) comprises a selected distribution of particle sizes that maximizes the total surface area of the particulate medium and the total volume of the network of fluidly connected voids.

A7. The wastewater processing module of any of paragraphs A4-A6, wherein the plurality of particles (204) includes one or more of a plurality of coarse-grained particles and a plurality of small-grained particles having a smaller particle size than the plurality of coarse-grained particles.

A8. The wastewater processing module of paragraph A7, wherein the plurality of coarse-grained particles forms a majority component of the plurality of particles (204).

A9. The wastewater processing module (10) of any of paragraphs A7-A8, wherein the plurality of particles comprises an at least substantially evenly dispersed mixture of the plurality of coarse-grained particles and the plurality of small-grained particles.

A10. The wastewater processing module (10) of any of paragraphs A7-A9, wherein the particle size of each coarse-grained particle of the plurality of coarse-grained particles is:
 at least 2 mm, at least 5 mm, at least 7 mm, at least 10 mm, at least 12 mm, at least 14 mm, at least 15 mm, or at least 20 mm; and
 at most 5 mm, at most 7 mm, at most 10 mm, at most 12 mm, at most 14 mm, at most 15 mm, at most 20 mm, at most 25 mm, at most 30 mm, at most 40 mm, at most 50 mm, or at most 60 mm.

A11. The wastewater processing module (10) of any of paragraphs A7-A10, wherein the particle size of each small-grained particle of the plurality of small-grained particles is at least 0.1 mm, at least 0.25 mm, at least 0.5 mm, at least 0.75 mm, at least 1 mm, at least 2 mm, at most 0.25 mm, at most 0.5 mm, at most 0.75 mm, at most 1 mm, and/or at most 2 mm.

A12. The wastewater processing module (10) of any of paragraphs A4-A11, wherein each particle (204) of the plurality of particles (204) includes a particle type, and wherein the particle type includes one or more of pumice, scoria, vermiculite, granulated activated carbon, perlite, gravel, and expanded clay.

A13. The wastewater processing module (10) of any of paragraphs A4-A12, wherein the plurality of particles (204) comprises a mixture of different particle types.

A14. The wastewater processing module (10) of any of paragraphs A4-A13, wherein the plurality of particles (204) includes a plurality of porous particles, and wherein the plurality of porous particles is configured to increase a/the total volume of the network of fluidly connected voids and increase a/the total surface area of the plurality of particles (204).

A15. The wastewater processing module (10) of paragraph A14, wherein the plurality of porous particles sequesters contaminants from the wastewater (12) via pore occlusion.

A16. The wastewater processing module (10) of any of paragraphs A4-A15, wherein the one or more flow-deflecting baffles (120) divide the purification medium (200) into a plurality of purification sections (206), each being contained within a fluidly connected section (106) of the plurality of fluidly connected sections (106), and wherein the particulate material (202) within at least one purification section (206) of the plurality of purification sections (206) includes at least one of a particle size distribution and a particle type that is different from that of the particulate material (202) within at least one other purification section (206) of the plurality of purification sections (206).

A17. The wastewater processing module (10) of any of paragraphs A1-A16, wherein the purification medium further comprises a/the biological community (210) that is selected to one or more of decompose, immobilize, sequester, and consume contaminants from the wastewater (12).

A18. The wastewater processing module (10) of paragraph A17, wherein the biological community (210) comprises a microbial community (212) at least partially supported by the particulate material (202), and wherein the microbial community optionally is selected to consume contaminants from the wastewater (12) and/or chemically transform contaminants from the wastewater (12) to produce microbial metabolites.

A19. The wastewater processing module (10) of paragraph A18, wherein the microbial community (212) comprises nitrifying microbes selected to oxidize nitrogenous compounds within the wastewater (12) to produce oxidized nitrogenous compounds.

A20. The wastewater processing module (10) of any of paragraphs A18-A19, wherein the microbial community (212) comprises denitrifying microbes selected to decompose a/the oxidized nitrogenous compounds to produce nitrogen gas or nitrous oxide therefrom.

A21. The wastewater processing module (10) of any of paragraphs A17-A20, wherein the biological community (210) further comprises a plant community (214) that is supported by the particulate material (202) and that comprises a plurality of plants that are selected to one or more of sequester contaminants from the wastewater (12) and consume microbial metabolites from the wastewater (12).

A21.1. The wastewater processing module (10) of paragraph A21, wherein the plant community (214) grows out of the atmospherically open top of the wastewater processing container (100).

A22. The wastewater processing module (10) of any of paragraphs A1-A21.1, further comprising an aeration system (70) configured to provide an oxygen-containing gas to the interior volume (101) of the wastewater processing container (100) and to mix the oxygen-containing gas with the wastewater (12) within the interior volume (101).

A23. The wastewater processing module (10) of paragraph A22, wherein the oxygen-containing gas is provided to selectively facilitate microbial growth and/or metabolism within a/the microbial community.

A24. The wastewater processing module (10) of any of paragraphs A22-A23, wherein the aeration system (70) is configured to provide the oxygen-containing gas to a selected subset of the plurality of fluidly connected sections (106).

A25. The wastewater processing module (10) of any of paragraphs A1-A24, wherein during operation the wastewater processing module (10) is configured to maintain the wastewater (12) within the interior volume (101) at a selected contained volume such that the wastewater (12) fills the interior volume (101) to a selected waterline (208) that is within the interior volume (101), wherein the purification medium (200) comprises a submerged purification medium that is below the selected waterline during operation of the wastewater processing module (10), and wherein the wastewater processing module (10) is configured to receive the wastewater (12) and produce the processed water (14) therefrom at a threshold flowrate per unit volume of the submerged purification medium (200), and wherein the threshold flowrate per liter of submerged purification medium (200) is at least one of:
at least 0.2 liters per day, at least 0.3 liters per day, at least 0.4 liters per day, at least 0.5 liters per day, at least 0.55 liters per day, at least 0.6 liters per day, at least 0.65 liters per day, at least 0.7 liters per day, at least 0.8 liters per day, at most 0.4 liters per day, at most 0.5 liters per day, at most 0.55 liters per day, at most 0.6 liters per day, at most 0.65 liters per day, at most 0.7 liters per day, at most 0.8 liters per day, at most 1 liters per day, at most 2 liters per day, and at most 3 liters per day.

A26. The wastewater processing module (10) of any of paragraphs A1-A25, wherein the wastewater processing container (100) is the wastewater processing container of any of paragraphs C1-C37.

B1. A wastewater treatment system (90), comprising:
the wastewater processing module (10) of any of paragraphs A1-A26, wherein the wastewater treatment system (90) is configured to provide the wastewater (12) to the wastewater processing module (10) and receive the processed water (14) from the wastewater processing module (10).

B2. The wastewater treatment system (90) of paragraph B1, further comprising a holding tank (40) configured to store a volume of the wastewater (12), and wherein the wastewater treatment system (90) is configured to selectively provide the wastewater (12) from the holding tank (40) to the wastewater processing module (10).

B3. The wastewater treatment system (90) of any of paragraphs B1-B2, wherein the wastewater treatment system (90) comprises a plurality of the wastewater processing modules (10), wherein the wastewater treatment system (90) is configured to provide the wastewater (12) to the plurality of wastewater processing modules (10) and receive the processed water (14) from the plurality of wastewater processing modules (10).

B4. The wastewater treatment system (90) of paragraph B3, wherein the plurality of wastewater processing modules are fluidly connected in series and/or in parallel with one another.

B5. The wastewater treatment system (90) of any of paragraphs B1-B4, further comprising a recirculation system (74) configured to receive the processed water (14) from the wastewater processing module (10), and optionally from a/the plurality of wastewater processing modules (10), and to selectively recirculate the processed water to the holding tank (40).

B6. The wastewater treatment system (90) of paragraph B5, wherein the recirculation system (74) comprises at least one contaminant load sensor (76) configured to detect a magnitude of a/the contaminant load in the processed water (14), and wherein the recirculation system (74) is configured to selectively recirculate the processed water (14) to the holding tank (40) responsive to detection by the at least one contaminant load sensor (76) that the magnitude of the contaminant load in the processed water (14) exceeds a predetermined threshold contamination load magnitude.

B7. The wastewater treatment system (90) of paragraph B6, wherein the recirculation system (74) is configured to permit downstream flow of the processed water (14) responsive to detection by the at least one contaminant load sensor (76) that the magnitude of the contaminant load in the processed water (14) is less than the predetermined threshold contamination load magnitude.

B8. The wastewater treatment system (90) of any of paragraphs B1-B7, further comprising a preprocessing system (84) configured to apply one or more pretreatment processes to the wastewater (12) within the holding tank (40), wherein the one or more pretreatment processes include at least one of sedimentation, flocculation, filtration, floatation, and foam fractionation.

B9. The wastewater treatment system (90) of any of paragraph B1-B8, further comprising an/the aeration system (70) configured to provide an oxygen-containing gas to the holding tank (40) and to mix the oxygen-containing gas with the wastewater (12) within the holding tank (40).

B10. The wastewater treatment system (90) of any of paragraphs B1-B9, further comprising a controller (92), comprising:
a processing unit;
a memory; and
computer-readable media stored on the memory that, when executed by the processing unit, cause the controller (92) to operate the wastewater treatment system (90) to perform the methods of any of paragraphs D1-D7.

C1. A wastewater processing container (100) for a wastewater processing module (10) that is configured to receive wastewater (12) and produce processed water (14) therefrom, the wastewater processing container (100) comprising:
an interior surface (103) that defines an interior volume (101) and optionally comprises an atmospherically open top (192), wherein the wastewater processing container (100) is configured to contain a purification medium (200) within the interior volume (101) and to direct flow of the wastewater (12) along a plurality of circuitous bulk flow paths (107) through the purification medium (200);

an inlet assembly (102) comprising at least one inlet (182) that is configured to receive the wastewater (12) into the interior volume (101);

an outlet assembly (104) comprising at least one outlet (184) that is configured to exhaust the processed water (14) from the interior volume (101); and one or more flow-deflecting baffles (120) positioned fluidly between the inlet assembly (102) and the outlet assembly (104) that divide the interior volume (101) into a plurality of fluidly connected sections (106), wherein each flow-deflecting baffle (120) defines a passageway (110) that permits the wastewater (12) to flow between respective adjacent fluidly connected sections (106) of the plurality of fluidly connected sections (106), and wherein each flow-deflecting baffle (120) is configured to channel the wastewater (12) to flow along at least one circuitous bulk flow path (107) of the plurality of circuitous bulk flow paths (107) between the respective adjacent fluidly connected sections (106) of the plurality of fluidly connected sections (106).

C2. The wastewater processing container (100) of paragraph C1, wherein the one or more flow-deflecting baffles (120) is configured to increase a flow path length from the at least one inlet (182) to the at least one outlet (184).

C3. The wastewater processing container (100) of any of paragraphs C1-C2, wherein the passageway (110) of each flow-deflecting baffle (120) of the one or more flow-deflecting baffles (120) is offset from one or more of the at least one inlet (182) and the at least one outlet (184).

C4. The wastewater processing container (100) of any of paragraphs C1-C3, wherein each flow-deflecting baffle (120) of the one or more flow-deflecting baffles (120) extends transverse to an unobstructed bulk flow direction (300) from the at least one inlet assembly (102) to the at least one outlet assembly (104).

C5. The wastewater processing container (100) of any of paragraphs C1-C4, wherein each circuitous bulk flow path (107) of the plurality of circuitous bulk flow paths (107) comprises a deflected component (302) that is normal to the unobstructed bulk flow direction (300) and a return component (304) that is opposite to the deflected component (302).

C6. The wastewater processing container (100) of any of paragraphs C1-C5, wherein each flow-deflecting baffle (120) defines a maximal transverse dimension (196) that is measured normal to a/the unobstructed bulk flow direction (300), and wherein the maximal transverse dimension of each flow-deflecting baffle is a threshold fraction of a width of the interior volume (101), and wherein the threshold fraction of the maximal transverse dimension to the width is at least 30%, at least 40%, at least 50%, at least 60%, at least 70%, at least 80%, at least 90%, at least 95%, at least 99%, at most 70%, at most 80%, at most 90%, at most 95%, at most 99%, and/or at most 100%.

C7. The wastewater processing container (100) of any of paragraphs C1-C6, wherein a/the maximal transverse dimension (196) of each flow-deflecting baffle (120) is at least a threshold fraction of a waterline height (194) defined by the wastewater processing container (100), and wherein the threshold fraction of the maximal transverse dimension of each flow-deflecting baffle (120) is at least 30%, at least 40%, at least 50%, at least 60%, at least 70%, at least 80%, at least 90%, at least 95%, at least 99%, at most 70%, at most 80%, at most 90%, at most 95%, at most 99%, and/or at most 100%.

C8. The wastewater processing container of any of paragraphs C1-C7, wherein each flow-deflecting baffle (120) divides the interior volume (101) into the respective adjacent fluidly connected sections (106) of the plurality of fluidly connected sections (106).

C9. The wastewater processing container (100) of any of paragraphs C1-C8, wherein the wastewater processing container (100) is configured to restrict movement of the purification medium (200) within the interior volume (101), and wherein the one or more flow-deflecting baffles (120) is configured to divide the purification medium (200) into a plurality of purification sections (206), and wherein each purification section (206) is contained within a fluidly connected section (106) of the plurality of fluidly connected sections (106).

C10. The wastewater processing container (100) of any of paragraphs C1-C9, wherein the one or more flow-deflecting baffles (120) includes one or more upward flow-deflecting baffles (128), wherein each upward flow-deflecting baffle (128) is configured to direct the wastewater (12) to flow against a direction of gravity (20).

C11. The wastewater processing container (100) of paragraph C10, wherein each upward flow-deflecting baffle (128) is configured to direct the wastewater (12) to flow against the direction of gravity (20) to facilitate sedimentation of suspended contaminants that are included in the wastewater (12).

C12. The wastewater processing container (100) of any of paragraphs C10-C11, wherein the one or more passageways (110) of the one or more upward flow-deflecting baffles (128) define a/the waterline height (194) of a waterline (208) of wastewater (12) within the wastewater processing container (100).

C13. The wastewater processing container (100) of any of paragraphs C1-C12, wherein the one or more flow-deflecting baffles (120) include one or more downward flow-deflecting baffles (130) and wherein each downward flow-deflecting baffle (130) is configured to direct the wastewater (12) flow with a/the direction of gravity (20).

C14. The wastewater processing container (100) of paragraph C13, when depending from paragraph C10, wherein the one or more downward flow-deflecting baffles (130) and the one or more upward flow-deflecting baffles (128) are arranged in an alternating relationship fluidly between the at least one inlet (182) and the at least one outlet (184).

C15. The wastewater processing container of any of paragraphs C1-C15, wherein the one or more flow-deflecting baffles (120) comprises a plurality of flow-deflecting baffles (120).

C16. The wastewater processing container of paragraph C15, wherein the plurality of flow-deflecting baffles (120) comprises N flow-deflecting baffles (120) that divide the interior volume (101) into N+1 fluidly connected sections (106).

C17. The wastewater processing container (100) of any of paragraphs C1-C16, wherein the interior surface (103) includes two lateral sides (118), a base side (112), an inlet side (114), and an outlet side (116), wherein the two lateral sides (118) extend opposed to one another from inlet side (114) to the outlet side (116), and wherein the base side (112) extends between the lateral sides (118) and from the inlet side (114) to the outlet side (116).

C18. The wastewater processing container (100) of paragraph C17, wherein the base side of the interior surface (103) is opposed to the atmospherically open top.

C19. The wastewater processing container of any of paragraphs C1-C18, wherein at least two flow-deflecting baffles (120) of a/the plurality of flow-deflecting baffles (120) are arranged in series between the inlet assembly (102)

and the outlet assembly (104), and wherein the at least two flow-deflecting baffles (120) are configured to direct water flow along a serpentine flow path (108) that includes the at least one circuitous bulk flow path (107) corresponding to each flow-deflecting baffle (120) of the at least two flow-deflecting baffles (120).

C20. The wastewater processing container of paragraph C19, wherein the passageways (110) of adjacent flow-deflecting baffles (120) of the at least two flow-deflecting baffles (120) are offset from one another.

C21. The wastewater processing container (100) of any of paragraphs C19-C20, wherein the serpentine flow path (108) extends from the at least one inlet assembly (102) to the at least one outlet assembly (104), through each passageway (110), and within each of the plurality of fluidly connected sections (106).

C22. The wastewater processing container of any of paragraphs C19-C21, when depending from paragraph C17, wherein the at least two flow-deflecting baffles (120) are gate flow-deflecting baffles (178), wherein each gate flow-deflecting baffle (178) extends between the lateral sides (118) of the interior surface (103) of the wastewater processing container (100), wherein each flow-deflecting baffle includes lateral edges (122) that extend along the lateral sides (118) of the interior surface (103), a base edge (124) that extends between the lateral edges (122) and along or adjacent to the base side (112) of the interior surface (103), and a base-opposed edge (126) that extends between the lateral edges (122) opposed to the base edge (124).

C23. The wastewater processing container (100) of paragraph C22, wherein the passageway (110) of each gate flow-deflecting baffle (178) is at least partially defined along or formed adjacent to one of the base edge (124) and the base-opposed edge (126) of the respective flow-deflecting baffle (120).

C24. The wastewater processing container (100) of paragraph C23, wherein one or more of the gate flow-deflecting baffles (178) include a recess formed along one of the base edge (124) and the base-opposed edge (126) thereof that defines at least a portion of the passageway (110) thereof.

C25. The wastewater processing container (100) of any of paragraphs C22-C24, wherein the at least two gate flow-deflecting baffles (178) include a/the one or more upward flow-deflecting baffles (128) and a/the one or more downward flow-deflecting baffles (130).

C26. The wastewater processing container (100) of paragraph C25, wherein the passageway (110) of each downward flow-deflecting baffle (130) is at least partially defined along or formed adjacent to the base edge (124) thereof, wherein the passageway (110) of each upward flow-deflecting baffle (128) is at least partially defined along or formed adjacent to the base-opposed edge (126) thereof, and wherein each downward flow-deflecting baffle (130) forms a fluidly connected section (106) of the plurality of fluidly connected sections (106) with an upward flow-deflecting baffle (128) of the one or more upward flow-deflecting baffles (128).

C27. The wastewater processing container (100) of any of paragraphs C25-C26, wherein at least a portion of the base edge (124) of each downward flow-deflecting baffle (130) is supported spaced apart from the base side (112) of the interior surface (103) such that the passageway (110) thereof is formed between the base side (112) of the interior surface (103) and at least the portion of the base edge (124) thereof, and wherein the base edge (124) of each upward flow-deflecting baffle (128) is mated against the base side (112) of the interior surface (103) to restrict the flow of wastewater (12) therebetween.

C28. The wastewater processing container (100) of any of paragraphs C25-C27, wherein the at least a portion of the base-opposed edge (126) of each upward flow-deflecting baffle (128) is positioned below a waterline (208) defined by the wastewater processing container (100) such that the passageway (110) of each upward flow-deflecting baffle (128) is defined between the waterline (208) and at least the portion of the base-opposed edge (126) thereof.

C29. The wastewater processing container of any of paragraphs C25-C28, wherein the at least one inlet (182) is configured to flow wastewater (12) into an inlet fluidly connected section (132) of the plurality of fluidly connected sections (106), wherein the at least one inlet (182) is configured to flow wastewater (12) into the inlet fluidly connected section (132) adjacent to the base side (112) of interior surface (103), wherein the at least one outlet (184) is configured to receive processed water (14) from an outlet fluidly connected section (134) of the plurality of fluidly connected sections (106), and wherein the at least one outlet (184) is configured to receive processed water (14) from the outlet fluidly connected section (134) adjacent to the base side (112) of the interior surface (103).

C30. The wastewater processing container (100) of paragraph C29, wherein the two or more gate flow-deflecting baffles (178) includes a plurality of the upward flow-deflecting baffles (128), wherein a first upward flow-deflecting baffle (128) of the plurality of upward flow-deflecting baffles (128) forms the inlet fluidly connected section (132) of the plurality of fluidly connected sections (106) with the inlet side (114) of the interior surface (103), wherein a second upward flow-deflecting baffle (128) of the plurality of upward flow-deflecting baffles (128) forms the outlet fluidly connected section (134) of the plurality of fluidly connected sections (106) with the outlet side (116) of the interior surface (103), and wherein the one or more downward flow-deflecting baffles (130) are positioned between the first upward flow-deflecting baffle (128) and the second upward flow-deflecting baffle (128).

C31. The wastewater processing container (100) of any of paragraphs C1-C30, wherein the one or more flow-deflecting baffles (120) includes a ducted flow-deflecting baffle (180), wherein the ducted flow-deflecting baffle (180) defines a baffle interior volume (188), wherein the baffle interior volume (188) of the ducted flow-deflecting baffle (180) forms one of the respective adjacent fluidly connected sections (106) of the plurality of fluidly connected sections (106), and wherein an inlet (182) of the at least one inlet (182) of the inlet assembly (102) is configured to receive the wastewater (12) into the baffle interior volume (188) of the ducted flow-deflecting baffle (180).

C32. The wastewater processing container of paragraph C31, wherein the ducted flow-deflecting baffle (180) includes a closed sidewall (186) that encompasses the baffle interior volume (188), a closed end (190) confining one end of the baffle interior volume (188), and an open end that defines the passageway (110) of the ducted flow-deflecting baffle (180), and wherein the inlet (182) of the at least one inlet (182) is positioned within the baffle interior volume (188) adjacent to the closed end (190) of the ducted flow-deflecting baffle (180).

C33. The wastewater processing container of any of paragraphs C31-C32, wherein the one or more flow-deflecting baffles (120) includes a plurality of the ducted flow-deflecting baffles (180).

C34. The wastewater processing container of paragraph C33, wherein the plurality of ducted flow-deflecting baffles (180) are arranged in parallel fluidly between the inlet assembly (102) and the outlet assembly (104), and wherein the inlet assembly (102) includes a plurality of inlets (182) respective to the plurality of ducted flow-deflecting baffles (120), wherein each inlet (182) of the inlet assembly (102) is configured to flow the wastewater (12) into the baffle interior volume (188) of a respective ducted flow-deflecting baffle (180) of the plurality of ducted flow-deflecting baffles (180).

C35. The wastewater processing container of any of paragraphs C31-C34, wherein each ducted flow-deflecting baffle (180) is an/the upward flow-deflecting baffle (128) of a/the one or more upward flow-deflecting baffles (128).

C36. The wastewater processing container of paragraph C33, wherein the plurality of ducted flow-deflecting baffles (180) are arranged in a concentric configuration in which a first ducted flow-deflecting baffle (180) is positioned within the baffle interior volume (188) of a second ducted flow-deflecting baffle (180), and wherein the respective adjacent fluidly connected sections (106) corresponding to the first ducted flow-deflecting baffle (180) include the baffle interior volume (188) of the first ducted flow-deflecting baffle (180) and the baffle interior volume (188) of the second ducted flow-deflecting baffle (180).

C37. The wastewater processing container of any of paragraphs C33-C36, wherein each ducted flow-deflecting baffle (180) is configured to channel water flow along a plurality of diverging circuitous bulk flow paths (107) between the respective fluidly connected sections (106).

D1. A method (500) of processing wastewater, the method (500) comprising:
  providing (505) wastewater (12) through at least one inlet (182) of a wastewater processing module (10) into an interior volume (101) of the wastewater processing module (10), wherein the wastewater processing module (10) comprises one or more flow-deflecting baffles (120) that divide the interior volume (101) into a plurality of fluidly connected sections (106), a purification medium (200) at least partially filling the plurality of fluidly connected sections (106), and optionally an atmospherically open top (192);
  flowing (510) the wastewater (12) from the at least one inlet (182) to at least one outlet (184) of the wastewater processing module (10), wherein the flowing comprises:
    channeling (515), with the one or more flow-deflecting baffles (120), the wastewater (12) along a plurality of circuitous bulk flow paths (107) through the purification medium (200) contained within each of the plurality of fluidly connected sections (106);
  sequestering (520), with the purification medium (200) contained in the plurality of fluidly connected sections (106), contaminants from the wastewater (12) during the channeling (515), wherein the sequestering (520) comprises producing processed water (14) from the wastewater (12); and
  exhausting (525), with the at least one outlet (184), the processed water (14) from the interior volume (101) of the wastewater processing module (10).

D2. The method of paragraph D1, wherein the providing (505) comprises providing the wastewater (12) from a holding tank (40), wherein the method further comprises:
  selectively recirculating (530) the processed water (14) from the at least one outlet (184) of the wastewater processing module (10) to the holding tank (40).

D3. The method of paragraph D2, wherein the selectively recirculating (530) comprises:
  detecting (535) a magnitude of a contaminant load in the processed water (14); and
  recirculating (530) the processed water (14) to the holding tank (40) responsive to the detecting (535) the magnitude of the contaminant load exceeds a predetermined threshold contamination load magnitude.

D4. The method of paragraph D3, wherein the selectively recirculating (530) further comprises flowing the processed water (14) downstream responsive to the detecting (535) the magnitude of the contaminant load is less than the predetermined threshold contamination load magnitude.

D5. The method of paragraph D4, wherein the flowing the processed water (14) downstream comprises flowing the processed water (14) to one or more of a fully processed water storage tank (82) and a polishing assembly (60).

D6. The method of any of paragraphs D1-D5, further comprising selectively aerating (540) the wastewater (12).

D7. The method of any of paragraphs D1-D6, wherein the method (500) comprises processing the wastewater (12) utilizing a plurality of the wastewater processing modules (10), and wherein the method (500) comprises performing the providing (505), the flowing (510), the sequestering (520), and the exhausting (525) respective to each wastewater processing module (10) of the plurality of wastewater processing modules (10).

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

INDUSTRIAL APPLICABILITY

The wastewater processing containers, wastewater processing modules, and wastewater treatment systems are applicable to water use and wastewater treatment industries.

The invention claimed is:

1. A wastewater processing module (10) configured to receive wastewater (12) and purify the wastewater (12) to produce processed water (14) therefrom, the wastewater processing module (10) comprising: a wastewater processing container (100) defining an interior volume (101) and comprising an atmospherically open top (192), wherein the wastewater processing container (100) is configured to contain a purification medium (200) within the interior volume (101) and to direct flow of the wastewater (12) along a plurality of circuitous bulk flow paths (107) through the purification medium (200), wherein the wastewater processing container (100) comprises: an inlet assembly (102) comprising at least one inlet (182) that is configured to receive the wastewater (12) into the interior volume (101); an outlet assembly (104) comprising at least one outlet (184) that is configured to exhaust the processed water (14) from the interior volume (101); and one or more flow-deflecting baffles (120) each being positioned fluidly between the inlet assembly (102) and the outlet assembly (104), wherein the one or more flow-deflecting baffles (120) divide the interior volume (101) into a plurality of fluidly connected sections (106), wherein each flow-deflecting baffle (120) defines a passageway (110) that permits wastewater to flow between respective adjacent fluidly connected sections of the plurality of fluidly connected sections, and wherein each flow-deflecting baffle (120) is configured to channel the wastewater to flow along at least one circuitous bulk flow path (107) of the plurality of circuitous bulk flow paths (107) between the respective adjacent fluidly connected sections (106); wherein the one or more flow-deflecting baffles (120) include a ducted flow-deflecting baffle (180), wherein the ducted flow-deflecting baffle (180) defines a baffle interior volume (188), wherein the baffle interior volume (188) of the ducted flow-deflecting baffle (180) forms one of a fluidly connected section (106) of the plurality of fluidly connected sections (106), wherein the ducted flow-deflecting baffle (180) divides the interior volume (101) from an adjacent fluidly connected section of the plurality of fluidly connected sections (106), and wherein the ducted flow-deflected baffle (180) is configured to channel the wastewater to flow along at least one bulk circuitous flow path (107) between the baffle interior volume (188) and the adjacent fluidly connected section (106) of the plurality of fluidly connected sections; and the purification medium (200), wherein the purification medium (200) comprises a particulate material (202) at least partially filling the interior volume (101) and configured to permit flow of the wastewater (12) therethrough, and wherein the purification medium (200) is configured to sequester contaminants from the wastewater (12) as the wastewater (12) flows through the interior volume (101).

2. The wastewater processing module of claim 1, wherein the particulate material (202) is selected to one or more of:
   catalyze decomposition of contaminants in the wastewater (12);
   (ii) provide a substrate for a biological community (210) within the wastewater processing module (10); and
   (iii) buffer pH of the wastewater (12) within the wastewater processing module (10).

3. The wastewater processing module (10) of claim 1, wherein the particulate material (202) comprises a plurality of particles (204) that pack in the interior volume (101) to create a network of fluidly connected voids that permits flow of the wastewater (12) through the particulate material (202), wherein each particle (204) of the plurality of particles (204) comprises a particle size, wherein the plurality of particles comprises particles having different particle sizes, and wherein the particle size of at least a substantial portion of the plurality of particles is at least 0.4 mm and at most 30 mm.

4. The wastewater processing module of claim 1, wherein the particulate material (202) includes an evenly dispersed mixture of a plurality of coarse-grained particles and a plurality of small-grained particles having a smaller particle size than the plurality of coarse-grained particles, wherein the particle size of each coarse-grained particle of the plurality of coarse-grained particles is at least 2 mm and at most 60 mm.

5. The wastewater processing module of claim 1, wherein the purification medium (200) further comprises a biological community (210) that is selected to one or more of decompose, immobilize, sequester, and consume contaminants from the wastewater (12).

6. The wastewater processing module of claim 5, wherein the biological community (210) comprises a microbial community (212) at least partially supported by the particulate material (202), wherein the microbial community (212) comprises nitrifying microbes selected to oxidize nitrogenous compounds within the wastewater (12) to produce oxidized nitrogenous compounds, and wherein the microbial community comprises denitrifying microbes selected to decompose the oxidized nitrogenous compounds to produce nitrogen gas or nitrous oxide therefrom.

7. The wastewater processing module of claim 5, wherein the biological community (210) further comprises a plant community (214) that is supported by the particulate material and that comprises a plurality of plants that are selected to one or more of sequester contaminants from the wastewater (12) and consume microbial metabolites from the wastewater (12), and wherein the plant community grows out of the atmospherically open top of the wastewater processing container (100).

8. The wastewater processing module of claim 1, wherein the one or more flow-deflecting baffles (120) is configured to increase a flow path length from the at least one inlet (182) to the at least one outlet (184).

9. The wastewater processing module of claim 1, wherein the passageway of each flow-deflecting baffle of the one or more flow-deflecting baffles is offset from at least one of the at least one inlet and the at least one outlet.

10. The wastewater processing module of claim 1, wherein the one or more flow-deflecting baffles (120) includes one or more upward flow-deflecting baffles, wherein each upward flow-deflecting baffle (128) is configured to direct the wastewater to flow against a direction of gravity (20).

11. The wastewater processing module of claim 10, wherein the one or more flow-deflecting baffles includes a plurality of flow-deflecting baffles, wherein the plurality of flow-deflecting baffles includes the one or more upward flow-deflecting baffles, and wherein the plurality of flow-deflecting baffles further includes one or more downward flow-deflecting baffles (128) that are configured to direct the wastewater to flow with the direction of gravity.

12. The wastewater processing module of claim 11, wherein the one or more upward flow-deflecting baffles and the one or more downward flow-deflecting baffles are arranged in an alternating relationship fluidly between the inlet assembly and the outlet assembly.

13. The wastewater processing module of claim 1, wherein the ducted flow-deflecting baffle (180) includes a closed sidewall (186) that encompasses the baffle interior volume (188), a closed end (190) confining one end of the baffle interior volume (188), and an open end that defines the passageway (110) of the ducted flow-deflecting baffle (180), and wherein the inlet (182) of the at least one inlet (182) of the inlet assembly (102) is positioned within the baffle interior volume (188) adjacent to the closed end (190) of the ducted flow-deflecting baffle (180).

14. The wastewater processing module of claim 1, wherein the one or more flow-deflecting baffles includes a plurality of ducted flow-deflecting baffles, wherein the plurality of ducted flow-deflecting baffles are arranged in parallel fluidly between the inlet assembly and the outlet assembly, and wherein the inlet assembly includes a plurality of inlets respective to the plurality of ducted flow-deflecting baffles, and wherein each inlet of the inlet assembly is configured to flow wastewater into the baffle interior volume of a respective ducted flow-deflecting baffle of the plurality of ducted flow-deflecting baffles.

15. The wastewater processing module of claim 14, wherein each ducted flow-deflecting baffle of the plurality of ducted flow-deflecting baffles is configured to guide wastewater to flow against a direction of gravity (20).

16. The wastewater processing module of claim 1, wherein the ducted flow-deflecting baffle is configured to channel wastewater to flow along a plurality of diverging circuitous bulk flow paths between the respective adjacent fluidly connected sections.

17. A wastewater treatment system (90), comprising:
   a plurality of the wastewater processing modules of claim 1, wherein the wastewater treatment system (90) is configured to provide the wastewater (12) to the plurality of wastewater processing modules (10) and receive the processed water (14) from the plurality of wastewater processing modules (10).

18. The wastewater treatment system of claim 17, further comprising:
   a holding tank (40) configured to store a volume of the wastewater (12), wherein the wastewater treatment system (90) is configured to selectively provide the wastewater (12) from the holding tank (40) to the wastewater processing module (10); and a recirculation system (74) configured to receive the processed water (14) from the plurality of wastewater processing modules (10) and selectively recirculate the processed water to the holding tank (40), wherein the recirculation system (74) comprises at least one contaminant load sensor (76) configured to detect a magnitude of a contaminant load in the processed water (14), and wherein the recirculation system (74) is configured to selectively recirculate the processed water (14) to the holding tank (40) responsive to detection by the at least one contaminant load sensor (76) that the magnitude of the contaminant load in the processed water (14) exceeds a predetermined threshold contamination load magnitude.

19. The wastewater treatment system of claim 18, further comprising an aeration system (70) configured to provide an oxygen-containing gas to the holding tank and to mix the oxygen-containing gas with the wastewater stored in the holding tank.

20. A method (500) of processing wastewater, the method comprising:
providing (505) wastewater (12) through at least one inlet (182) of a wastewater processing module (10) into a baffle interior volume (188) of a ducted flow-deflecting baffle (180) that is included in the wastewater processing module (10) and positioned in an interior volume (101) of the wastewater processing module (10); wherein the wastewater processing module comprises one or more flow-deflecting baffles (120) that divide the interior volume into a plurality of fluidly connected sections (106), a purification medium (200) at least partially filling the plurality of fluidly connected sections (106), and an atmospherically open top (192); wherein the one or more flow-deflecting baffles (120) includes a ducted flow-deflecting baffle (180) having a baffle interior volume (188); and wherein the baffle interior volume (188) of the ducted flow-deflecting baffle (180) forms a fluidly connected section (106) of the plurality of fluidly connected sections (106);
flowing (510) the wastewater (12) from the at least one inlet (182) to at least one outlet (184) of the wastewater processing module (10), wherein the flowing comprises:
channeling (515), with the one or more flow-deflecting baffles (120), the wastewater along a plurality of circuitous bulk flow paths (107) through the purification medium (200) contained within each of the plurality of fluidly connected sections (106); wherein the channeling (515) comprises channeling, with the ducted flow-deflecting baffle (180), the wastewater (12) along at least one circuitous bulk flow path (107) of the plurality of circuitous bulk flow paths (107) between the baffle interior volume (188) of the ducted flow-deflecting baffle (180) and an adjacent fluidly connected section (106) of the plurality of fluidly connected sections (106);
sequestering (520), with the purification medium (200) contained in the plurality of fluidly connected sections (106), contaminants from the wastewater (12) during the channeling (515), wherein the sequestering (520) comprises producing processed water (14) from the wastewater (12); and
exhausting (525), with the at least one outlet (184) the processed water (14) from the interior volume of the wastewater processing module (10).

21. The method of claim 20, wherein the one or more flow-deflecting baffles (120) includes a plurality of ducted flow-deflecting baffles (180); wherein the plurality of ducted flow-deflecting baffles are arranged in parallel fluidly between the at least one inlet (182) and the at least one outlet (184); wherein at least one inlet (182) includes a plurality of inlets (182) respective to the plurality of ducted flow-deflecting baffles; wherein each inlet of the plurality of inlets (182) is configured to flow wastewater (12) into the baffle interior volume (188) of a respective ducted flow-deflecting baffle (180) of the plurality of ducted flow-deflecting baffles; and further wherein the flowing (510) the wastewater (12) from the at least one inlet (182) to the at least one outlet (184) of the wastewater processing module (10) comprises flowing the wastewater (12) into the baffle interior volume (188) of each of the plurality of ducted flow-deflecting baffles (180).

22. The method of claim 21, wherein each ducted flow-deflecting baffle (180) of the plurality of ducted flow-deflecting baffles (180) is configured to guide wastewater (12) to flow through the baffle interior volume (188) against a direction of gravity (20), and further wherein the flowing (510) the wastewater (12) from the at least one inlet (182) to the at least one outlet (184) of the wastewater processing module comprises flowing the wastewater (12) against the direction of gravity (20) through the baffle interior volume (188) of each ducted flow-deflecting baffle (180) of the plurality of ducted flow-deflecting baffles (180).

23. The wastewater processing module (10) of claim 1, wherein the purification medium (200) mostly fills the baffle interior volume (188) of the ducted flow-deflecting baffle (180).

24. The wastewater processing module (10) of claim 1, wherein the at least one inlet (182) of the inlet assembly (102) is configured to receive wastewater (12) into the interior volume (101) at a position that is lower than a position at which the at least one outlet (184) of the outlet assembly (104) is configured to exhaust the processed water (14) from the interior volume (101).

25. The wastewater processing module (10) of claim 1, wherein each of the at least one inlet (182) of the inlet assembly (102) is configured to receive wastewater (12) into the interior volume (101) at a position that is lower than a position at which each of the at least one outlet (184) of the outlet assembly (104) is configured to exhaust the processed water (14) from the interior volume (101).

* * * * *

UNITED STATES PATENT AND TRADEMARK OFFICE
CERTIFICATE OF CORRECTION

| | |
|---|---|
| PATENT NO. | : 11,945,742 B2 |
| APPLICATION NO. | : 17/833071 |
| DATED | : April 2, 2024 |
| INVENTOR(S) | : Adam Mitchell DeHeer and Nicholas Aleksander Sund |

It is certified that error appears in the above-identified patent and that said Letters Patent is hereby corrected as shown below:

In the Claims

Column 55, Line 15, the numeric value --(i)-- should be present ahead of 'catalyze decomposition of contaminants'.

Signed and Sealed this
Sixteenth Day of July, 2024

Katherine Kelly Vidal
*Director of the United States Patent and Trademark Office*